US012578561B2

(12) United States Patent
Ohtake et al.

(10) Patent No.: US 12,578,561 B2
(45) Date of Patent: Mar. 17, 2026

(54) ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventors: Fumiaki Ohtake, Tokyo (JP); Azuna Nonaka, Yokohama (JP); Yoshiharu Yuasa, Konosu (JP); Takeshi Umeda, Fujisawa (JP)

(73) Assignee: Nikon Corporation, Tokyo (JP)

( * ) Notice: Subject to any disclaimer, the term of this patent is extended or adjusted under 35 U.S.C. 154(b) by 725 days.

(21) Appl. No.: 17/783,252

(22) PCT Filed: Dec. 2, 2020

(86) PCT No.: PCT/JP2020/044761
§ 371 (c)(1),
(2) Date: Jun. 7, 2022

(87) PCT Pub. No.: WO2021/117563
PCT Pub. Date: Jun. 17, 2021

(65) Prior Publication Data
US 2023/0012479 A1     Jan. 19, 2023

(30) Foreign Application Priority Data

Dec. 10, 2019    (JP) ................................. 2019-223165
Dec. 10, 2019    (JP) ................................. 2019-223166

(51) Int. Cl.
*G02B 15/14*        (2006.01)
*G02B 15/22*        (2006.01)
(52) U.S. Cl.
CPC ................ *G02B 15/143507* (2019.08); *G02B 15/144507* (2019.08); *G02B 15/144515* (2019.08);
(Continued)

(58) Field of Classification Search
CPC .... G02B 15/143507; G02B 15/144507; G02B 15/144515; G02B 15/145511; G02B 15/145515; G02B 15/1465; G02B 15/22
See application file for complete search history.

(56) References Cited

U.S. PATENT DOCUMENTS 5,668,668 A      9/1997  Shibayama et al.
5,715,097 A      2/1998  Shibayama et al.
(Continued)

FOREIGN PATENT DOCUMENTS

EP          3327480 A1     5/2018
JP          H02-050120 A   2/1990
(Continued)

OTHER PUBLICATIONS

International Preliminary Report on Patentability from International Patent Application No. PCT/JP2020/044761, Jun. 23, 2022.
(Continued)

*Primary Examiner* — George G. King
(74) *Attorney, Agent, or Firm* — Potomac Law Group, PLLC

(57) ABSTRACT

A variable magnification optical system (ZL) comprises a preceding lens group (GA) having negative refractive power and a succeeding lens group (GB) having positive refractive power, which are arranged in order from the object side along an optical axis. The succeeding lens group (GB) has a focusing group (GF) and an image-side group (GC) disposed closer to the image side than the focusing group (GF), the focusing group (GF) moves to the image side along the optical axis from focusing on an object at infinity to focusing on a close-distance object, and the following conditional expression is satisfied.

$1.80 < fF/fBaw$ $FNow < 3.40$ (Continued)

where fF is the focal length of the focusing group (GF), fBaw is the focal length in the wide-angle end state of an image-side lens group (GBa) composed of lenses disposed on the image side from the focusing group (GF), and FNow is the F-number of the variable magnification optical system (ZL) in the wide-angle end state.

7 Claims, 23 Drawing Sheets

(52) U.S. Cl.
CPC ................ *G02B 15/145511* (2019.08); *G02B 15/145515* (2019.08); *G02B 15/1465* (2019.08); *G02B 15/22* (2013.01)

(56) References Cited

U.S. PATENT DOCUMENTS

| | | | |
|---|---|---|---|
| 5,721,642 A | 2/1998 | Shibayama et al. | |
| 5,774,267 A | 6/1998 | Kodama et al. | |
| 5,798,871 A | 8/1998 | Shibayama et al. | |
| 5,847,875 A | 12/1998 | Kodama et al. | |
| 2010/0195216 A1 | 8/2010 | Miyazaki et al. | |
| 2010/0195219 A1 | 8/2010 | Kato | |
| 2012/0069441 A1* | 3/2012 | Fujimoto | G02B 15/144511 |
| | | | 359/557 |
| 2013/0050827 A1 | 2/2013 | Li | |
| 2017/0068079 A1 | 3/2017 | Kawamura et al. | |
| 2017/0293124 A1 | 10/2017 | Kawamura | |
| 2018/0095254 A1 | 4/2018 | Iwamoto et al. | |
| 2018/0210179 A1 | 7/2018 | Kawamura et al. | |
| 2019/0302409 A1 | 10/2019 | Shomura | |
| 2020/0333621 A1 | 10/2020 | Harada | |
| 2022/0137378 A1* | 5/2022 | Ohtake | G02B 15/143507 |
| | | | 359/676 |
| 2022/0146798 A1* | 5/2022 | Ohtake | G02B 15/144507 |

FOREIGN PATENT DOCUMENTS

| | | | | |
|---|---|---|---|---|
| JP | H07-306362 A | 11/1995 | | |
| JP | H08-248314 A | 9/1996 | | |
| JP | H08248312 A | 9/1996 | | |
| JP | H08327907 A | 12/1996 | | |
| JP | H09-211326 A | 8/1997 | | |
| JP | H09-230242 A | 9/1997 | | |
| JP | 2001-188171 A | 7/2001 | | |
| JP | 2003-084198 A | 3/2003 | | |
| JP | 2010-176098 A | 8/2010 | | |
| JP | 2010204647 A | 9/2010 | | |
| JP | 2012-068303 A | 4/2012 | | |
| JP | 2013044964 A | 3/2013 | | |
| JP | 2015-138122 A | 7/2015 | | |
| JP | 2015-203734 A | 11/2015 | | |
| JP | 2017-122743 A | 7/2017 | | |
| JP | 2017-122747 A | 7/2017 | | |
| JP | 2017-187631 A | 10/2017 | | |
| JP | 2018-010219 A | 1/2018 | | |
| JP | 2018-013685 A | 1/2018 | | |
| JP | 2018054988 A | 4/2018 | | |
| JP | 2018-087903 A | 6/2018 | | |
| JP | 2018-189733 A | 11/2018 | | |
| JP | 2019-174714 A | 10/2019 | | |
| WO | WO-2020170590 A1 * | 8/2020 | ......... | G02B 15/1425 |
| WO | WO-2020170591 A1 * | 8/2020 | ..... | G02B 15/143507 |

OTHER PUBLICATIONS

Office Action issued May 2, 2023, in Japanese Patent Application No. 2021-563882.

Office Action issued May 22, 2023, in Chinese Patent Application No. 202080083826.2.

International Search Report from International Patent Application No. PCT/JP2020/044761, Feb. 22, 2021.

Office Action issued Nov. 7, 2023, in Japanese Patent Application No. 2021-563882.

Office Action issued Nov. 29, 2022, in Japanese Patent Application No. 2021-563882.

Office Action issued Jun. 3, 2025, in Japanese Patent Application No. 2024-013917.

\* cited by examiner

*FIG.1*

SPHERICAL ABERRATION

ASTIGMATISM

DISTORTION

COMA ABERRATION

CHROMATIC ABERRATION OF MAGNIFICATION

SPHERICAL ABERRATION

ASTIGMATISM

DISTORTION

COMA ABERRATION

CHROMATIC ABERRATION OF MAGNIFICATION

NA=0. 17

Y=21. 70

Y=21. 70

SPHERICAL
ABERRATION    0. 500

ASTIGMATISM    0. 500

DISTORTION    10. 00%

CHROMATIC ABERRATION
OF MAGNIFICATION    −0. 050

Y=21. 70
Y=15. 10
Y=10. 80
Y=5. 40
Y=0. 0    −0. 100

COMA ABERRATION

NA=0. 17

Y=21. 70

Y=21. 70

SPHERICAL
ABERRATION    0. 500

ASTIGMATISM    0. 500

DISTORTION    5. 000%

CHROMATIC ABERRATION
OF MAGNIFICATION    −0. 050

Y=21. 70
Y=15. 10
Y=10. 80
Y=5. 40
Y=0. 0    −0. 100

COMA ABERRATION

SPHERICAL ABERRATION

ASTIGMATISM

DISTORTION

COMA ABERRATION

CHROMATIC ABERRATION OF MAGNIFICATION

SPHERICAL ABERRATION

ASTIGMATISM

DISTORTION

COMA ABERRATION

CHROMATIC ABERRATION OF MAGNIFICATION

FIG.10

SPHERICAL ABERRATION

ASTIGMATISM

DISTORTION

CHROMATIC ABERRATION OF MAGNIFICATION

COMA ABERRATION

SPHERICAL ABERRATION

ASTIGMATISM

DISTORTION

CHROMATIC ABERRATION OF MAGNIFICATION

COMA ABERRATION

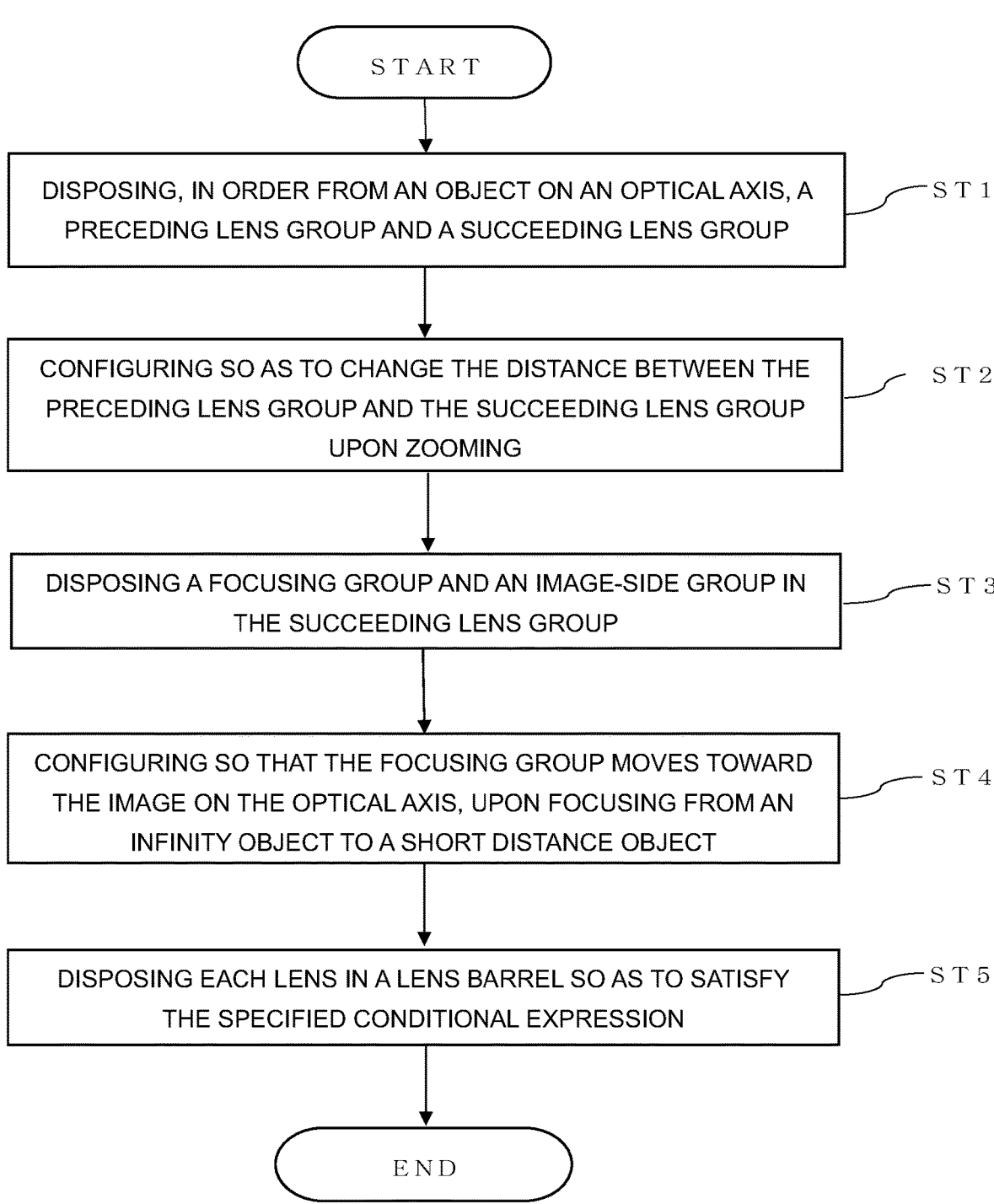

START

DISPOSING, IN ORDER FROM AN OBJECT ON AN OPTICAL AXIS, A PRECEDING LENS GROUP AND A SUCCEEDING LENS GROUP — ST 1

CONFIGURING SO AS TO CHANGE THE DISTANCE BETWEEN THE PRECEDING LENS GROUP AND THE SUCCEEDING LENS GROUP UPON ZOOMING — ST 2

DISPOSING A FOCUSING GROUP AND AN IMAGE-SIDE GROUP IN THE SUCCEEDING LENS GROUP — ST 3

CONFIGURING SO THAT THE FOCUSING GROUP MOVES TOWARD THE IMAGE ON THE OPTICAL AXIS, UPON FOCUSING FROM AN INFINITY OBJECT TO A SHORT DISTANCE OBJECT — ST 4

DISPOSING EACH LENS IN A LENS BARREL SO AS TO SATISFY THE SPECIFIED CONDITIONAL EXPRESSION — ST 5

END

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, an optical apparatus and a method for manufacturing the zoom optical system.

TECHNICAL BACKGROUND

Conventionally, zoom optical systems suitable for photographic cameras, electronic still cameras, video cameras and the like have been proposed (for example, see Patent literature 1). These zoom optical systems are required to reduce variation in angle of view upon focusing.

PRIOR ARTS LIST

Patent Document

Patent literature 1: Japanese Laid-Open Patent Publication No. 2018-13685(A)

SUMMARY OF THE INVENTION

A zoom optical system according to a first aspect of the present invention consists of, in order from an object on an optical axis: a preceding lens group having a negative refractive power; and a succeeding lens group having a positive refractive power, wherein upon zooming, a distance between the preceding lens group and the succeeding lens group changes, the succeeding lens group includes a focusing group, and an image-side group disposed closer to an image than the focusing group, upon focusing from an infinity object to a short distance object, the focusing group moves toward the image on the optical axis, and the following conditional expressions are satisfied, $$1.80 < fF/fBaw$$

$$FNow < 3.40$$

where
fF: a focal length of the focusing group,
fBaw: a focal length of a lens group consisting of lenses in the succeeding lens group that are disposed closer to the image than the focusing group including the focusing group, in a wide angle end state, and
FNow: an f-number of the zoom optical system in the wide angle end state.

A zoom optical system according to a second aspect of the present invention consists of, in order from an object on an optical axis: a preceding lens group having a negative refractive power; and a succeeding lens group having a positive refractive power, wherein upon zooming, a distance between the preceding lens group and the succeeding lens group changes, the succeeding lens group includes a focusing group, and an image-side group disposed closer to an image than the focusing group, upon focusing from an infinity object to a short distance object, the focusing group moves toward the image on the optical axis, and the following conditional expressions are satisfied, $$2.00 < \beta Fw/(-\beta Baw) < 15.00$$

$$FNow < 3.40$$

where
βFw: a magnification of the focusing group in a wide angle end state,
βBaw: a magnification of a lens group consisting of lenses in the succeeding lens group that are disposed closer to the image than the focusing group including the focusing group, in the wide angle end state, and
FNow: an f-number of the zoom optical system in the wide angle end state.

An optical apparatus according to the present invention comprises the zoom optical system described above.

A method for manufacturing a zoom optical system according to a first aspect of the present invention, consisting of, in order from an object on an optical axis: a preceding lens group having a negative refractive power; and a succeeding lens group having a positive refractive power, comprises a step of disposing the lens groups in a lens barrel so that; upon zooming, a distance between the preceding lens group and the succeeding lens group changes, the succeeding lens group includes a focusing group, and an image-side group disposed closer to an image than the focusing group, upon focusing from an infinity object to a short distance object, the focusing group moves toward the image on the optical axis, and the following conditional expressions are satisfied, $$1.80 < fF/fBaw$$

$$FNow < 3.40$$

where
fF: a focal length of the focusing group,
fBaw: a focal length of a lens group consisting of lenses in the succeeding lens group that are disposed closer to the image than the focusing group including the focusing group, in a wide angle end state, and
FNow: an f-number of the zoom optical system in the wide angle end state.

A method for manufacturing a zoom optical system according to a second aspect of the present invention, consisting of, in order from an object on an optical axis: a preceding lens group having a negative refractive power; and a succeeding lens group having a positive refractive power, comprises a step of disposing the lens groups in a lens barrel so that; upon zooming, a distance between the preceding lens group and the succeeding lens group changes, the succeeding lens group includes a focusing group, and an image-side group disposed closer to an image than the focusing group, upon focusing from an infinity object to a short distance object, the focusing group moves toward the image on the optical axis, and the following conditional expressions are satisfied, $$2.00 < \beta Fw/(-\beta Baw) < 15.00$$

$$FNow < 3.40$$

where
βFw: a magnification of the focusing group in a wide angle end state,
βBaw: a magnification of a lens group consisting of lenses in the succeeding lens group that are disposed closer to the image than the focusing group including the focusing group, in the wide angle end state, and
FNow: an f-number of the zoom optical system in the wide angle end state.

BRIEF DESCRIPTION OF THE DRAWINGS

FIG. 1 shows a lens configuration of a zoom optical system according to First Example;

FIG. 10 shows a lens configuration of a zoom optical system according to Fourth Example;

FIG. 13 shows a lens configuration of a zoom optical system according to Fifth Example;

FIG. 16 shows a lens configuration of a zoom optical system according to Sixth Example;

FIG. 19 shows a lens configuration of a zoom optical system according to Seventh Example;

FIG. 23 is a flowchart showing a method for manufacturing the zoom optical system according to each embodiment.

DESCRIPTION OF THE EMBODIMENTS

Figure 22:
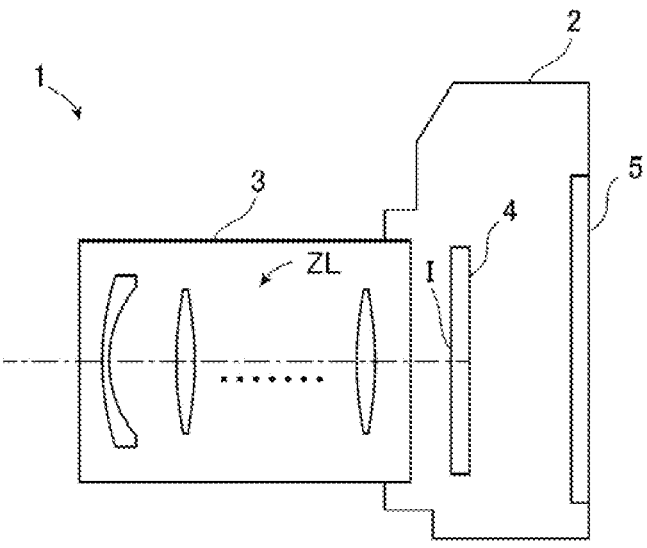
FIG. 22 shows a configuration of a camera that includes the zoom optical system according to each embodiment.

Hereinafter, preferable embodiments according to the present invention are described. First, a camera (optical apparatus) that includes a zoom optical system according to each embodiment is described with reference to FIG. 22. As shown in FIG. 22, this camera 1 includes a main body 2, and a photographing lens 3 attached to the main body 2. The main body 2 includes an imaging element 4, a main body control part (not shown) that controls the operation of a digital camera, and a liquid crystal screen 5. The photographing lens 3 includes a zoom optical system ZL that includes a plurality of lens groups, and a lens position control mechanism (not shown) that controls the position of each lens group. The lens position control mechanism includes a sensor that detects the position of the each lens group, a motor that moves each lens group on the optical axis, and a control circuit that drives the motor.

Light from a photographic subject is condensed by the zoom optical system ZL of the photographing lens 3, and reaches an image surface I of the imaging element 4. The light having reached the image surface I photoelectrically converted by the imaging element 4, and is recorded as digital image data in a memory, not shown. The digital image data recorded in the memory is allowed to be displayed on the liquid crystal screen 5 according to an operation by a user. Note that this camera may be a mirrorless camera, or a single-lens reflex camera that includes a quick return mirror.

Figure 1:
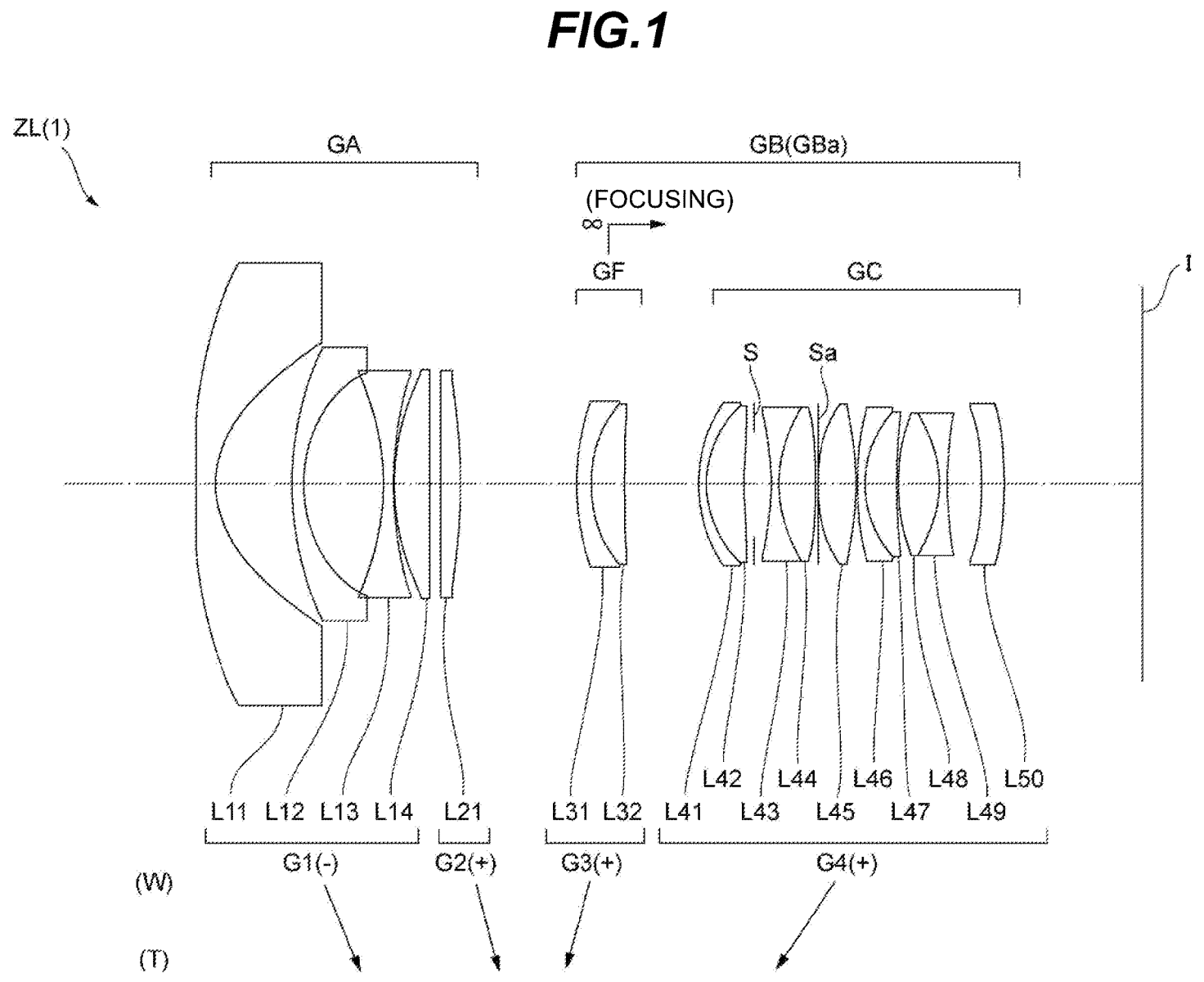

Next, the zoom optical system according to a first embodiment is described. As shown in FIG. 1, a zoom optical system ZL(1) that is an example of the zoom optical system (zoom lens) ZL according to the first embodiment consists of, in order from an object on an optical axis: a preceding lens group GA having a negative refractive power; and a succeeding lens group GB having a positive refractive power. Upon zooming, a distance between the preceding lens group GA and the succeeding lens group GB changes. The succeeding lens group GB includes a focusing group GF, and an image-side group GC disposed closer to an image than the focusing group GF. Upon focusing from an infinity object to a short distance object, the focusing group GF moves toward the image on the optical axis.

With the configuration described above, the zoom optical system ZL according to the first embodiment satisfies the following conditional expression (1-1) and conditional expression (2).

$$1.80 < fF/fBaw \tag{1-1}$$

$$FNow < 3.40 \tag{2}$$

where
fF: a focal length of the focusing group GF,
fBaw: a focal length of a lens group consisting of lenses in the succeeding lens group GB that are disposed closer to the image than the focusing group GF including the focusing group GF, in the wide angle end state, and
FNow: an f-number of the zoom optical system ZL in the wide angle end state.

According to the first embodiment, the zoom optical system having a small variation in angle of view upon focusing, and the optical apparatus including this zoom optical system can be achieved. The zoom optical system ZL according to the first embodiment may be a zoom optical system ZL(2) shown in FIG. 4, a zoom optical system ZL(3) shown in FIG. 7, or a zoom optical system ZL(4) shown in FIG. 10. The zoom optical system ZL according to the first embodiment may be a zoom optical system ZL(5) shown in FIG. 13, a zoom optical system ZL(6) shown in FIG. 16, or a zoom optical system ZL(7) shown in FIG. 19. In the first embodiment, the lens group consisting of lenses in the succeeding lens group GB that are disposed closer to the image than the focusing group GF or in the focusing group GF is sometimes called an image-side lens group GBa.

The conditional expression (1-1) defines an appropriate relationship between the focal length of the focusing group GF, and the focal length of the image-side lens group GBa (the lens group consisting of the lenses of the succeeding lens group GB that are disposed closer to the image than the focusing group GF or in the focusing group GF) in the wide angle end state. Note that the focal length of the image-side lens group GBa in the wide angle end state is a value upon focusing on the infinity object. By satisfying the conditional expression (1-1), the variation in angle of view upon focusing can be reduced.

If the corresponding value of the conditional expression (1-1) goes out of the range, it becomes difficult to suppress variation in angle of view upon focusing. By setting the lower limit value of the conditional expression (1-1) to 1.90, 2.00, 2.10, 2.20, 2.25, 2.30, or further to 2.35, the advantageous effects of this embodiment can be further secured. By setting the upper limit value of the conditional expression (1-1) to 10.00, 8.00, or further to 6.00, the advantageous effects of this embodiment can be further secured.

The conditional expression (2) defines an appropriate range of the f-number of the zoom optical system ZL in the wide angle end state. Note that the f-number of the zoom optical system ZL in the wide angle end state is the open f-value upon focusing on the infinity object. By satisfying the conditional expression (2), the variation in angle of view upon focusing can be reduced while securing the brightness of the optical system.

If the corresponding value of the conditional expression (2) goes out of the range, it becomes difficult to suppress variation in angle of view upon focusing, while securing the brightness of the optical system. By setting the upper limit value of the conditional expression (2) to 3.20, or further to 3.00, the advantageous effects of this embodiment can be further secured.

Next, the zoom optical system according to the second embodiment is described. As shown in FIG. 1, a zoom optical system ZL(1) that is an example of the zoom optical system (zoom lens) ZL according to the second embodiment consists of, in order from an object on an optical axis: a preceding lens group GA having a negative refractive power; and a succeeding lens group GB having a positive refractive power. Upon zooming, a distance between the preceding lens group GA and the succeeding lens group GB changes. The succeeding lens group GB includes a focusing group GF, and an image-side group GC disposed closer to an image than the focusing group GF. Upon focusing from an infinity object to a short distance object, the focusing group GF moves toward the image on the optical axis.

With the configuration described above, the zoom optical system ZL according to the second embodiment satisfies the following conditional expression (1-2) and conditional expression (2).

$$2.00 < \beta Fw/(-\beta Baw) < 15.00 \tag{1-2}$$

$$FNow < 3.40 \tag{2}$$

where
$\beta Fw$: a magnification of the focusing group GF in the wide angle end state,
$\beta Baw$: a magnification of a lens group consisting of lenses in the succeeding lens group GB that are disposed closer to the image than the focusing group GF including the focusing group GF, in the wide angle end state, and
FNow: an f-number of the zoom optical system ZL in the wide angle end state.

According to the second embodiment, the zoom optical system having a small variation in angle of view upon focusing, and the optical apparatus including this zoom optical system can be achieved. The zoom optical system ZL according to the second embodiment may be a zoom optical system ZL(2) shown in FIG. 4, a zoom optical system ZL(3) shown in FIG. 7, or a zoom optical system ZL(4) shown in FIG. 10. The zoom optical system ZL according to the second embodiment may be a zoom optical system ZL(5) shown in FIG. 13, a zoom optical system ZL(6) shown in FIG. 16, or a zoom optical system ZL(7) shown in FIG. 19. In the second embodiment, the lens group consisting of lenses in the succeeding lens group GB that are disposed closer to the image than the focusing group GF or in the focusing group GF is sometimes called an image-side lens group GBa.

The conditional expression (1-2) defines an appropriate relationship between the magnification of the focusing group GF in the wide angle end state, and the magnification of the image-side lens group GBa (the lens group consisting of the lenses of the succeeding lens group GB that are disposed closer to the image than the focusing group GF or in the focusing group GF) in the wide angle end state. Note that the magnification of the focusing group GF in the wide angle end state is a value upon focusing on the infinity object. The magnification of the image-side lens group GBa in the wide angle end state is a value upon focusing on the infinity object. By satisfying the conditional expression (1-2), the variation in angle of view upon focusing can be reduced.

If the corresponding value of the conditional expression (1-2) goes out of the range, it becomes difficult to suppress variation in angle of view upon focusing. By setting the lower limit value of the conditional expression (1-2) to 2.15, 2.30, 2.50, 2.80, 3.00, 3.30, 3.50, 3.80, 4.00, 4.50, 5.00, or further to 5.50, the advantageous effects of this embodiment can be further secured. By setting the upper limit value of the conditional expression (1-2) to 14.50, 14.00, 13.50, 13.00, 12.00, 11.00, 10.00, 9.50, 9.00, 8.50, or further to 8.00, the advantageous effects of this embodiment can be further secured.

The conditional expression (2) defines an appropriate range of the f-number of the zoom optical system ZL in the wide angle end state. Note that the f-number of the zoom optical system ZL in the wide angle end state is the open f-value upon focusing on the infinity object. By satisfying the conditional expression (2), the variation in angle of view upon focusing can be reduced while securing the brightness of the optical system.

If the corresponding value of the conditional expression (2) goes out of the range, it becomes difficult to suppress variation in angle of view upon focusing, while securing the brightness of the optical system. By setting the upper limit value of the conditional expression (2) to 3.20, or further to 3.00, the advantageous effects of this embodiment can be further secured.

Preferably, the zoom optical systems ZL according to the first embodiment and the second embodiment satisfy the following conditional expression (3) and conditional expression (4).

$$1.50 < \beta Fw < 15.00 \tag{3}$$

$$0.00 < fBaw/fCw < 1.00 \tag{4}$$

where $\beta Fw$: a magnification of the focusing group GF in the wide angle end state, $fCw$: a focal length of the image-side group GC in the wide angle end state, and $fBaw$: a focal length of a lens group consisting of lenses in the succeeding lens group GB that are disposed closer to the image than the focusing group GF including the focusing group GF, in the wide angle end state.

The conditional expression (3) defines an appropriate range of the magnification of the focusing group GF in the wide angle end state. Note that the magnification of the focusing group GF in the wide angle end state is a value upon focusing on the infinity object. By satisfying the conditional expression (3), the variation in angle of view upon focusing can be reduced.

If the corresponding value of the conditional expression (3) goes out of the range, it becomes difficult to suppress variation in angle of view upon focusing. By setting the lower limit value of the conditional expression (3) to 1.55, 1.60, 1.65, 1.70, 1.75, 1.80, 2.00, 2.40, 2.50, 2.55, 2.60, or further to 2.65, the advantageous effects of each embodiment can be further secured. By setting the upper limit value of the conditional expression (3) to 14.50, 13.50, 12.50, 11.00, 10.00, 9.00, 8.00, 7.00, or further to 6.00, the advantageous effects of each embodiment can be further secured.

The conditional expression (4) defines an appropriate relationship between the focal length of the image-side lens group GBa (the lens group consisting of the lenses of the succeeding lens group GB that are disposed closer to the image than the focusing group GF or in the focusing group GF) in the wide angle end state, and the focal length of the image-side group GC in the wide angle end state. Note that the focal length of the image-side lens group GBa in the wide angle end state is a value upon focusing on the infinity object. The focal length of the image-side group GC in the wide angle end state is a value upon focusing on the infinity object. By satisfying the conditional expression (4), the variation in angle of view upon focusing can be reduced.

If the corresponding value of the conditional expression (4) goes out of the range, it becomes difficult to suppress variation in angle of view upon focusing. By setting the lower limit value of the conditional expression (4) to 0.20, 0.35, 0.45, 0.50, 0.55, 0.58, or further to 0.60, the advantageous effects of each embodiment can be further secured. By setting the upper limit value of the conditional expression (4) to 0.99, 0.95, 0.93, 0.90, or further to 0.88, the advantageous effects of each embodiment can be further secured.

Preferably, the zoom optical systems ZL according to the first embodiment and the second embodiment satisfy the following conditional expression (5).

$$0.60 < Bfw/fw < 4.00 \tag{5}$$

8 where fw: a focal length of the zoom optical system ZL in the wide angle end state, and Bfw: a back focus of the zoom optical system ZL in the wide-angle end state.

The conditional expression (5) defines an appropriate range of the back focus of the zoom optical system ZL in the wide angle end state. Note that the focal length of the zoom optical system ZL in the wide angle end state is a value upon focusing on the infinity object. By satisfying the conditional expression (5), the various aberrations, such as the coma aberration, in the wide-angle end state can be favorably corrected.

If the corresponding value of the conditional expression (5) goes out of the range, it becomes difficult to correct various aberrations, such as the coma aberration, in the wide angle end state. It becomes difficult to secure the peripheral illumination. By setting the lower limit value of the conditional expression (5) to 0.70, 0.73, 0.75, 0.85, 0.93, 1.00, 1.10, or further to 1.15, the advantageous effects of each embodiment can be further secured. By setting the upper limit value of the conditional expression (5) to 3.50, 3.00, 2.80, 2.50, 2.20, 2.00, 1.80, or further to 1.60, the advantageous effects of each embodiment can be further secured.

Preferably, the zoom optical systems ZL according to the first embodiment and the second embodiment satisfy the following conditional expression (6).

$$0.05 < Bfw/TLw < 0.22 \tag{6}$$

where

TLw: an entire length of the zoom optical system ZL in the wide angle end state, and Bfw: a back focus of the zoom optical system ZL in the wide-angle end state.

The conditional expression (6) defines an appropriate relationship between the entire length of the zoom optical system ZL in the wide angle end state, and the back focus of the zoom optical system ZL in the wide angle end state. By satisfying the conditional expression (6), the various aberrations, such as the spherical aberration, in the wide-angle end state can be favorably corrected.

If the corresponding value of the conditional expression (6) goes out of the range, it becomes difficult to correct various aberrations, such as the spherical aberration, in the wide angle end state. By setting the lower limit value of the conditional expression (6) to 0.06, 0.07, 0.10, 0.12, or further to 0.13, the advantageous effects of each embodiment can be further secured. By setting the upper limit value of the conditional expression (6) to 0.20, 0.18, or further to 0.17, the advantageous effects of each embodiment can be further secured.

Preferably, in the zoom optical systems ZL according to the first embodiment and the second embodiment, an aperture stop S is disposed in the succeeding lens group GB, and the following conditional expression (7) is satisfied.

$$0.40 < STLw/TLw < 0.70 \tag{7}$$

where

TLw: an entire length of the zoom optical system ZL in the wide angle end state, and STLw: a distance on the optical axis from a lens surface closest to the object in the zoom optical system ZL to the aperture stop S in the wide angle end state.

The conditional expression (7) defines an appropriate relationship between the entire length of the zoom optical system ZL in the wide angle end state, and the distance from the lens surface closest to the object to the aperture stop S in the zoom optical system ZL in the wide angle end state. By satisfying the conditional expression (7), the distortion and the curvature of field can be favorably corrected.

If the corresponding value of the conditional expression (7) goes out of the range, it becomes difficult to correct the distortion and the curvature of field. By setting the lower limit value of the conditional expression (7) to 0.42, 0.44, 0.48, 0.50, 0.52, or further to 0.55, the advantageous effects of each embodiment can be further secured. By setting the upper limit value of the conditional expression (7) to 0.68, 0.66, 0.64, or further to 0.62, the advantageous effects of each embodiment can be further secured.

Preferably, the zoom optical systems ZL according to the first embodiment and the second embodiment satisfy the following conditional expression (8).

$$0.00 < TLt/TLw < 1.00 \tag{8}$$

where

TLw: an entire length of the zoom optical system ZL in the wide angle end state, and TLt: the entire length of the zoom optical system ZL in a telephoto end state.

The conditional expression (8) defines an appropriate relationship between the entire length of the zoom optical system ZL in the wide angle end state, and the entire length of the zoom optical system ZL in the telephoto end state. By satisfying the conditional expression (8), it is characterized in that the entire length of the zoom optical system ZL in the telephoto end state is shorter than the entire length of the zoom optical system ZL in the wide angle end state.

By setting the lower limit value of the conditional expression (8) to 0.25, 0.40, 0.50, 0.60, 0.70, 0.75, 0.80, or further to 0.85, the advantageous effects of each embodiment can be further secured. By setting the upper limit value of the conditional expression (8) to 0.98, or further to 0.97, the advantageous effects of each embodiment can be further secured.

Preferably, in the zoom optical systems ZL according to the first embodiment and the second embodiment, the preceding lens group GA includes a first lens group G1 disposed closest to the object, and the following conditional expression (9) is satisfied.

$$1.00 < (-f1)/fw < 1.80 \tag{9}$$

where f1: a focal length of the first lens group G1, and fw: a focal length of the zoom optical system ZL in the wide angle end state.

The conditional expression (9) defines an appropriate relationship between the focal length of the first lens group G1 and the focal length of the zoom optical system ZL in the wide angle end state. Note that the focal length of the zoom optical system ZL in the wide angle end state is a value upon focusing on the infinity object. By satisfying the conditional expression (9), the various aberrations, such as the spherical aberration and the coma aberration, in the wide-angle end state can be favorably corrected.

If the corresponding value of the conditional expression (9) goes out of the range, it becomes difficult to correct various aberrations, such as the spherical aberration and the coma aberration, in the wide angle end state. By setting the lower limit value of the conditional expression (9) to 1.05, 1.10, 1.15, 1.20, or further to 1.25, the advantageous effects of each embodiment can be further secured. By setting the upper limit value of the conditional expression (9) to 1.75, 1.70, 1.65, 1.60, 1.55, or further to 1.50, the advantageous effects of each embodiment can be further secured.

Preferably, in the zoom optical systems ZL according to the first embodiment and the second embodiment, the preceding lens group GA includes a first lens group G1 disposed closest to the object, and the following conditional expression (10) is satisfied.

$$0.42 < (-f1)/ft < 1.20 \tag{10}$$

where f1: a focal length of the first lens group G1, and ft: a focal length of the zoom optical system ZL in a telephoto end state.

The conditional expression (10) defines an appropriate relationship between the focal length of the first lens group G1 and the focal length of the zoom optical system ZL in the telephoto end state. Note that the focal length of the zoom optical system ZL in the telephoto end state is a value upon focusing on the infinity object. By satisfying the conditional expression (10), the various aberrations, such as the spherical aberration and the coma aberration, in the telephoto end state can be favorably corrected.

If the corresponding value of the conditional expression (10) goes out of the range, it becomes difficult to correct various aberrations, such as the spherical aberration and the coma aberration, in the telephoto end state. By setting the lower limit value of the conditional expression (10) to 0.45, 0.48, 0.50, 0.52, 0.55, 0.58, 0.60, or further to 0.62, the advantageous effects of each embodiment can be further secured. By setting the upper limit value of the conditional expression (10) to 1.15, 1.10, 1.05, 1.00, 0.98, or further to 0.95, the advantageous effects of each embodiment can be further secured.

Preferably, the zoom optical systems ZL according to the first embodiment and the second embodiment satisfy the following conditional expression (11).

$$-3.00 < (rL1R2+rL1R1)/(rL1R2-rL1R1) < -0.80 \tag{11}$$

where rL1R1: a radius of curvature of an object-side lens surface of a lens disposed closest to the object in the zoom optical system ZL, and rL1R2: a radius of curvature of an image-side lens surface of the lens disposed closest to the object in the zoom optical system ZL.

The conditional expression (11) defines an appropriate shape factor of the lens disposed closest to the object in the zoom optical system ZL. By satisfying the conditional expression (11), the distortion can be favorably corrected.

If the corresponding value of the conditional expression (11) goes out of the range, it becomes difficult to correct the distortion. By setting the lower limit value of the conditional expression (11) to -2.80, -2.50, -2.30, -2.00, or further to -1.80, the advantageous effects of each embodiment can be further secured. By setting the upper limit value of the conditional expression (11) to -0.85, -0.90, -0.95, or further to -1.00, the advantageous effects of each embodiment can be further secured.

Preferably, the zoom optical systems ZL according to the first embodiment and the second embodiment satisfy the following conditional expression (12).

$$-5.50 < (rL2R2+rL2R1)/(rL2R2-rL2R1) < -1.50 \tag{12}$$

where rL2R1: a radius of curvature of an object-side lens surface of a lens disposed second closest to the object in the zoom optical system ZL, and rL2R2: a radius of curvature of an image-side lens surface of the lens disposed second closest to the object in the zoom optical system ZL.

The conditional expression (12) defines an appropriate shape factor of the lens disposed second closest to the object in the zoom optical system ZL. By satisfying the conditional expression (12), the coma aberration and the curvature of field can be favorably corrected.

If the corresponding value of the conditional expression (12) goes out of the range, it becomes difficult to correct the coma aberration and the curvature of field. By setting the lower limit value of the conditional expression (12) to −5.40, −5.30, −5.15, −5.00, −4.50, −4.25, −4.00, −3.80, or further to −3.50, the advantageous effects of each embodiment can be further secured. By setting the upper limit value of the conditional expression (12) to −1.60, −1.70, −1.75, −1.80, or further to −1.85, the advantageous effects of each embodiment can be further secured.

Preferably, the zoom optical systems ZL according to the first embodiment and the second embodiment satisfy the following conditional expression (13).

$$-0.50 < (rL3R2 + rL3R1)/(rL3R2 - rL3R1) < 0.50 \tag{13}$$

where rL3R1: a radius of curvature of an object-side lens surface of a lens disposed third closest to the object in the zoom optical system ZL, and rL3R2: a radius of curvature of an image-side lens surface of the lens disposed third closest to the object in the zoom optical system ZL.

The conditional expression (13) defines an appropriate shape factor of the lens disposed third closest to the object in the zoom optical system ZL. By satisfying the conditional expression (13), the coma aberration can be favorably corrected.

If the corresponding value of the conditional expression (13) goes out of the range, it becomes difficult to correct the coma aberration. By setting the lower limit value of the conditional expression (13) to −0.45, −0.40, −0.38, −0.35, or further to −0.33, the advantageous effects of each embodiment can be further secured. By setting the upper limit value of the conditional expression (13) to 0.48, 0.45, 0.43, 0.40, or further to 0.38, the advantageous effects of each embodiment can be further secured.

Preferably, the zoom optical systems ZL according to the first embodiment and the second embodiment satisfy the following conditional expression (14).

$$1.50 < |(rLeR2 + rLeR1)/(rLeR2 - rLeR1)| \tag{14}$$

where rLeR1: a radius of curvature of an object-side lens surface of a lens disposed closest to the image in the zoom optical system ZL, and rLeR2: a radius of curvature of an image-side lens surface of the lens disposed closest to the image in the zoom optical system ZL.

The conditional expression (14) defines an appropriate shape factor of the lens disposed closest to the image in the zoom optical system ZL. By satisfying the conditional expression (14), the curvature of field and the distortion can be favorably corrected.

If the corresponding value of the conditional expression (14) goes out of the range, it becomes difficult to correct the curvature of field and the distortion. By setting the lower limit value of the conditional expression (14) to 1.80, 2.00, or further to 2.30, the advantageous effects of each embodiment can be further secured.

Preferably, in the zoom optical systems ZL according to the first embodiment and the second embodiment, the preceding lens group GA includes a first lens group G1 disposed closest to the object, and the first lens group G1 moves toward the image on the optical axis, upon zooming from the wide angle end state to the telephoto end state. Accordingly, it is characterized in that the entire length of the zoom optical system ZL in the telephoto end state is shorter than the entire length of the zoom optical system ZL in the wide angle end state.

Preferably, in the zoom optical systems ZL according to the first embodiment and the second embodiment, the succeeding lens group GB includes at least one aspherical surface lens. Accordingly, the curvature of field and the distortion can be favorably corrected.

Preferably, in the zoom optical systems ZL according to the first embodiment and the second embodiment, the succeeding lens group GB includes at least one lens that satisfies the following conditional expression (15). In the first embodiment and the second embodiment, for discrimination from the other lenses, the lens that satisfies the conditional expression (15) is sometimes called a specified lens.

$$75.0 < vd \tag{15}$$

vd: an Abbe number of the specified lens.

The conditional expression (15) defines the anomalous dispersion characteristics of a glass material of the specified lens in the succeeding lens group GB. By satisfying the conditional expression (15), the chromatic aberration of magnification can be favorably corrected.

If the corresponding value of the conditional expression (15) goes out of the range, it becomes difficult to correct the chromatic aberration of magnification favorably. By setting the lower limit value of the conditional expression (15) to 78.0, 80.0, or further to 81.0, the advantageous effects of each embodiment can be further secured.

Subsequently, referring to FIG. 23, a method for manufacturing the zoom optical system ZL according to the first embodiment is schematically described. First, in order from an object on an optical axis, a preceding lens group GA having a negative refractive power, and a succeeding lens group GB having a positive refractive power are disposed (step ST1). Next, it is configured so as to change the distance between the preceding lens group GA and the succeeding lens group GB upon zooming (step ST2). Next, a focusing group GF, and an image-side group GC disposed closer to an image than the focusing group GF are disposed in the succeeding lens group GB (step ST3). Next, it is configured so that the focusing group GF moves toward the image on the optical axis, upon focusing from an infinity object to a short distance object (step ST4). Each lens is then disposed in a lens barrel so as to satisfy at least the conditional expression (1-1) and the conditional expression (2) (step ST5). According to such a manufacturing method, a zoom optical system having a small variation in angle of view upon focusing can be manufactured.

Subsequently, a method for manufacturing the zoom optical system ZL according to the second embodiment is schematically described. The method for manufacturing the zoom optical system ZL according to the second embodiment is similar to the manufacturing method described in the first embodiment. Accordingly, description is made with reference to FIG. 23, which is the same as that in the first embodiment. First, in order from an object on an optical axis, a preceding lens group GA having a negative refractive power, and a succeeding lens group GB having a positive refractive power are disposed (step ST1). Next, it is configured so as to change the distance between the preceding lens group GA and the succeeding lens group GB upon zooming (step ST2). Next, a focusing group GF, and an image-side group GC disposed closer to an image than the focusing group GF are disposed in the succeeding lens group GB (step ST3). Next, it is configured so that the focusing group GF moves toward the image on the optical axis, upon focusing from an infinity object to a short distance object (step ST4). Each lens is disposed in a lens barrel so as to satisfy at least the conditional expression (1-2) and the conditional expression (2) (step ST5). According to such a manufacturing method, a zoom optical system having a small variation in angle of view upon focusing can be manufactured.

EXAMPLES

Zoom optical systems ZL according to Examples of each embodiment are described with reference to the drawings. FIGS. 1, 4, 7, 10, 13, 16 and 19 are sectional views showing the configurations and refractive power allocations of zoom optical systems ZL {ZL(1) to ZL(7)} according to First to Seventh Examples. In the sectional views of the zoom optical systems ZL(1) to ZL(7) according to First to Seventh Examples, the moving direction upon focusing on the optical axis of the focusing group from the infinity to a short distance object is indicated by an arrow accompanied by characters "FOCUSING". In the sectional views of the zoom optical systems ZL(1) to ZL(7) according to First to Seventh Examples, the moving direction of each lens group on the optical axis upon zooming from the wide angle end state (W) to the telephoto end state (T) is indicated by an arrow.

In FIGS. 1, 4, 7, 10, 13, 16 and 19, each lens group and each group are represented by a combination of a symbol G and a numeral, and each lens is represented by a combination of a symbol L and a numeral. In this case, to prevent complication due to increase in the types and numbers of symbols and numerals, the lens groups and the like are represented using the combinations of symbols and numerals independently on an Example-by-Example basis. Accordingly, even when the same combination of a symbol and a numeral is used between Examples, such usage does not mean the same configuration.

Tables 1 to 7 are shown below. Among these tables, Table 1 is a table showing each data item in First Example, Table 2 is that in Second Example, Table 3 is that in Third Example, Table 4 is that in Fourth Example, Table 5 is that in Fifth Example, Table 6 is that in Sixth Example, and Table 7 is that in Seventh Example. In each Example, as targets of calculation of aberration characteristics, d-line (wavelength λ=587.6 nm), and g-line (wavelength λ=435.8 nm) are selected.

In the table of [General Data], f indicates the focal length of the entire lens system, FNO indicates the f-number, 2ω indicates the angle of view (the unit is ° (degrees), and ω indicates the half angle of view), and Y indicates the image height. TL indicates a distance obtained by adding Bf to the distance from the lens foremost surface to the lens last surface on the optical axis upon focusing on infinity. Bf indicates the distance (back focus) from the lens last surface to the image surface I on the optical axis upon focusing on infinity. Note that these values are indicated for corresponding zoom states at the wide-angle end (W), and the telephoto end (T). In the table of [General Data], fBaw indicates the focal length of the image-side lens group (the lens group consisting of the lenses in the succeeding lens group or in the focusing group) in the wide angle end state. fCw indicates the focal length of the image-side group in the wide angle end state. fF indicates the focal length of the focusing group. βBaw: a magnification of the image-side lens group (the lens group consisting of lenses in the succeeding lens group that are disposed closer to the image than the focusing group or in the focusing group) in the wide angle end state. βFw indicates the magnification of the focusing group in the wide angle end state. STLw indicates the distance on the optical axis from the lens surface closest to the object to the aperture stop in the zoom optical system in the wide angle end state.

In the table of [Lens Data], Surface Number indicates the order of the optical surface from the object side along the direction in which the ray travels, R indicates the radius of curvature (the surface whose center of curvature resides on the image side is regarded to have a positive value) of each optical surface, D indicates the distance on the optical axis from each optical surface to the next optical surface (or the image surface), nd is the refractive index of the material of the optical member for d-line, and vd indicates the Abbe number of the material of the optical member with reference to d-line. The radius of curvature "∞" indicates a plane or an opening. (Aperture Stop S) indicates an aperture stop S. (Aperture Stop Sa) indicates an auxiliary aperture Sa. The description of the air refractive index nd=1.00000 is omitted. In a case where the optical surface is an aspherical surface, the surface number is assigned * symbol, and the field of the radius of curvature R indicates the paraxial radius of curvature.

In the table of [Aspherical Surface Data], the shape of the aspherical surface indicated in [Lens Data] is indicated by the following expression (A). X(y) indicates the distance (sag amount) from the tangent plane at the vertex of the aspherical surface to the position on the aspherical surface at the height y in the optical axis direction. R indicates the radius of curvature (paraxial radius of curvature) of the reference spherical surface. K indicates the conic constant. Ai indicates the i-th aspherical coefficient. "E−n" indicates "$\times 10^{-n}$". For example, $1.234E{-}05{=}1.234 \times 10^{-5}$. Note that the second-order aspherical coefficient A2 is zero, and the description thereof is omitted. In a case where the fourteenth-order aspherical coefficient A14 is zero, the description thereof is omitted.

$$X(y)=(y^2/R)/\{1+(1-\kappa \times y^2/R^2)^{1/2}\}+A4\times y^4+A6\times y^6+A8\times$$
$$y^8+A10\times y^{10}+A12\times y^{12}+A14\times y^{14} \tag{A}$$

The table of [Variable Distance Data] shows the surface distance at each surface number i where the surface distance is (Di) in the table showing [Lens Data]. The table of [Variable Distance Data] shows the surface distance upon focusing on infinity, the surface distance upon focusing on an intermediate-distance object, and the surface distance upon focusing on a very short distance object.

The table of [Lens Group Data] shows the first surface (the surface closest to the object) and the focal length of each lens group.

Hereinafter, at all the data values, the listed focal length f, radius of curvature R, surface distance D, other lengths and the like are generally represented with "mm" if not otherwise specified. However, even after subjected to proportional scaling in or out, the optical system can achieve equivalent optical performances. Accordingly, the representation is not limited thereto.

The descriptions of the tables so far are common to all the Examples. Redundant descriptions are hereinafter omitted.

First Example

First Example is described with reference to FIGS. 1 to 3A and 3B and Table 1. FIG. 1 is a lens configuration diagram of a zoom optical system according to First Example. The zoom optical system ZL(1) according to First Example consists of, in order from the object on the optical axis: a first lens group G1 having a negative refractive power; a second lens group G2 having a positive refractive power; a third lens group G3 having a positive refractive power; and a fourth lens group G4 having a positive refractive power. Upon zooming from the wide-angle end state (W) to the telephoto end state (T), the first lens group G1 and the second lens group G2 move toward the image on the optical axis, the third lens group G3 and the fourth lens group G4 move toward the object on the optical axis, and the distances between adjacent lenses change. The aperture stop S is disposed in the fourth lens group G4. A sign (+) or (−) assigned to each lens group symbol indicates the refractive power of the corresponding lens group. This indication similarly applies to all the following Examples.

The first lens group G1 consists of, in order from the object on the optical axis: a negative meniscus lens L11 having a convex surface facing the object; a negative meniscus lens L12 having a convex surface facing the object; a biconcave negative lens L13; and a positive meniscus lens L14 having a convex surface facing the object. The negative meniscus lens L11 has the opposite lens surfaces that are aspherical surfaces. The negative meniscus lens L12 has an image-side lens surface that is an aspherical surface. The negative lens L13 is fabricated using optical glass having anomalous dispersion characteristics.

The second lens group G2 consists of a biconvex positive lens L21. The third lens group G3 consists of a cemented lens that consists of a negative meniscus lens L31 having a convex surface facing the object, and a positive meniscus lens L32 having a convex surface facing the object.

The fourth lens group G4 consists of, in order from the object on the optical axis: a cemented lens that consists of a negative meniscus lens L41 having a convex surface facing the object, and a positive meniscus lens L42 having a convex surface facing the object; a cemented lens that consists of a biconcave negative lens L43, and a biconvex positive lens L44; a biconvex positive lens L45; a cemented lens that consists of a negative meniscus lens L46 having a convex surface facing the object, and a positive meniscus lens L47 having a convex surface facing the object; a cemented lens that consists of a biconvex positive lens L48, and a biconcave negative lens L49; and a negative meniscus lens L50 having a concave surface facing the object. An image surface I is disposed on the image side of the fourth lens group G4. An aperture stop S is disposed between the positive meniscus lens L42 and the negative lens L43 in the fourth lens group G4. An auxiliary aperture Sa is disposed between the positive lens L44 and the positive lens L45 of the fourth lens group G4. The negative meniscus lens L50 has an object-side lens surface that is an aspherical surface. The positive lens L45, the positive meniscus lens L47, and the positive lens L48 are fabricated using optical glass having anomalous dispersion characteristics.

In this Example, the first lens group G1, and the second lens group G2 constitute the preceding lens group GA having a negative refractive power as a whole. The third lens group G3, and the fourth lens group G4 constitute a succeeding lens group GB having a positive refractive power as a whole. The third lens group G3 constitutes the focusing group GF in the succeeding lens group GB. The fourth lens group G4 constitutes the image-side group GC in the succeeding lens group GB. In the succeeding lens group GB, lenses disposed closer to the image than the focusing group GF or in the focusing group GF, that is, the lenses of the third lens group G3 and the lenses of the fourth lens group G4, constitute the image-side lens group GBa described above. Upon focusing from an infinity object to a short distance object, the third lens group G3, which constitutes the focusing group GF, moves toward the image on the optical axis. The positive lens L45, the positive meniscus lens L47 and the positive lens L48 of the fourth lens group G4 correspond to a specified lens of the succeeding lens group GB.

The following Table 1 lists values of data on the zoom optical system according to First Example.

TABLE 1

| [General Data] | | | | |
|---|---|---|---|---|

Zooming ratio = 1.62
fBaw = 34.296
fCw = 40.351
fF = 123.557
βBaw = −0.633
βFw = 2.430
STLw = 85.087

| | W | | T | |
|---|---|---|---|---|
| f | 14.4 | | 23.3 | |
| FNO | 2.91 | | 2.91 | |
| 2ω | 115.2 | | 84.8 | |
| Y | 21.6 | | 21.6 | |
| TL | 144.665 | | 134.869 | |
| Bf | 21.126 | | 34.082 | |

| [Lens Data] | | | | | |
|---|---|---|---|---|---|
| Surface Number | R | D | nd | νd | |
| 1* | 577.31 | 3.00 | 1.588870 | 61.1 | |
| 2* | 16.50 | 11.57 | | | |
| 3 | 50.25 | 2.00 | 1.820980 | 42.5 | |
| 4* | 27.05 | 12.09 | | | |
| 5 | −43.22 | 1.50 | 1.497820 | 82.6 | |
| 6 | 58.13 | 0.20 | | | |
| 7 | 39.37 | 5.42 | 1.673000 | 38.2 | |
| 8 | 1346.43 | (D8) | | | |
| 9 | 8106.07 | 3.06 | 1.663820 | 27.4 | |
| 10 | −101.81 | (D10) | | | |
| 11 | 38.33 | 2.30 | 1.963000 | 24.1 | |
| 12 | 20.48 | 5.15 | 1.647690 | 33.7 | |
| 13 | 291.48 | (D13) | | | |
| 14 | 23.67 | 1.20 | 1.846660 | 23.7 | |
| 15 | 17.23 | 5.92 | 1.516800 | 64.1 | |
| 16 | 505.08 | 1.12 | | | |
| 17 | ∞ | 2.83 | | | (Aperture Stop S) |
| 18 | −50.94 | 1.20 | 1.953750 | 32.3 | |
| 19 | 23.48 | 5.62 | 1.846660 | 23.7 | |
| 20 | −62.85 | 0.40 | | | |
| 21 | ∞ | −0.30 | | | (Aperture Stop Sa) |
| 22 | 24.30 | 6.05 | 1.497820 | 82.6 | |
| 23 | −54.67 | 0.20 | | | |
| 24 | 50.54 | 1.20 | 1.834810 | 42.7 | |
| 25 | 17.41 | 4.82 | 1.497820 | 82.6 | |
| 26 | 120.47 | 0.20 | | | |
| 27 | 32.87 | 6.32 | 1.497820 | 82.6 | |
| 28 | −19.70 | 1.20 | 1.834810 | 42.7 | |
| 29 | 82.19 | 5.21 | | | |
| 30* | −59.71 | 3.50 | 1.860999 | 37.0 | |
| 31 | −59.99 | Bf | | | |

| [Aspherical Surface Data] | | | | | |
|---|---|---|---|---|---|

1st Surface
κ = 1.000, A4 = 1.20E−05, A6 = −1.77E−08, A8 = 1.69E−11,
A10 = −8.86E−15, A12 = 1. 98E−18
2nd Surface
κ = 0.000, A4 = 7.01E−06, A6 = 2.78E−08, A8 = 3.97E−11,
A10 = −5.16E−13, A12 = 6.21E−16

TABLE 1-continued

4th Surface
κ = 1.363, A4 = 1.35E–05, A6 = –1.71E–09, A8 = 5.11E–11,
A10 = 3.88E–13, A12 = 1.19E–18
30th Surface
κ = 1.000, A4 = –2.05E–05, A6 = –5.87E–08, A8 = 3.00E–10,
A10 = –3.42E–12, A12 = 7.38E–15

[Variable Distance Data]

| | W | M1 | M2 | T |
|---|---|---|---|---|
| Upon focusing on infinity | | | | |
| Focal length | 14.40 | 16.00 | 18.00 | 23.30 |
| Distance | ∞ | ∞ | ∞ | ∞ |
| D8 | 1.60 | 1.41 | 1.29 | 0.35 |
| D10 | 17.64 | 7.99 | 4.40 | 1.50 |
| D13 | 11.32 | 9.18 | 8.09 | 5.95 |
| Bf | 21.13 | 26.37 | 29.24 | 34.08 |
| Upon focusing on an intermediate distance object | | | | |
| Magnification | 0.025 | 0.025 | 0.025 | 0.025 |
| Distance | 555 | 699 | 781 | 915 |
| D8 | 1.60 | 1.41 | 1.29 | 0.35 |
| D10 | 18.52 | 8.83 | 5.11 | 2.12 |
| D13 | 10.36 | 8.28 | 7.25 | 5.15 |
| Bf | 21.13 | 26.37 | 29.24 | 34.08 |
| Upon focusing on a very short distance object | | | | |
| Magnification | 0.094 | 0.112 | 0.124 | 0.144 |
| Distance | 135 | 142 | 144 | 145 |
| D8 | 1.60 | 1.41 | 1.29 | 0.35 |
| D10 | 21.51 | 12.04 | 8.56 | 5.80 |
| D13 | 7.45 | 5.13 | 3.93 | 1.65 |
| Bf | 21.13 | 26.37 | 29.24 | 34.08 |

[Lens Group Data]

| Group | First surface | Focal length |
|---|---|---|
| G1 | 1 | –16.41 |
| G2 | 9 | 151.48 |
| G3 | 11 | 123.56 |
| G4 | 14 | 40.35 |

Figure 2A:
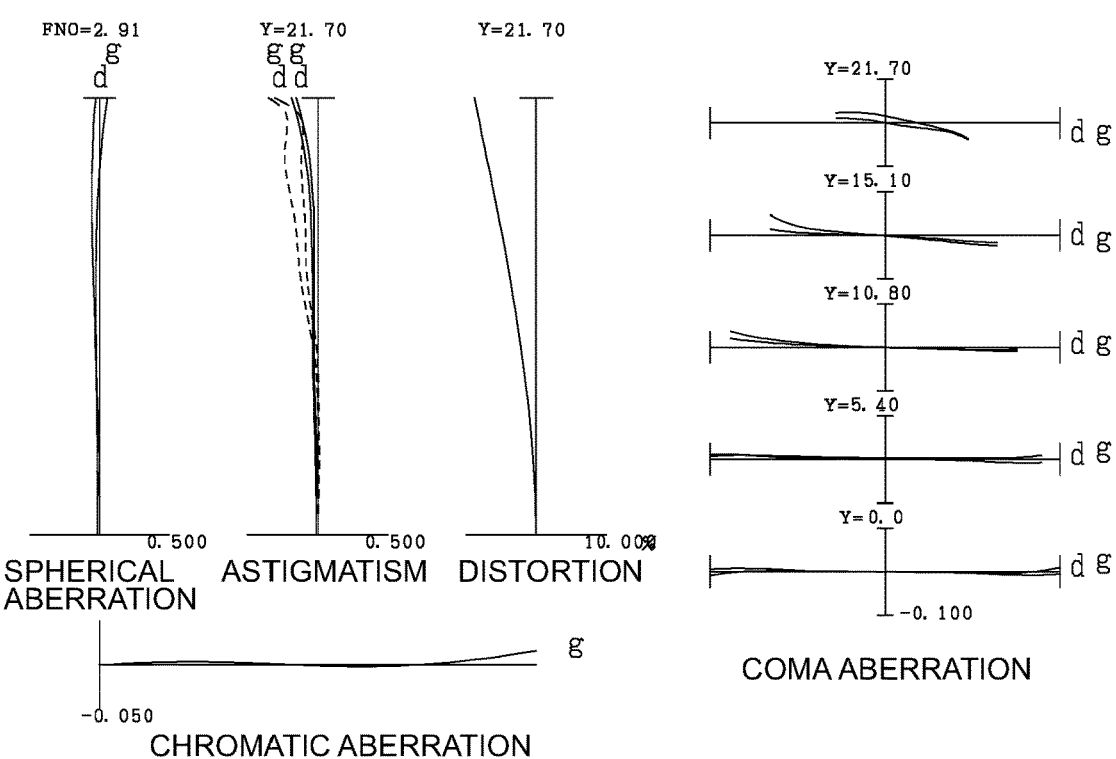
FIGS. 2A and 2B are graphs respectively showing various aberrations of the zoom optical system according to First Example upon focusing on infinity in a wide-angle end state and a telephoto end state.
Figure 2B:
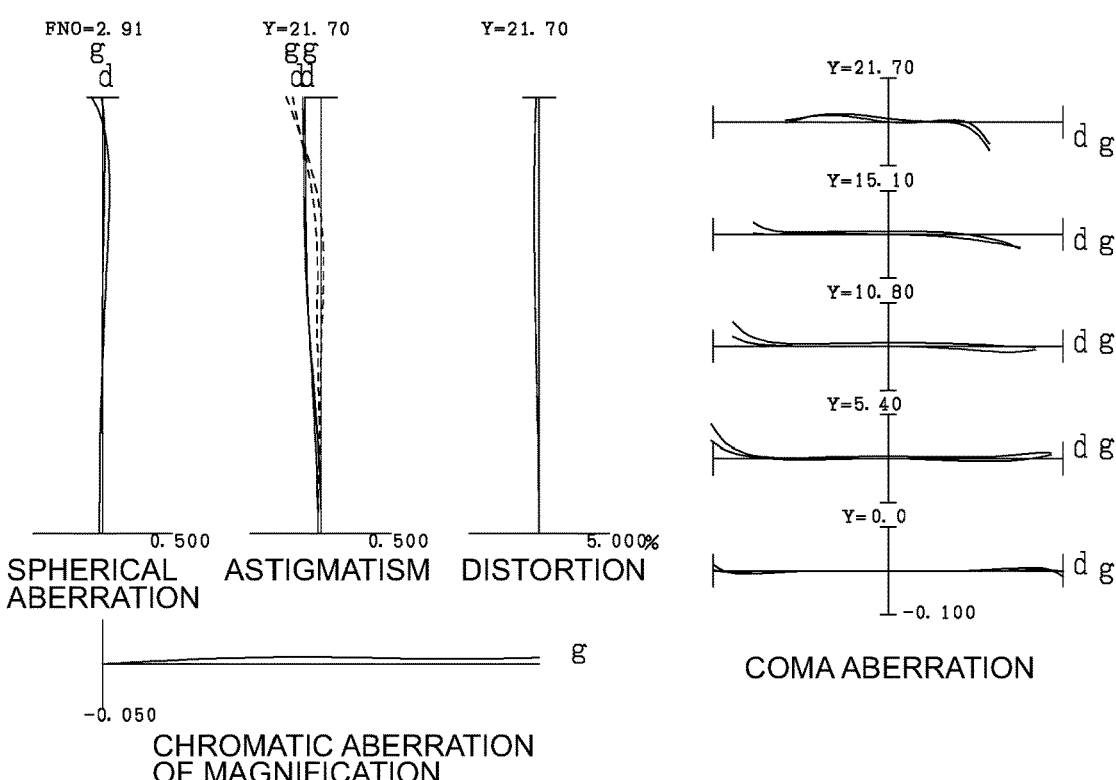
Figure 3A:
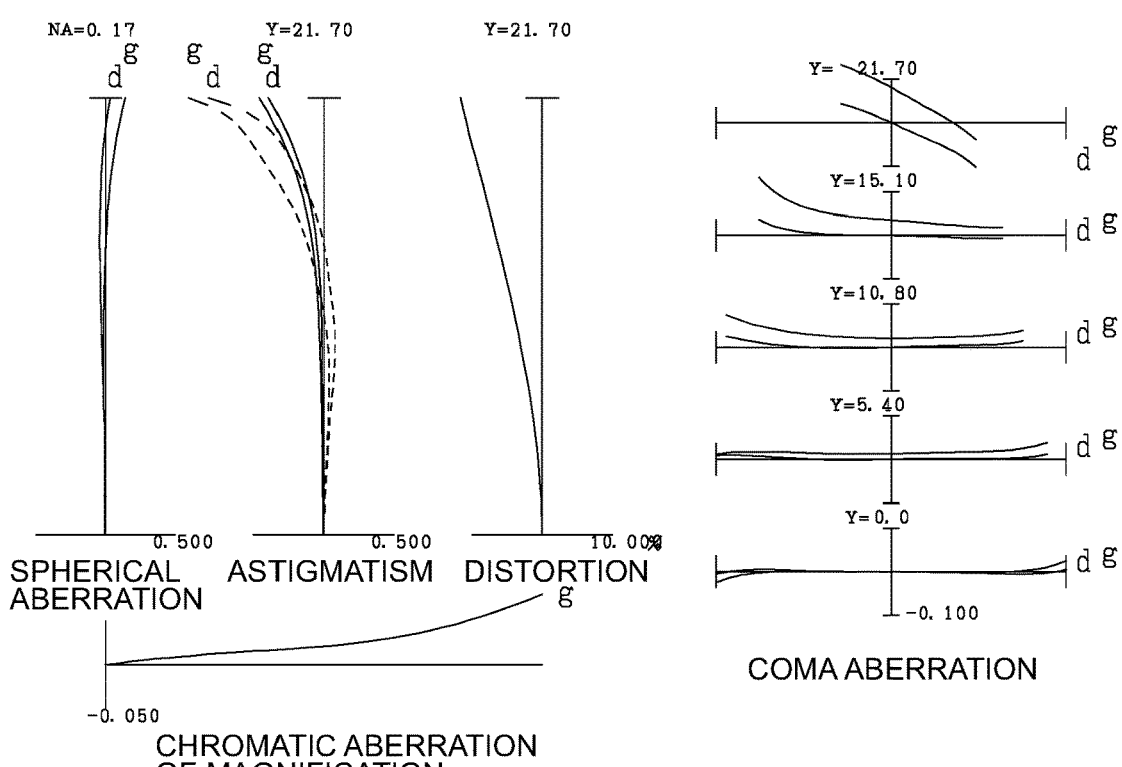
FIGS. 3A and 3B are graphs respectively showing various aberrations of the zoom optical system according to First Example upon focusing on a short distance object in the wide-angle end state and the telephoto end state.
Figure 3B:
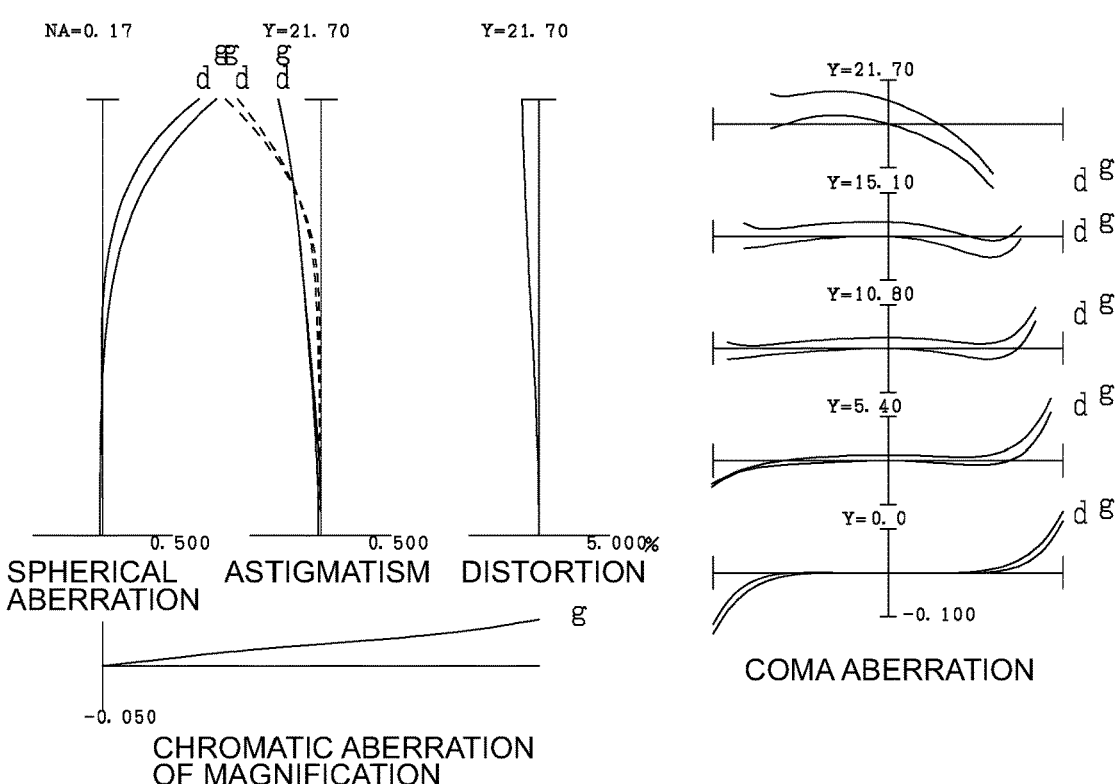

FIG. 2A shows various aberration graphs of the zoom optical system according to First Example upon focusing on infinity in the wide angle end state. FIG. 2B shows various aberration graphs of the zoom optical system according to First Example upon focusing on infinity in the telephoto end state. FIG. 3A shows various aberration graphs of the zoom optical system according to First Example upon focusing on a short distance object in the wide angle end state. FIG. 3B shows various aberration graphs of the zoom optical system according to First Example upon focusing on the short distance object in the telephoto end state. In each aberration graph upon focusing on infinity, FNO indicates the f-number, and Y indicates the image height. In each aberration graph upon focusing on the short distance object, NA indicates the numerical aperture, and Y indicates the image height. Note that the spherical aberration graph indicates the value of the f-number or the numerical aperture that corresponds to the maximum diameter. The astigmatism graph and the distortion graph each indicate the maximum value of the image height. The coma aberration graph indicates the value of the corresponding image height. The symbol d indicates d-line (wavelength λ=587.6 nm). The symbol g indicates g-line (wavelength λ=435.8 nm). In the astigmatism graph, a solid line indicates a sagittal image surface, and a broken line indicates a meridional image surface. Note that also in the following aberration graphs in each Example, symbols similar to those in this Example are used, and redundant description is omitted.

The various aberration graphs show that the zoom optical system according to First Example favorably corrects various aberrations, and exerts an excellent imaging performance, in the entire range from focusing on infinity to focusing on the short distance object. Accordingly, even in the case of focusing on the short distance object, the variation in angle of view upon focusing can be reduced while securing a favorable optical performance.

Second Example

Figure 4:
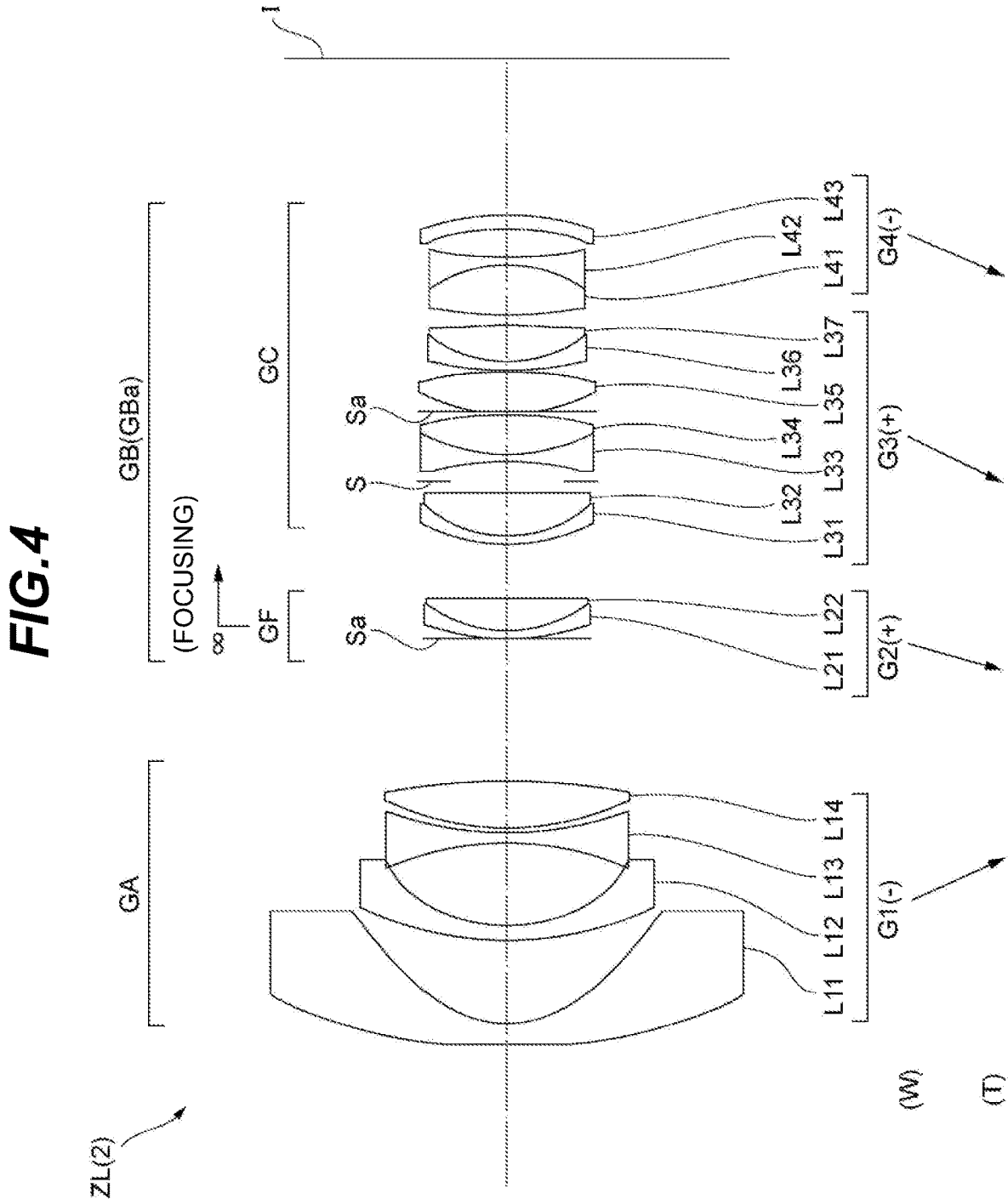
FIG. 4 shows a lens configuration of a zoom optical system according to Second Example.

Second Example is described with reference to FIGS. 4 to 6A and 6B and Table 2. FIG. 4 is a lens configuration diagram of a zoom optical system according to Second Example. The zoom optical system ZL(2) according to Second Example consists of, in order from the object on the optical axis: a first lens group G1 having a negative refractive power; a second lens group G2 having a positive refractive power; a third lens group G3 having a positive refractive power; and a fourth lens group G4 having a negative refractive power. Upon zooming from the wide-angle end state (W) to the telephoto end state (T), the first lens group G1 moves toward the image on the optical axis, the second lens group G2, the third lens group G3 and the fourth lens group G4 move toward the object on the optical axis, and the distances between adjacent lenses change. The aperture stop S is disposed in the third lens group G3.

The first lens group G1 consists of, in order from the object on the optical axis: a negative meniscus lens L11 having a convex surface facing the object; a negative meniscus lens L12 having a convex surface facing the object; a biconcave negative lens L13; and a biconvex positive lens L14. The negative meniscus lens L11 has the opposite lens surfaces that are aspherical surfaces. The negative meniscus lens L12 has an image-side lens surface that is an aspherical surface. The negative lens L13 is fabricated using optical glass having anomalous dispersion characteristics.

The second lens group G2 consists of a cemented lens that consists of a negative meniscus lens L21 having a convex surface facing the object, and a positive meniscus lens L22 having a convex surface facing the object. An auxiliary aperture Sa is disposed adjacent to the object side of the negative meniscus lens L21. Upon zooming or focusing, the auxiliary aperture Sa moves with the second lens group G2 on the optical axis.

The third lens group G3 consists of, in order from the object on the optical axis: a cemented lens that consists of a negative meniscus lens L31 having a convex surface facing the object, and a positive meniscus lens L32 having a convex surface facing the object; a cemented lens that consists of a biconcave negative lens L33 and a biconvex positive lens L34; a biconvex positive lens L35; and a cemented lens that consists of a negative meniscus lens L36 having a convex surface facing the object, and a biconvex positive lens L37. An aperture stop S is disposed between the positive meniscus lens L32 and the negative lens L33 of the third lens group G3. An auxiliary aperture Sa is disposed between the positive lens L34 and the positive lens L35 of the third lens group G3. The positive lens L35 and the positive lens L37 are fabricated using optical glass having anomalous dispersion characteristics.

The fourth lens group G4 consists of, in order from the object on the optical axis: a cemented lens that consists of a biconvex positive lens L41, and a biconcave negative lens L42; and a positive meniscus lens L43 having a concave surface facing the object. An image surface I is disposed on the image side of the fourth lens group G4. The positive meniscus lens L43 has an object-side lens surface that is an aspherical surface. The positive lens L41 is fabricated using optical glass having anomalous dispersion characteristics.

In this Example, the first lens group G1 constitutes the preceding lens group GA having a negative refractive power as a whole. The second lens group G2, the third lens group G3, and the fourth lens group G4 constitute a succeeding lens group GB having a positive refractive power as a whole. The second lens group G2 constitutes the focusing group GF in the succeeding lens group GB. The third lens group G3 and the fourth lens group G4 constitute the image-side group GC in the succeeding lens group GB. In the succeeding lens group GB, lenses disposed closer to the image than the focusing group GF or in the focusing group GF, that is, the lenses of the second lens group G2, the lenses of the third lens group G3 and the lenses of the fourth lens group G4, constitute the image-side lens group GBa described above. Upon focusing from an infinity object to a short distance object, the second lens group G2, which constitutes the focusing group GF, moves toward the image on the optical axis. The positive lens L35 and the positive lens L37 of the third lens group G3, and the positive lens L41 of the fourth lens group G4 correspond to a specified lens of the succeeding lens group GB.

The following Table 2 lists values of data on the zoom optical system according to Second Example.

TABLE 2

[General Data]

Zooming ratio = 1.62
fBaw = 32.710
fCw = 43.782
fF = 88.43
βBaw = −0.671
βFw = 5.116
STLw = 78.53

|  | W | T |
|---|---|---|
| f | 14.4 | 23.3 |
| FNO | 2.91 | 2.91 |
| 2ω | 115.2 | 84.8 |
| Y | 21.6 | 21.6 |
| TL | 137.42 | 129.49 |
| Bf | 21.81 | 34.22 |

[Lens Data]

| Surface Number | R | D | nd | vd | |
|---|---|---|---|---|---|
| 1* | 211.83 | 3.00 | 1.588870 | 61.1 | |
| 2* | 16.00 | 11.62 | 1.820980 | 42.5 | |
| 3 | 48.68 | 2.00 | | | |
| 4* | 25.71 | 11.53 | 1.497820 | 82.6 | |
| 5 | −43.59 | 1.50 | | | |
| 6 | 54.13 | 0.57 | 1.625844 | 34.2 | |
| 7 | 40.33 | 6.61 | | | |
| 8 | −86.60 | (D8) | 1.963000 | 24.1 | (Aperture |
| 9 | ∞ | 0.00 | | | Stop Sa) |
| 10 | 36.98 | 1.10 | | | |
| 11 | 19.61 | 4.30 | 1.680196 | 30.7 | |
| 12 | 1248.24 | (D12) | 1.846660 | 23.8 | |
| 13 | 26.09 | 1.10 | | | |
| 14 | 17.50 | 6.20 | 1.489456 | 69.9 | |
| 15 | 1516.29 | 1.54 | 1.953750 | 32.3 | (Aperture |
| 16 | ∞ | 2.69 | | | Stop S) |
| 17 | −46.01 | 1.10 | | | |
| 18 | 26.50 | 5.40 | 1.846660 | 23.8 | |
| 19 | −55.71 | 0.37 | 1.497820 | 82.6 | (Aperture |
| 20 | ∞ | −0.30 | | | Stop Sa) |
| 21 | 25.77 | 6.00 | | | |

TABLE 2-continued

| 22 | −51.72 | 0.20 | 1.834810 | 42.7 |
|---|---|---|---|---|
| 23 | 53.18 | 1.10 | | |
| 24 | 17.71 | 5.00 | 1.497820 | 82.6 |
| 25 | −115.03 | (D25) | 1.497820 | 82.6 |
| 26 | 57.48 | 7.00 | 1.834810 | 42.7 |
| 27 | −18.97 | 1.10 | | |
| 28 | 69.64 | 3.91 | | |
| 29* | −41.36 | 2.00 | 1.860999 | 37.1 |
| 30 | −35.53 | Bf | | |

[Aspherical Surface Data]

1st Surface
κ = 1.000, A4 = 1.09E−05, A6 = −1.70E−08, A8 = 1.67E−11, A10 = −8.87E−15, A12 = 1.93E−18
2nd Surface
κ = 0.000, A4 = 9.21E−06, A6 = 2.31E−08, A8 = 1.30E−11, A10 = −4.06E−13, A12 = 4.84E−16
4th Surface
κ = 1.318, A4 = 1.28E−05, A6 = −2.13E−09, A8 = 9.99E−11, A10 = 8.40E−14, A12 = 6.41E−16
29th Surface
κ = 1.000, A4 = −1.74E−05, A6 = − 5.18E−08, A8 = 1.22E−10, A10 = −2.24E−12, A12 = 2.49E−15

[Variable Distance Data]

| | W | M1 | M2 | T |
|---|---|---|---|---|
| | | Upon focusing on infinity | | |
| Focal length | 14.40 | 16.00 | 18.00 | 23.30 |
| Distance | ∞ | ∞ | ∞ | ∞ |
| D8 | 19.84 | 14.93 | 10.08 | 1.68 |
| D12 | 7.63 | 7.20 | 6.53 | 5.03 |
| D25 | 1.50 | 1.62 | 1.79 | 1.92 |
| Bf | 21.81 | 24.03 | 26.72 | 34.22 |
| | | Upon focusing on an intermediate distance object | | |
| Magnification | 0.025 | 0.025 | 0.025 | 0.025 |
| Distance | 547 | 611 | 692 | 904 |
| D8 | 20.67 | 15.70 | 10.78 | 2.26 |
| D12 | 6.80 | 6.43 | 5.83 | 4.44 |
| D25 | 1.50 | 1.62 | 1.79 | 1.92 |
| Bf | 21.81 | 24.03 | 26.72 | 34.22 |
| | | Upon focusing on a very short distance object | | |
| Magnification | 0.091 | 0.099 | 0.110 | 0.142 |
| Distance | 136 | 139 | 141 | 144 |
| D8 | 22.71 | 17.82 | 13.02 | 4.81 |
| D12 | 4.76 | 4.30 | 3.59 | 1.90 |
| D25 | 1.50 | 1.62 | 1.79 | 1.92 |
| Bf | 21.81 | 24.03 | 26.72 | 34.22 |

[Lens Group Data]

| Group | First surface | Focal length |
|---|---|---|
| G1 | 1 | −21.48 |
| G2 | 9 | 88.43 |
| G3 | 13 | 32.84 |
| G4 | 26 | −65.35 |

Figure 5A:
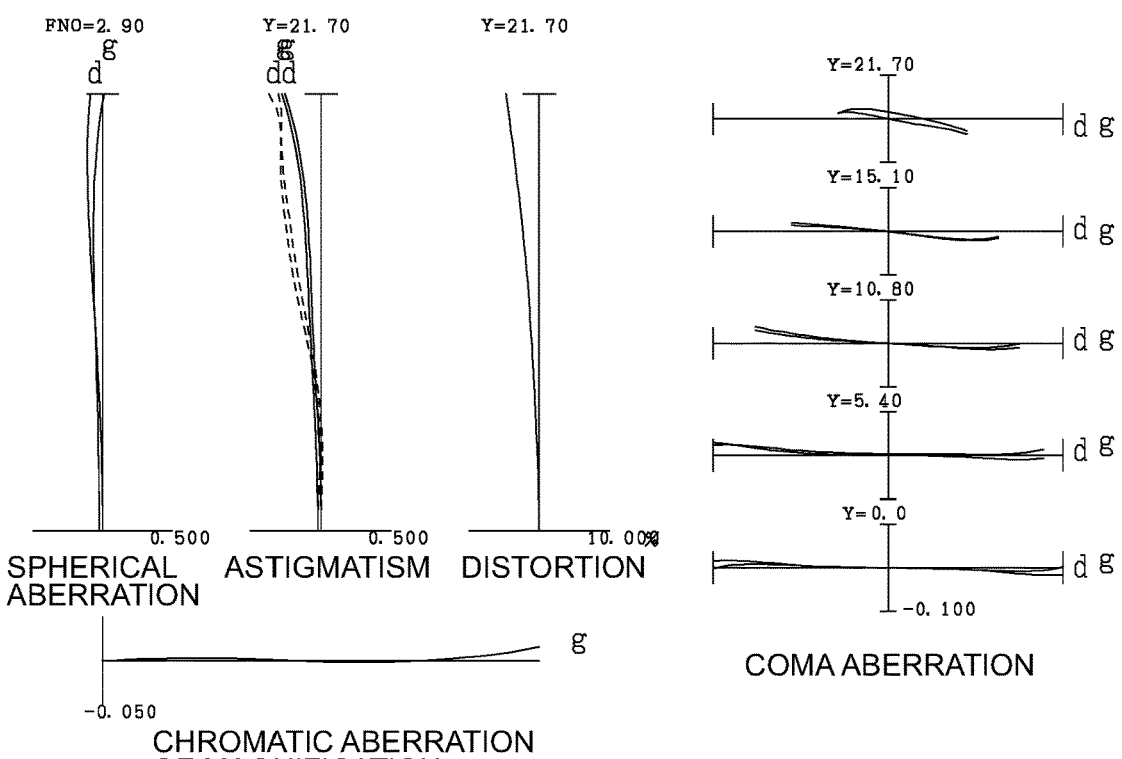
FIGS. 5A and 5B are graphs respectively showing various aberrations of the zoom optical system according to Second Example upon focusing on infinity in a wide-angle end state and a telephoto end state.
Figure 5B:
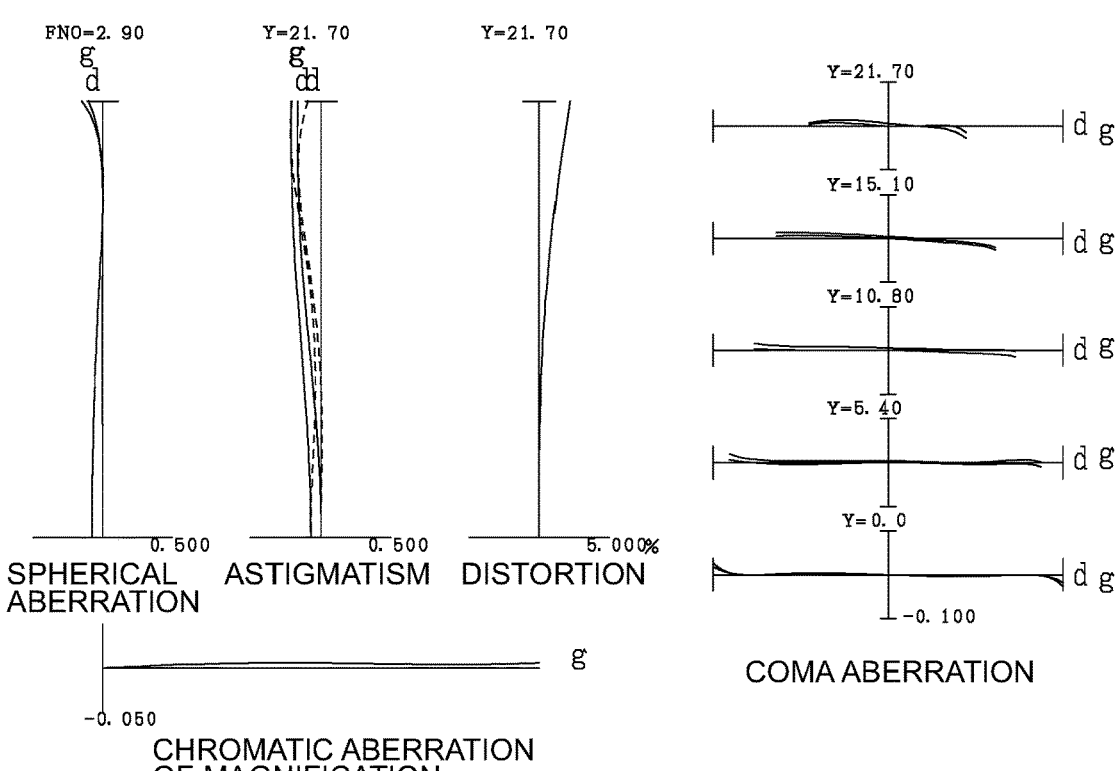
Figure 6A:
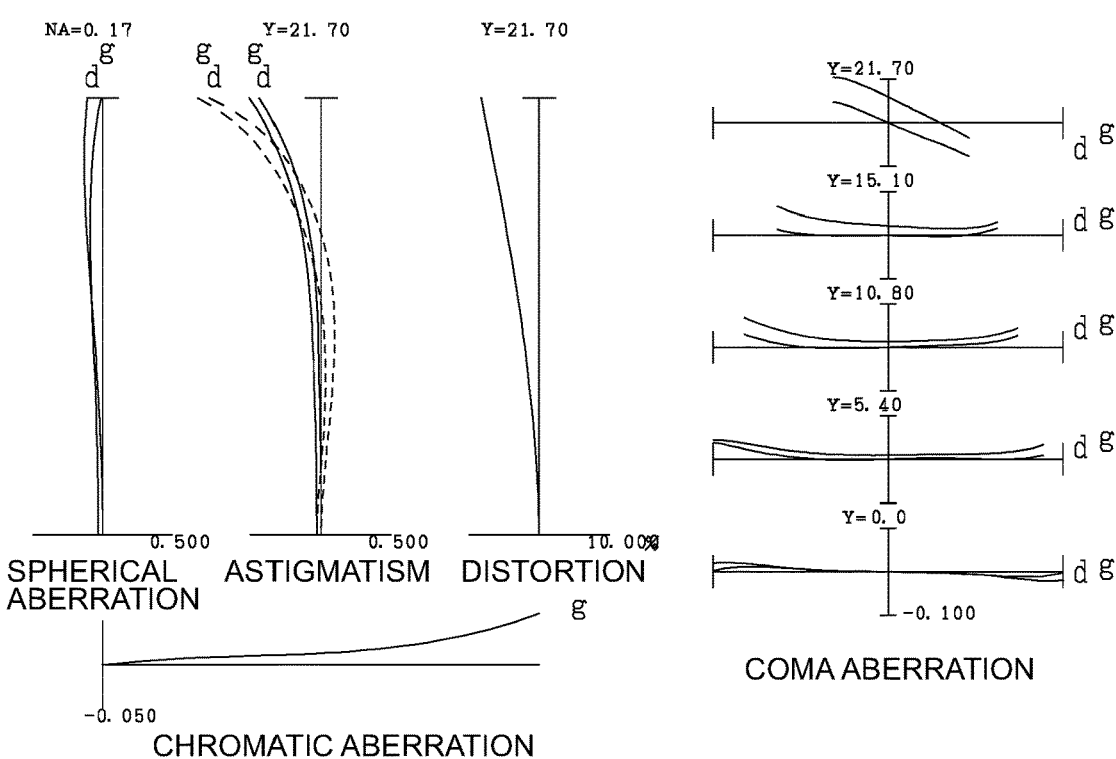
FIGS. 6A and 6B are graphs respectively showing various aberrations of the zoom optical system according to Second Example upon focusing on a short distance object in the wide-angle end state and the telephoto end state.
Figure 6B:
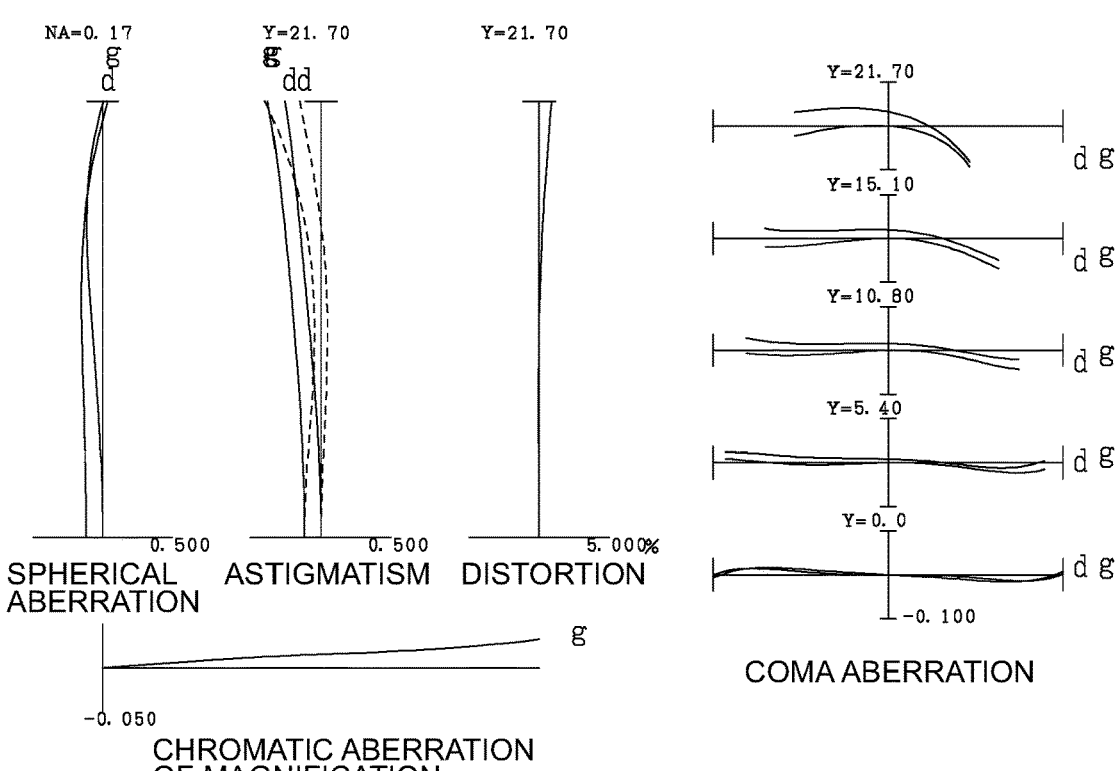

FIG. 5A shows various aberration graphs of the zoom optical system according to Second Example upon focusing on infinity in the wide angle end state. FIG. 5B shows various aberration graphs of the zoom optical system according to Second Example upon focusing on infinity in the telephoto end state. FIG. 6A shows various aberration graphs of the zoom optical system according to Second Example upon focusing on a short distance object in the wide angle end state. FIG. 6B shows various aberration graphs of the zoom optical system according to Second Example upon focusing on the short distance object in the telephoto end state. The various aberration graphs show that the zoom optical system according to Second Example favorably corrects various aberrations, and exerts an excellent imaging performance, in the entire range from focusing on infinity to focusing on the short distance object. Accordingly, even in the case of focusing on the short distance object, the variation in angle of view upon focusing can be reduced while securing a favorable optical performance.

Third Example

Figure 7:
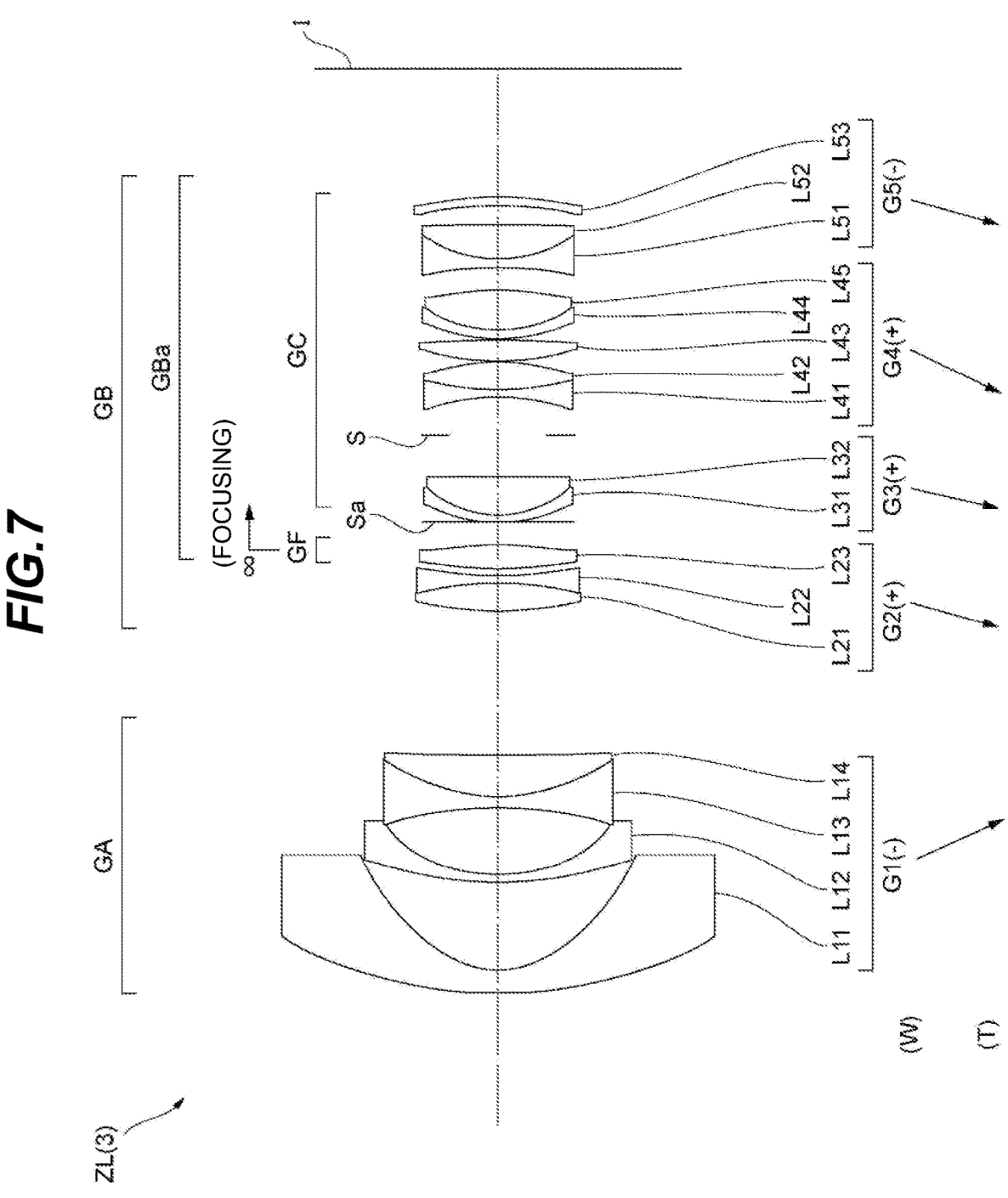
FIG. 7 shows a lens configuration of a zoom optical system according to Third Example.

Third Example is described with reference to FIGS. 7 to 9A and 9B and Table 3. FIG. 7 is a lens configuration diagram of a zoom optical system according to Third Example. The zoom optical system ZL(3) according to Third Example consists of, in order from the object on the optical axis: a first lens group G1 having a negative refractive power; a second lens group G2 having a positive refractive power; a third lens group G3 having a positive refractive power; a fourth lens group G4 having a positive refractive power; and a fifth lens group G5 having a negative refractive power. Upon zooming from the wide-angle end state (W) to the telephoto end state (T), the first lens group G1 moves toward the image on the optical axis, the second lens group G2, the third lens group G3, the fourth lens group G4 and the fifth lens group G5 move toward the object on the optical axis, and the distances between adjacent lenses change. The aperture stop S is disposed between the third lens group G3 and the fourth lens group G4.

The first lens group G1 consists of, in order from the object on the optical axis: a negative meniscus lens L11 having a convex surface facing the object; a negative meniscus lens L12 having a convex surface facing the object; and a cemented lens that consists of a biconcave negative lens L13, and a positive meniscus lens L14 having a convex surface facing the object. The negative meniscus lens L11 has the opposite lens surfaces that are aspherical surfaces. The negative meniscus lens L12 has an image-side lens surface that is an aspherical surface.

The second lens group G2 consists of, in order from the object on the optical axis: a cemented lens that consists of a biconvex positive lens L21, and a biconcave negative lens L22; and a biconvex positive lens L23.

The third lens group G3 consists of a cemented lens that consists of a negative meniscus lens L31 having a convex surface facing the object, and a positive meniscus lens L32 having a convex surface facing the object. An auxiliary aperture Sa is disposed adjacent to the object side of the negative meniscus lens L31. Upon zooming, the auxiliary aperture Sa moves with the third lens group G3 on the optical axis.

The fourth lens group G4 consists of, in order from the object on the optical axis: a cemented lens that consists of a biconcave negative lens L41, and a biconvex positive lens L42; a biconvex positive lens L43; and a cemented lens that consists of a negative meniscus lens L44 having a convex surface facing the object, and a biconvex positive lens L45. An aperture stop S is disposed adjacent to the object side of the negative lens L41. Upon zooming, the aperture stop S moves with the fourth lens group G4 on the optical axis. The positive lens L42 and the positive lens L45 are fabricated using optical glass having anomalous dispersion characteristics.

The fifth lens group G5 consists of, in order from the object on the optical axis: a cemented lens that consists of a biconcave negative lens L51, and a biconvex positive lens L52; and a positive meniscus lens L53 having a concave surface facing the object. An image surface I is disposed on the image side of the fifth lens group G5. The positive meniscus lens L53 has an image-side lens surface that is an aspherical surface.

In this Example, the first lens group G1 constitutes the preceding lens group GA having a negative refractive power as a whole. The second lens group G2, the third lens group G3, the fourth lens group G4 and the fifth lens group G5 constitute a succeeding lens group GB having a positive refractive power as a whole. The positive lens L23 of the second lens group G2 constitutes the focusing group GF in the succeeding lens group GB.

The third lens group G3, the fourth lens group G4 and the fifth lens group G5 constitute the image-side group GC in the succeeding lens group GB. In the succeeding lens group GB, lenses disposed closer to the image than the focusing group GF or in the focusing group GF, that is, the positive lens L23 of the second lens group G2, the lenses of the third lens group G3, the lenses of the fourth lens group G4 and the lenses of the fifth lens group G5, constitute the image-side lens group GBa described above. Upon focusing from an infinity object to a short distance object, the positive lens L23 of the second lens group G2, which constitutes the focusing group GF, moves toward the image on the optical axis. The positive lens L42 and the positive lens L45 of the fourth lens group G4 correspond to a specified lens of the succeeding lens group GB.

The following Table 3 lists values of data on the zoom optical system according to Third Example.

TABLE 3

| [General Data] | | | | |
|---|---|---|---|---|
| Zooming ratio = 1.62 | | | | |
| fBaw = 29.379 | | | | |
| fCw = 47.692 | | | | |
| fF = 53.757 | | | | |
| βBaw = −1.010 | | | | |
| βFw = 13.381 | | | | |
| STLw = 87.283 | | | | |

| | W | | T | |
|---|---|---|---|---|
| f | 14.4 | | 23.3 | |
| FNO | 2.91 | | 2.91 | |
| 2ω | 115.2 | | 84.8 | |
| Y | 21.6 | | 21.6 | |
| TL | 144.802 | | 133.372 | |
| Bf | 20.14 | | 33.38 | |

| [Lens Data] | | | | |
|---|---|---|---|---|
| Surface Number | R | D | nd | vd |
| 1* | 64.00 | 3.50 | 1.588870 | 61.1 |
| 2* | 14.38 | 13.77 | | |
| 3 | 65.31 | 1.20 | 1.860999 | 37.1 |
| 4* | 29.79 | 10.56 | | |
| 5 | −59.81 | 1.80 | 1.433848 | 95.2 |
| 6 | 31.48 | 6.27 | 1.806100 | 33.3 |
| 7 | 346.05 | (D7) | | |
| 8 | 54.45 | 4.40 | 1.698950 | 30.1 |
| 9 | −50.78 | 1.20 | 1.963000 | 24.1 |
| 10 | 68.50 | (D10) | | |
| 11 | 74.83 | 3.56 | 1.728250 | 28.4 |
| 12 | −80.45 | (D12) | | |
| 13 | ∞ | 0.00 | | (Aperture Stop Sa) |
| 14 | 24.95 | 1.20 | 1.834000 | 37.2 |
| 15 | 16.99 | 5.80 | 1.487490 | 70.3 |
| 16 | 638.04 | (D16) | | |
| 17 | ∞ | 5.96 | | (Aperture Stop S) |
| 18 | −36.03 | 1.20 | 1.834810 | 42.7 |

23

TABLE 3-continued

| 19 | 45.21 | 4.32 | 1.497820 | 82.6 |
|---|---|---|---|---|
| 20 | −34.72 | 0.20 | | |
| 21 | 40.69 | 3.42 | 1.749500 | 35.3 |
| 22 | −134.06 | 0.20 | | |
| 23 | 30.00 | 1.20 | 1.834000 | 37.2 |
| 24 | 19.99 | 6.27 | 1.497820 | 82.6 |
| 25 | −51.98 | (D25) | | |
| 26 | −48.67 | 1.20 | 1.953747 | 32.3 |
| 27 | 20.07 | 5.51 | 1.672700 | 32.2 |
| 28 | −149.29 | 2.93 | | |
| 29 | −55.36 | 1.30 | 1.860999 | 37.1 |
| 30* | −46.85 | Bf | | |

[Aspherical Surface Data]

1st Surface
$\kappa$ = 1.000, A4 = −8.79E−06, A6 = 2.17E−08, A8 = −2.83E−11,
A10 = 2.14E−14, A12 = −8.62E−18
A14 = 1.45E−21
2nd Surface
$\kappa$ = 0.000, A4 = −2.40E−06, A6 = 9.20E−09, A8 = 6.55E−11,
A10 = 8.23E−13, A12 = −2.48E−15
A14 = 2.37E−18
4th Surface
$\kappa$ = 2.000, A4 = 5.35E−06, A6 = 1.13E−08, A8 = −1.30E−11,
A10 = −1.43E−13, A12 = 1.36E−15
A14 = −2.65E−18
30th Surface
$\kappa$ = 1.000, A4 = 1.70E−05, A6 = −1.10E−09, A8 = 2.84E−10,
A10 = −1.42E−12, A12 = 3.03E−15

[Variable Distance Data]

| | W | M1 | M2 | T |
|---|---|---|---|---|
| | | Upon focusing on infinity | | |
| Focal length | 14.40 | 18.00 | 20.00 | 23.30 |
| Distance | ∞ | ∞ | ∞ | ∞ |
| D7 | 22.75 | 11.02 | 6.71 | 1.50 |
| D10 | 1.10 | 1.10 | 1.10 | 1.10 |
| D12 | 3.61 | 4.07 | 3.94 | 3.64 |
| D16 | 6.57 | 4.21 | 3.24 | 1.91 |
| D25 | 3.66 | 4.37 | 4.60 | 4.87 |
| Bf | 20.14 | 25.54 | 28.52 | 33.38 |
| | | Upon focusing on an intermediate distance object | | |
| Magnification | 0.025 | 0.025 | 0.025 | 0.025 |
| Distance | 556 | 696 | 776 | 909 |
| D7 | 22.75 | 11.02 | 6.71 | 1.50 |
| D10 | 1.45 | 1.43 | 1.40 | 1.37 |
| D12 | 3.22 | 3.74 | 3.64 | 3.37 |
| D16 | 6.57 | 4.21 | 3.24 | 1.91 |
| D25 | 3.66 | 4.37 | 4.60 | 4.87 |
| Bf | 20.14 | 25.54 | 28.52 | 33.38 |
| | | Upon focusing on a very short distance object | | |
| Magnification | 0.090 | 0.108 | 0.119 | 0.138 |
| Distance | 135 | 142 | 144 | 146 |
| D7 | 22.75 | 11.02 | 6.71 | 1.50 |
| D10 | 2.42 | 2.52 | 2.54 | 2.59 |
| D12 | 2.28 | 2.65 | 2.50 | 2.15 |
| D16 | 6.57 | 4.21 | 3.24 | 1.91 |
| D25 | 3.66 | 4.37 | 4.60 | 4.87 |
| Bf | 20.14 | 25.54 | 28.52 | 33.38 |

[Lens Group Data]

| Group | First surface | Focal length |
|---|---|---|
| G1 | 1 | −20.68 |
| G2 | 8 | 80.626 |
| G3 | 13 | 78.24 |
| G4 | 17 | 30.00 |
| G5 | 26 | −40.50 |

Figure 8A:
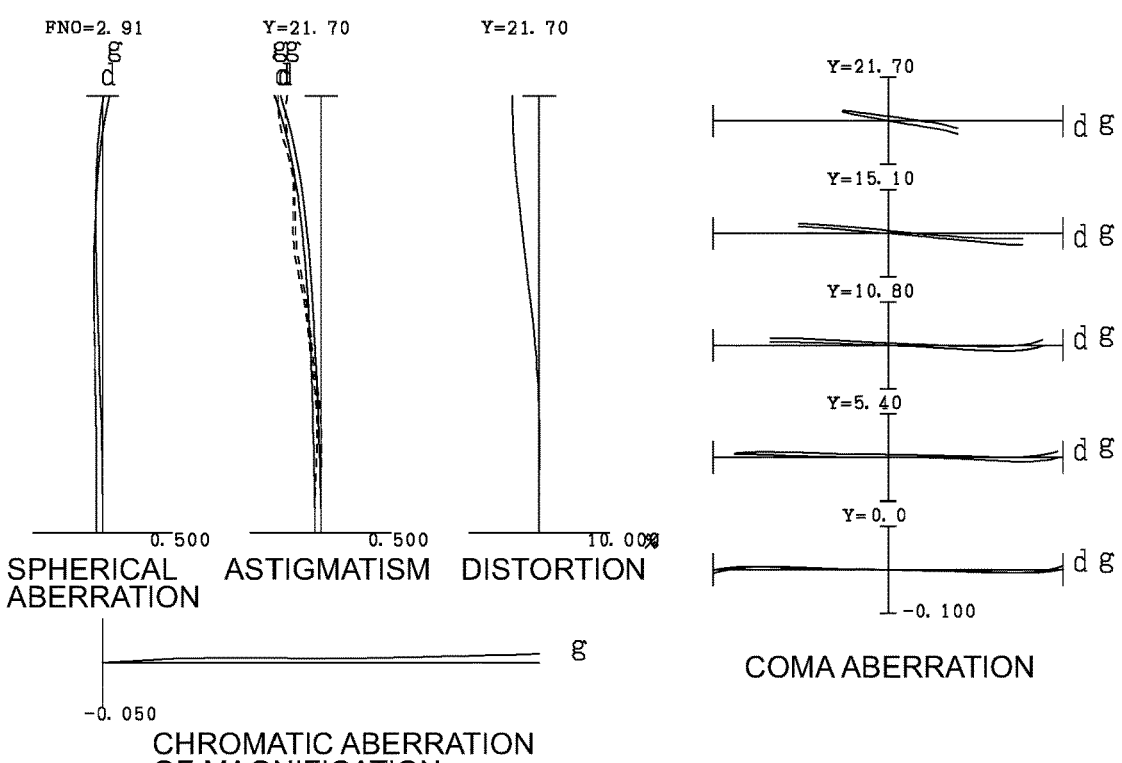
FIGS. 8A and 8B are graphs respectively showing various aberrations of the zoom optical system according to Third Example upon focusing on infinity in a wide-angle end state and a telephoto end state.
Figure 8B:
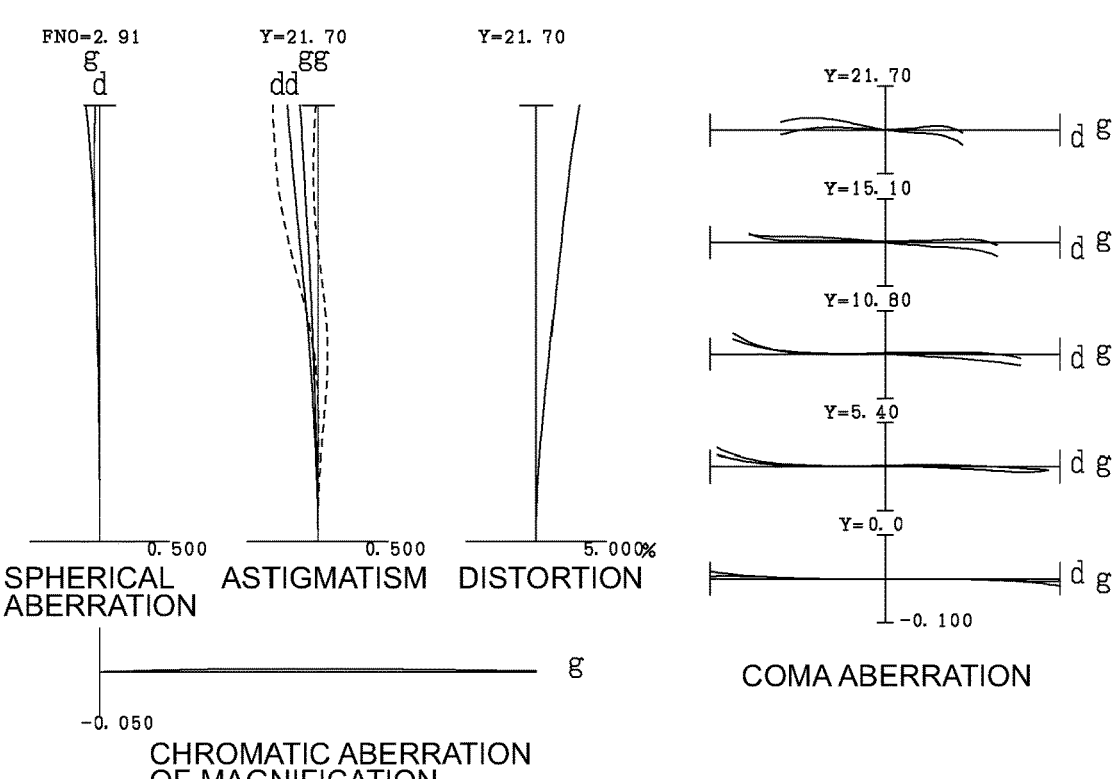

FIG. 8A shows various aberration graphs of the zoom optical system according to Third Example upon focusing on infinity in the wide angle end state. FIG. 8B shows

Figure 9A:
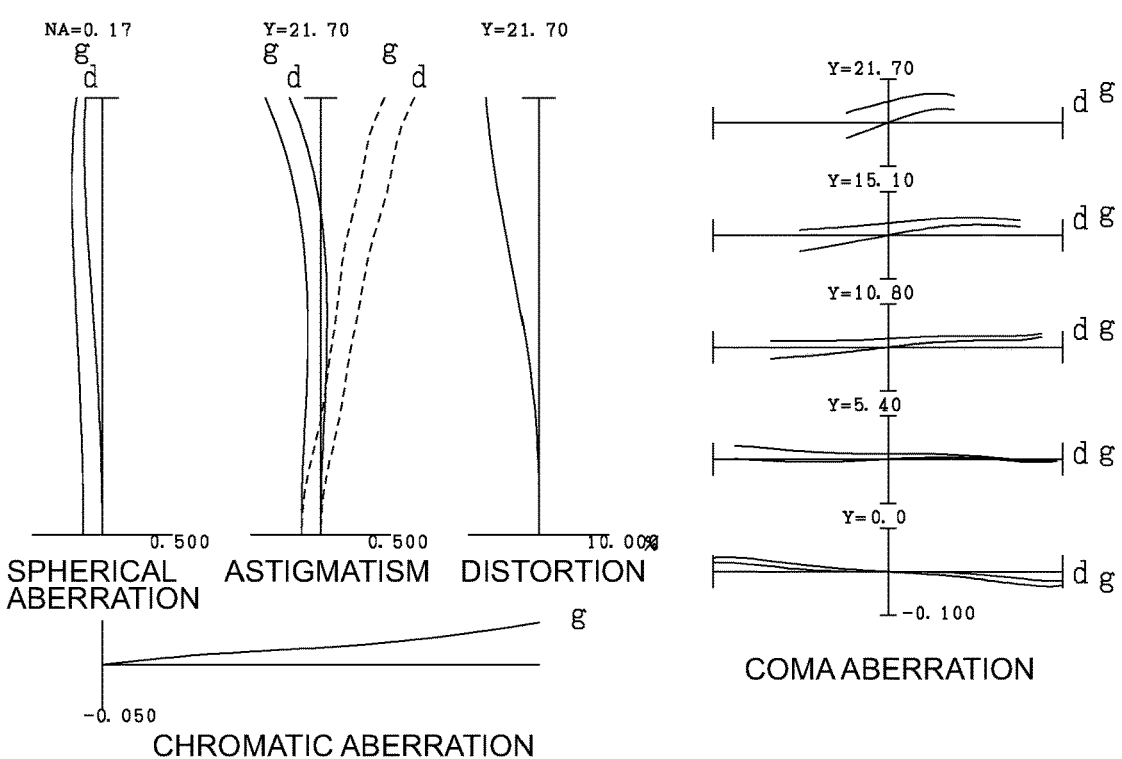
FIGS. 9A and 9B are graphs respectively showing various aberrations of the zoom optical system according to Third Example upon focusing on a short distance object in the wide-angle end state and the telephoto end state.
Figure 9B:
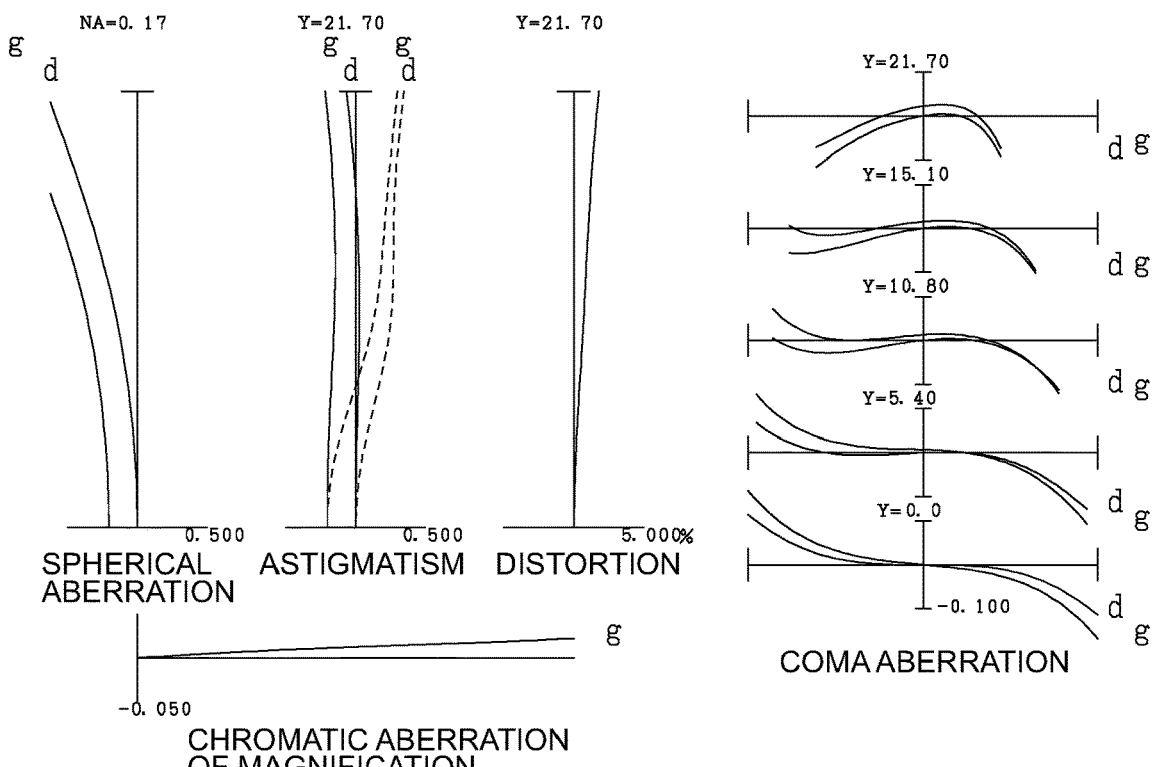

24 various aberration graphs of the zoom optical system according to Third Example upon focusing on infinity in the telephoto end state. FIG. 9A shows various aberration graphs of the zoom optical system according to Third Example upon focusing on a short distance object in the wide angle end state. FIG. 9B shows various aberration graphs of the zoom optical system according to Third Example upon focusing on the short distance object in the telephoto end state. The various aberration graphs show that the zoom optical system according to Third Example favorably corrects various aberrations, and exerts excellent imaging performance, in the entire range from focusing on infinity to focusing on the short distance object. Accordingly, even in the case of focusing on the short distance object, the variation in angle of view upon focusing can be reduced while securing a favorable optical performance.

Fourth Example

Figure 10:
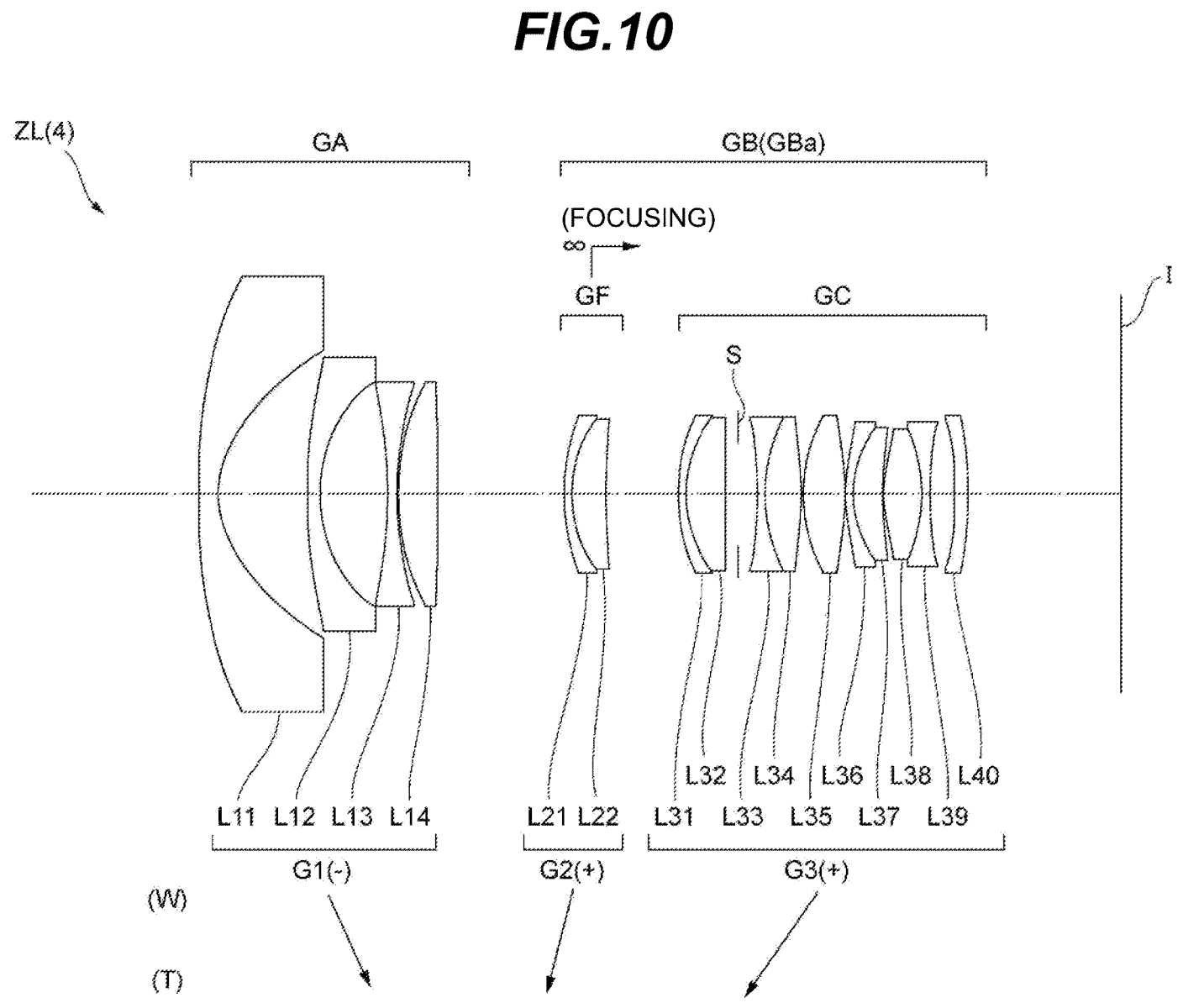

Fourth Example is described with reference to FIGS. 10 to 12A and 12B and Table 4. FIG. 10 is a lens configuration diagram of a zoom optical system according to Fourth Example. The zoom optical system ZL(4) according to Fourth Example consists of, in order from the object on the optical axis: a first lens group G1 having a negative refractive power; a second lens group G2 having a positive refractive power; and a third lens group G3 having a positive refractive power. Upon zooming from the wide-angle end state (W) to the telephoto end state (T), the first lens group G1 moves toward the image on the optical axis, the second lens group G2 and the third lens group G3 move toward the object on the optical axis, and the distances between adjacent lenses change. The aperture stop S is disposed in the third lens group G3.

The first lens group G1 consists of, in order from the object on the optical axis: a negative meniscus lens L11 having a convex surface facing the object; a negative meniscus lens L12 having a convex surface facing the object; a biconcave negative lens L13; and a biconvex positive lens L14. The negative meniscus lens L11 has the opposite lens surfaces that are aspherical surfaces. The negative meniscus lens L12 has an image-side lens surface that is an aspherical surface. The negative lens L13 is fabricated using optical glass having anomalous dispersion characteristics.

The second lens group G2 consists of a cemented lens that consists of a negative meniscus lens L21 having a convex surface facing the object, and a positive meniscus lens L22 having a convex surface facing the object.

The third lens group G3 consists of, in order from the object on the optical axis: a cemented lens that consists of a negative meniscus lens L31 having a convex surface facing the object, and a positive meniscus lens L32 having a convex surface facing the object; a cemented lens that consists of a biconcave negative lens L33 and a biconvex positive lens L34; a biconvex positive lens L35; a cemented lens that consists of a negative meniscus lens L36 having a convex surface facing the object, and a positive meniscus lens L37 having a convex surface facing the object; a cemented lens that consists of a biconvex positive lens L38, and a biconcave negative lens L39; and a positive meniscus lens L40 having a concave surface facing the object. An image surface I is disposed on the image side of the third lens group G3. An aperture stop S is disposed between the positive meniscus lens L32 and the negative lens L33 of the third lens group G3. The positive meniscus lens L40 has an object-side lens surface that is an aspherical surface. The positive lens L35, the positive meniscus lens L37, and the positive lens L38 are fabricated using optical glass having anomalous dispersion characteristics.

In this Example, the first lens group G1 constitutes the preceding lens group GA having a negative refractive power as a whole. The second lens group G2 and the third lens group G3 constitute a succeeding lens group GB having a positive refractive power as a whole. The second lens group G2 constitutes the focusing group GF in the succeeding lens group GB. The third lens group G3 constitutes the image-side group GC in the succeeding lens group GB. In the succeeding lens group GB, lenses disposed closer to the image than the focusing group GF or in the focusing group GF, that is, the lenses of the second lens group G2 and the lenses of the third lens group G3, constitute the image-side lens group GBa described above. Upon focusing from an infinity object to a short distance object, the second lens group G2, which constitutes the focusing group GF, moves toward the image on the optical axis. The positive lens L35, the positive meniscus lens L37 and the positive lens L38 of the third lens group G3 correspond to a specified lens of the succeeding lens group GB.

The following Table 4 lists values of data on the zoom optical system according to Fourth Example.

TABLE 4

[General Data]

Zooming ratio = 1.62
fBaw = 32.727
fCw = 39.261
fF = 105.275
βBaw = −0.674
βFw = 2. 687
STLw = 80.664

|  | W | T |
|---|---|---|
| f | 14.4 | 23.3 |
| FNO | 2.91 | 2.91 |
| 2ω | 115.2 | 84.8 |
| Y | 21.6 | 21.6 |
| TL | 138.261 | 132.362 |
| Bf | 22.54 | 35.22 |

[Lens Data]

| Surface Number | R | D | nd | vd |
|---|---|---|---|---|
| 1* | 151.50 | 3.00 | 1.588870 | 61.1 |
| 2* | 16.04 | 13.37 |  |  |
| 3 | 88.74 | 2.00 | 1.743104 | 49.4 |
| 4* | 27.44 | 10.00 |  |  |
| 5 | −74.77 | 1.50 | 1.497820 | 82.6 |
| 6 | 57.87 | 0.15 |  |  |
| 7 | 37.08 | 5.77 | 1.737999 | 32.3 |
| 8 | −644.56 | (D8) |  |  |
| 9 | 32.64 | 1.10 | 2.000600 | 25.4 |
| 10 | 19.01 | 5.30 | 1.647690 | 33.7 |
| 11 | 210.30 | (D11) |  |  |
| 12 | 28.61 | 1.10 | 1.850000 | 27.0 |
| 13 | 18.19 | 6.08 | 1.593490 | 67.0 |
| 14 | 522.90 | 1.95 |  |  |
| 15 | ∞ | 2.88 |  | (Aperture Stop S) |
| 16 | −66.86 | 1.10 | 1.953750 | 32.3 |
| 17 | 25.72 | 5.35 | 1.846660 | 23.7 |
| 18 | −78.70 | 0.40 |  |  |
| 19 | 24.36 | 6.27 | 1.497820 | 82.6 |
| 20 | −54.74 | 0.15 |  |  |
| 21 | 43.10 | 1.10 | 1.834810 | 42.7 |
| 22 | 16.90 | 4.40 | 1.497820 | 82.6 |
| 23 | 73.95 | 0.20 |  |  |
| 24 | 31.23 | 5.73 | 1.497820 | 82.6 |

TABLE 4-continued

| 25 | −23.20 | 1.10 | 1.834810 | 42.7 |
|---|---|---|---|---|
| 26 | 55.41 | 3.93 |  |  |
| 27* | −68.43 | 2.00 | 1.851080 | 40.1 |
| 28 | −54.15 | Bf |  |  |

[Aspherical Surface Data]

1st Surface
κ = 1.000, A4 = 4.50E−06, A6 = −3.56E−09, A8 = 2.17E−12,
A10 = −5.59E−16, A12 = 0.00E+00
2nd Surface
κ = 0.000, A4 = 3.63E−06, A6 = 7.91E−09, A8 = 2.28E−11,
A10 = −1.36E−13, A12 = 1.21E−16
4th Surface
κ = 0.000, A4 = 2.15E−05, A6 = 2.23E−08, A8 = 2.16E−11,
A10 = 1.77E−13, A12 = −1.00E−16
27th Surface
κ = 1.000, A4 = −2.41E−05, A6 = −4.89E−08, A8 = −1.02E−10,
A10 = −7.59E−13, A12 = −3.14E−15

[Variable Distance Data]

|  | W | M1 | M2 | T |
|---|---|---|---|---|
| | Upon focusing on infinity | | | |
| Focal length | 14.42 | 18.00 | 20.00 | 23.29 |
| Distance | ∞ | ∞ | ∞ | ∞ |
| D8 | 19.11 | 10.32 | 6.94 | 2.78 |
| D11 | 10.68 | 8.35 | 7.26 | 5.72 |
| Bf | 22.54 | 27.74 | 30.59 | 35.22 |
| | Upon focusing on an intermediate distance object | | | |
| Magnification | 0.025 | 0.025 | 0.025 | 0.025 |
| Distance | 553 | 697 | 777 | 909 |
| D8 | 20.03 | 11.12 | 7.69 | 3.46 |
| D11 | 9.77 | 7.55 | 6.52 | 5.04 |
| Bf | 22.54 | 27.74 | 30.59 | 35.22 |
| | Upon focusing on a very short distance object | | | |
| Magnification | 0.088 | 0.106 | 0.117 | 0.135 |
| Distance | 141 | 147 | 149 | 150 |
| D8 | 22.29 | 13.66 | 10.37 | 6.38 |
| D11 | 7.50 | 5.02 | 3.83 | 2.13 |
| Bf | 22.54 | 27.74 | 30.59 | 35.22 |

[Lens Group Data]

| Group | First surface | Focal length |
|---|---|---|
| G1 | 1 | −21.401 |
| G2 | 9 | 105.275 |
| G3 | 12 | 39.261 |

Figure 11A:
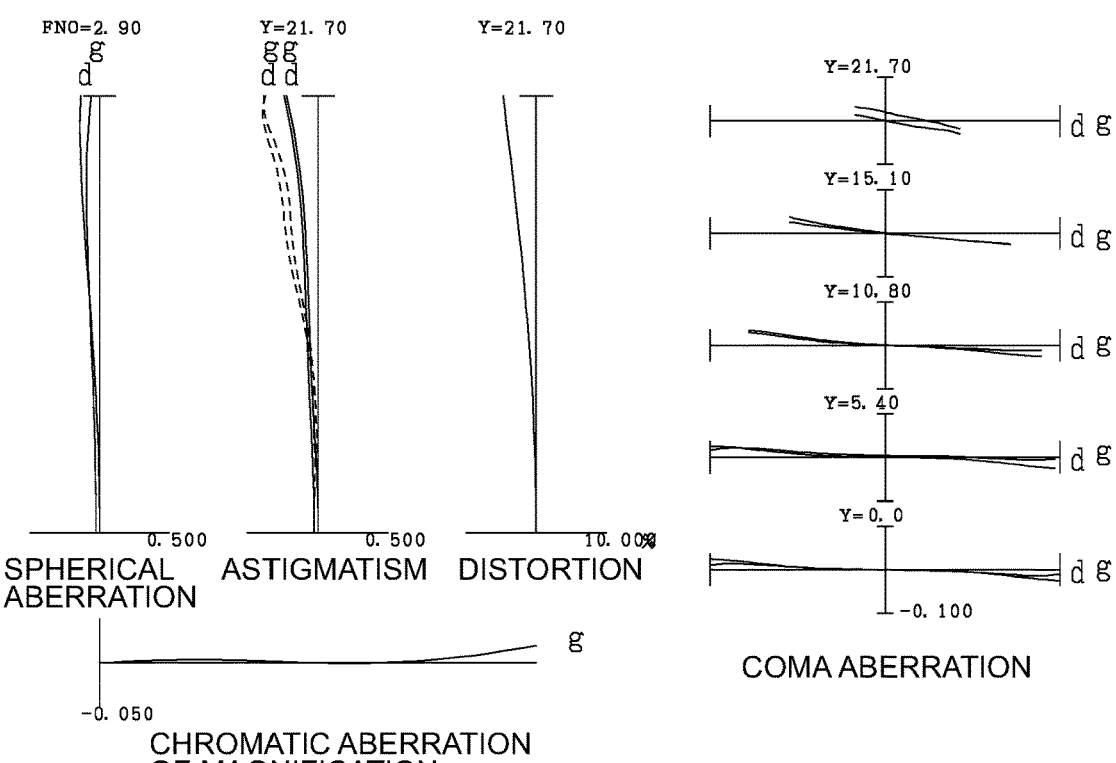
FIGS. 11A and 11B are graphs respectively showing various aberrations of the zoom optical system according to Fourth Example upon focusing on infinity in a wide-angle end state and a telephoto end state.
Figure 11B:
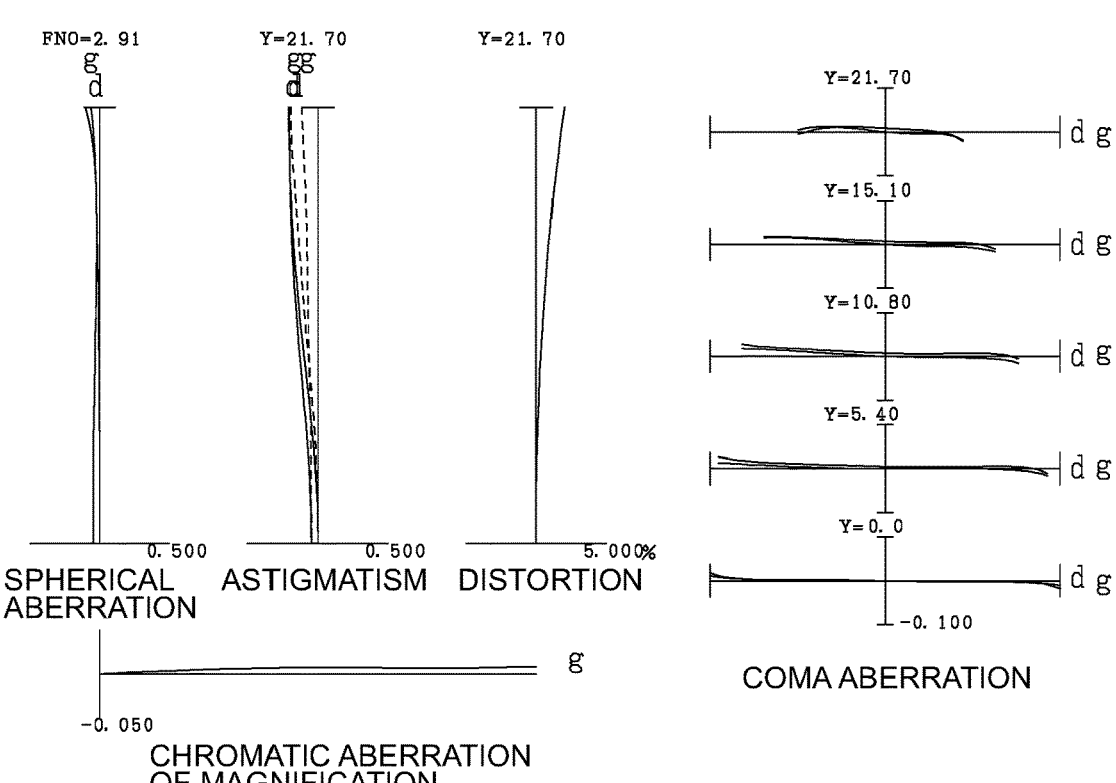
Figure 12A:
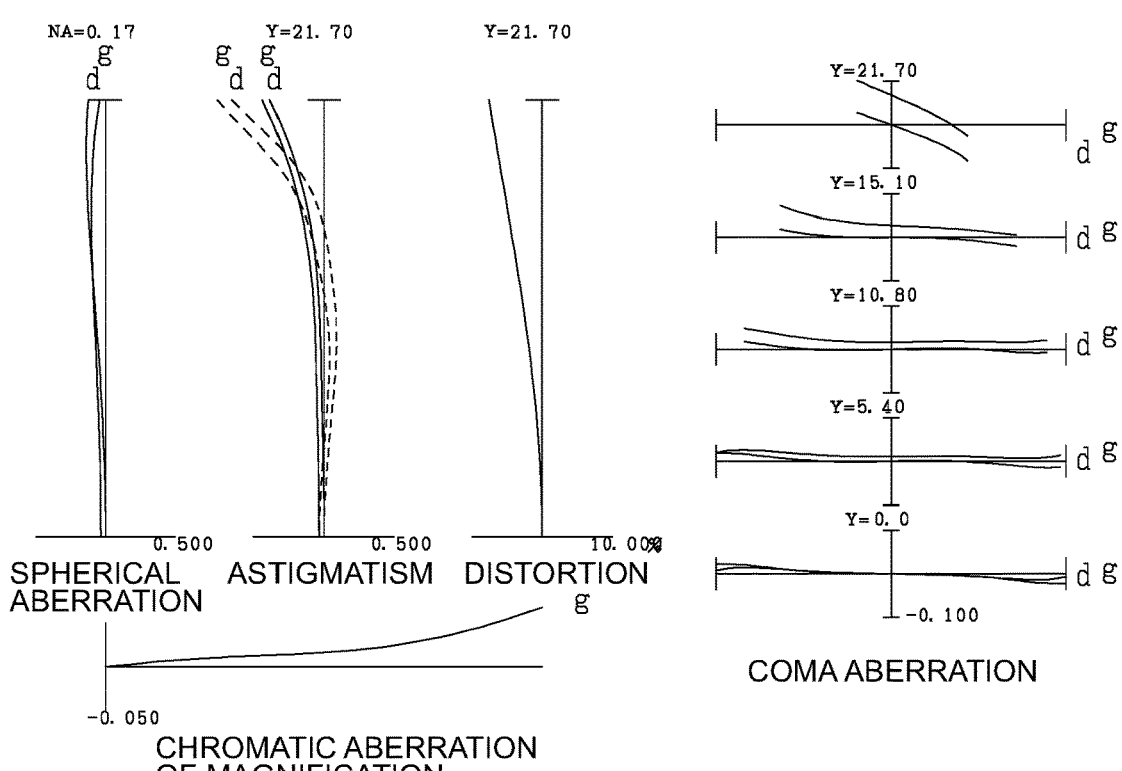
FIGS. 12A and 12B are graphs respectively showing various aberrations of the zoom optical system according to Fourth Example upon focusing on a short distance object in the wide-angle end state and the telephoto end state.
Figure 12B:
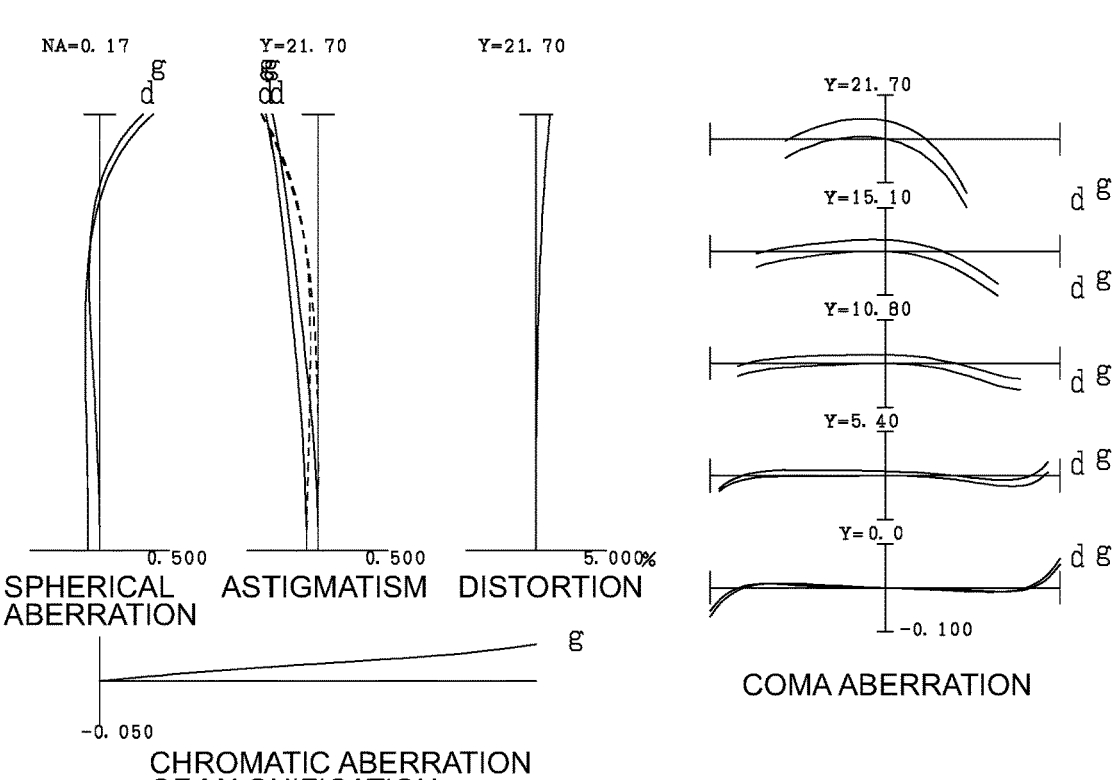

FIG. 11A shows various aberration graphs of the zoom optical system according to Fourth Example upon focusing on infinity in the wide angle end state. FIG. 11B shows various aberration graphs of the zoom optical system according to Fourth Example upon focusing on infinity in the telephoto end state. FIG. 12A shows various aberration graphs of the zoom optical system according to Fourth Example upon focusing on a short distance object in the wide angle end state. FIG. 12B shows various aberration graphs of the zoom optical system according to Fourth Example upon focusing on the short distance object in the telephoto end state. The various aberration graphs show that the zoom optical system according to Fourth Example favorably corrects various aberrations, and exerts an excellent imaging performance, in the entire range from focusing on infinity to focusing on the short distance object. Accordingly, even in the case of focusing on the short distance object, the variation in angle of view upon focusing can be reduced while securing a favorable optical performance.

Fifth Example

Figure 13:
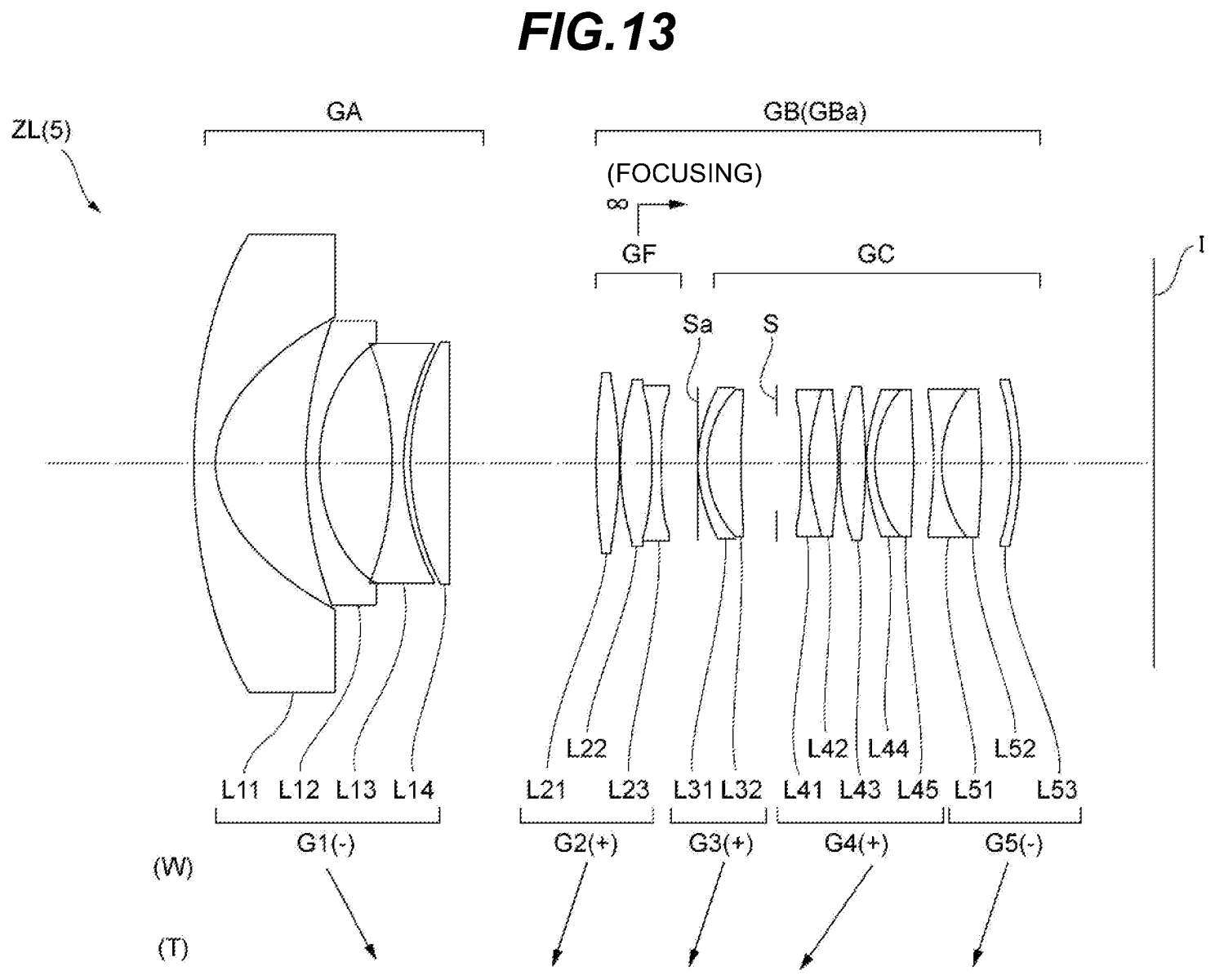

Fifth Example is described with reference to FIGS. 13 to 15A and 15B and Table 5. FIG. 13 is a lens configuration diagram of a zoom optical system according to Fifth Example. The zoom optical system ZL(5) according to Fifth Example consists of, in order from the object on the optical axis: a first lens group G1 having a negative refractive power; a second lens group G2 having a positive refractive power; a third lens group G3 having a positive refractive power; a fourth lens group G4 having a positive refractive power; and a fifth lens group G5 having a negative refractive power. Upon zooming from the wide-angle end state (W) to the telephoto end state (T), the first lens group G1 moves toward the image on the optical axis, the second lens group G2, the third lens group G3, the fourth lens group G4 and the fifth lens group G5 move toward the object on the optical axis, and the distances between adjacent lenses change. The aperture stop S is disposed between the third lens group G3 and the fourth lens group G4.

The first lens group G1 consists of, in order from the object on the optical axis: a negative meniscus lens L11 having a convex surface facing the object; a negative meniscus lens L12 having a convex surface facing the object; a biconcave negative lens L13; and a biconvex positive lens L14. The negative meniscus lens L11 has the opposite lens surfaces that are aspherical surfaces. The negative meniscus lens L12 has an image-side lens surface that is an aspherical surface.

The second lens group G2 consists of, in order from the object on the optical axis: a biconvex positive lens L21; and a cemented lens that consists of a biconvex positive lens L22, and a biconcave negative lens L23.

The third lens group G3 consists of a cemented lens that consists of a negative meniscus lens L31 having a convex surface facing the object, and a positive meniscus lens L32 having a convex surface facing the object. An auxiliary aperture Sa is disposed adjacent to the object side of the negative meniscus lens L31. Upon zooming, the auxiliary aperture Sa moves with the third lens group G3 on the optical axis.

The fourth lens group G4 consists of, in order from the object on the optical axis: a cemented lens that consists of a biconcave negative lens L41, and a biconvex positive lens L42; a biconvex positive lens L43; and a cemented lens that consists of a negative meniscus lens L44 having a convex surface facing the object, and a biconvex positive lens L45. An aperture stop S is disposed adjacent to the object side of the negative lens L41. Upon zooming, the aperture stop S moves with the fourth lens group G4 on the optical axis. The positive lens L42 and the positive lens L45 are fabricated using optical glass having anomalous dispersion characteristics.

The fifth lens group G5 consists of, in order from the object on the optical axis: a cemented lens that consists of a biconcave negative lens L51, and a biconvex positive lens L52; and a positive meniscus lens L53 having a concave surface facing the object. An image surface I is disposed on the image side of the fifth lens group G5. The positive meniscus lens L53 has an image-side lens surface that is an aspherical surface.

In this Example, the first lens group G1 constitutes the preceding lens group GA having a negative refractive power as a whole. The second lens group G2, the third lens group G3, the fourth lens group G4 and the fifth lens group G5 constitute a succeeding lens group GB having a positive refractive power as a whole. The second lens group G2 constitutes the focusing group GF in the succeeding lens group GB. The third lens group G3, the fourth lens group G4 and the fifth lens group G5 constitute the image-side group GC in the succeeding lens group GB. In the succeeding lens group GB, lenses disposed closer to the image than the focusing group GF or in the focusing group GF, that is, the lenses of the second lens group G2, the lenses of the third lens group G3, the lenses of the fourth lens group G4 and the lenses of the fifth lens group G5, constitute the image-side lens group GBa described above. Upon focusing from an infinity object to a short distance object, the second lens group G2, which constitutes the focusing group GF, moves toward the image on the optical axis. The positive lens L42 and the positive lens L45 of the fourth lens group G4 correspond to a specified lens of the succeeding lens group GB.

The following Table 5 lists values of data on the zoom optical system according to Fifth Example.

TABLE 5

| [General Data] | | |
|---|---|---|
| Zooming ratio = 1.62 | | |
| fBaw = 34.9 | | |
| fCw = 39.261 | | |
| fF = 83.88 | | |
| βBaw = −0.702 | | |
| βFw = 4.267 | | |
| STLw = 87.277 | | |

| | W | T |
|---|---|---|
| f | 14.4 | 23.3 |
| FNO | 2.91 | 2.91 |
| 2ω | 115.0 | 84.2 |
| Y | 21.6 | 21.6 |
| TL | 143.628 | 133.3 |
| Bf | 20.07 | 33.17 |

| [Lens Data] | | | | |
|---|---|---|---|---|
| Surface Number | R | D | nd | νd |
| 1* | 71.95 | 3.20 | 1.588870 | 61.1 |
| 2* | 14.51 | 13.55 | | |
| 3 | 61.90 | 2.00 | 1.860999 | 37.0 |
| 4* | 29.57 | 10.97 | | |
| 5 | −50.12 | 1.80 | | |
| 6 | 39.08 | 0.92 | | |
| 7 | 39.32 | 5.73 | 1.806100 | 33.3 |
| 8 | −2630.42 | (D8) | | |
| 9 | 102.26 | 3.51 | 1.728250 | 28.3 |
| 10 | −67.66 | 0.20 | | |
| 11 | 45.26 | 4.78 | 1.698950 | 30.1 |
| 12 | −44.14 | 1.20 | 1.963000 | 24.1 |
| 13 | 53.69 | (D13) | | |
| 14 | ∞ | 0.00 | | (Aperture Stop Sa) |
| 15 | 23.84 | 1.20 | 1.834000 | 37.1 |
| 16 | 16.67 | 5.13 | 1.487490 | 70.3 |
| 17 | 169.89 | (D17) | | |
| 18 | ∞ | 3.68 | | (Aperture Stop S) |
| 19 | −75.47 | 1.20 | 1.850260 | 32.3 |
| 20 | 32.29 | 4.36 | 1.497820 | 82.6 |
| 21 | −56.96 | 0.20 | | |
| 22 | 36.85 | 3.92 | 1.749500 | 35.2 |
| 23 | −94.60 | 0.20 | | |
| 24 | 29.88 | 1.20 | 1.834000 | 37.1 |
| 25 | 18.28 | 5.81 | 1.497820 | 82.6 |
| 26 | −92.45 | (D26) | | |
| 27 | −67.55 | 1.20 | 1.953747 | 32.3 |

TABLE 5-continued

| 28 | 18.47 | 5.74 | 1.672700 | 32.1 |
| 29 | −131.73 | 4.54 | | |
| 30 | −42.81 | 1.30 | 1.860999 | 37.0 |
| 31* | −40.24 | Bf | | |

[Aspherical Surface Data]

1st Surface
κ = 1.000, A4 = −8.11E−06, A6 = 2.22E−08, A8 = −3.09E−11,
A10 = 2.50E−14, A12 = −1.09E−17
A14 = 2.04E−21
2nd Surface
κ = 0.000, A4 = −1.69E−06, A6 = 3.53E−11, A8 = 2.41E−11,
A10 = 4.17E−13, A12 = −1.56E−15
A14 = 1.45E−18
4th Surface
κ = 2.000, A4 = 4.30E−06, A6 = 1.19E−08, A8 = −1.88E−11,
A10 = −1.27E−13, A12 = 1.26E−15
A14 = −2.10E−18
31st Surface
κ = 1.000, A4 = 1.40E−05, A6 = 3.24E−09, A8 = 1.91E−10,
A10 = −1.08E−12, A12 = 2.54E−15

[Variable Distance Data]

| | W | M1 | M2 | T |
|---|---|---|---|---|
| | Upon focusing on infinity | | | |
| Focal length | 14.40 | 18.00 | 20.00 | 23.30 |
| Distance | ∞ | ∞ | ∞ | ∞ |
| D8 | 22.07 | 10.81 | 6.77 | 1.50 |
| D13 | 5.69 | 5.68 | 5.31 | 5.57 |
| D17 | 5.31 | 3.58 | 2.91 | 1.50 |
| D21 | 0.93 | 0.50 | 0.35 | 0.20 |
| D26 | 2.93 | 3.61 | 3.79 | 4.01 |
| Bf | 20.07 | 25.18 | 28.12 | 33.17 |
| | Upon focusing on an intermediate distance object | | | |
| Magnification | 0.025 | 0.025 | 0.025 | 0.025 |
| Distance | 554 | 696 | 777 | 910 |
| D8 | 22.81 | 11.47 | 7.39 | 2.06 |
| D13 | 4.94 | 5.02 | 4.69 | 5.01 |
| D17 | 5.31 | 3.58 | 2.91 | 1.50 |
| D21 | 0.93 | 0.50 | 0.35 | 0.20 |
| D26 | 2.93 | 3.61 | 3.79 | 4.01 |
| Bf | 20.07 | 25.18 | 28.12 | 33.17 |
| | Upon focusing on a very short distance object | | | |
| Magnification | 0.090 | 0.108 | 0.119 | 0.138 |
| Distance | 136 | 143 | 145 | 146 |
| D8 | 24.58 | 13.62 | 9.64 | 4.56 |
| D13 | 3.17 | 2.86 | 2.44 | 2.52 |
| D17 | 5.31 | 3.58 | 2.91 | 1.50 |
| D21 | 0.93 | 0.50 | 0.35 | 0.20 |
| D26 | 2.93 | 3.61 | 3.79 | 4.01 |
| Bf | 20.07 | 25.18 | 28.12 | 33.17 |

[Lens Group Data]

| Group | First surface | Focal length |
|---|---|---|
| G1 | 1 | −20.50 |
| G2 | 9 | 83.88 |
| G3 | 14 | 83.19 |
| G4 | 18 | 30.00 |
| G5 | 27 | −46.50 |

Figure 14A:
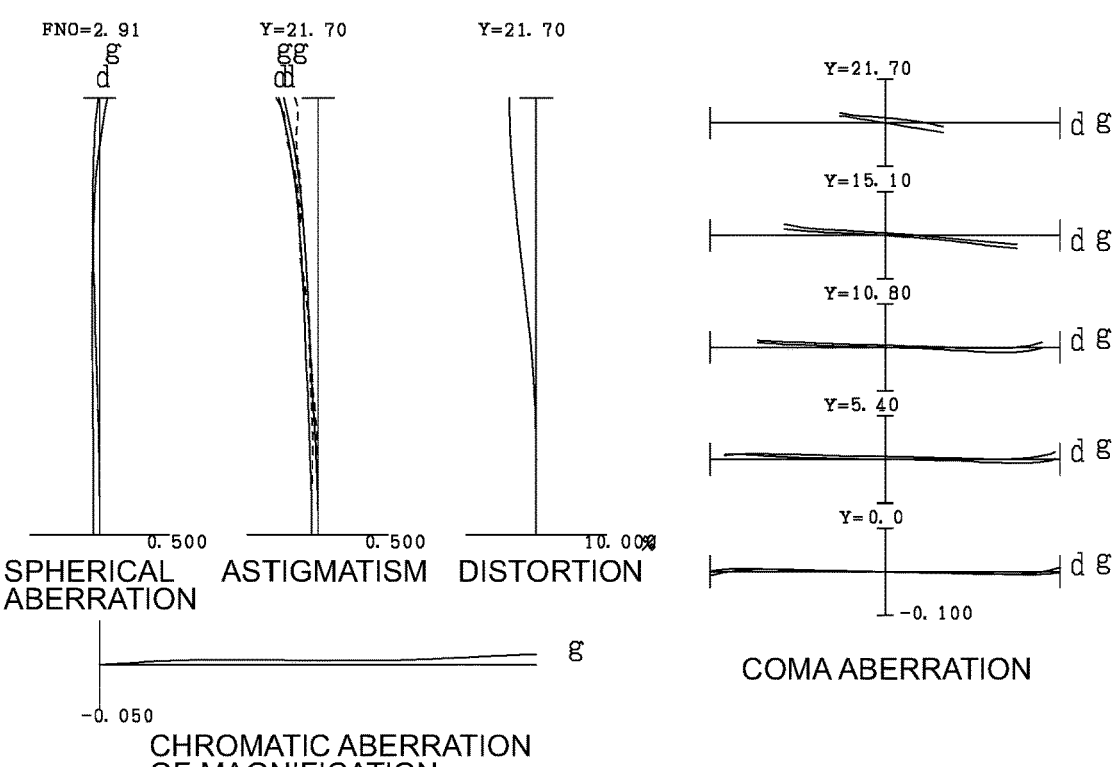
FIGS. 14A and 14B are graphs respectively showing various aberrations of the zoom optical system according to Fifth Example upon focusing on infinity in a wide-angle end state and a telephoto end state.
Figure 14B:
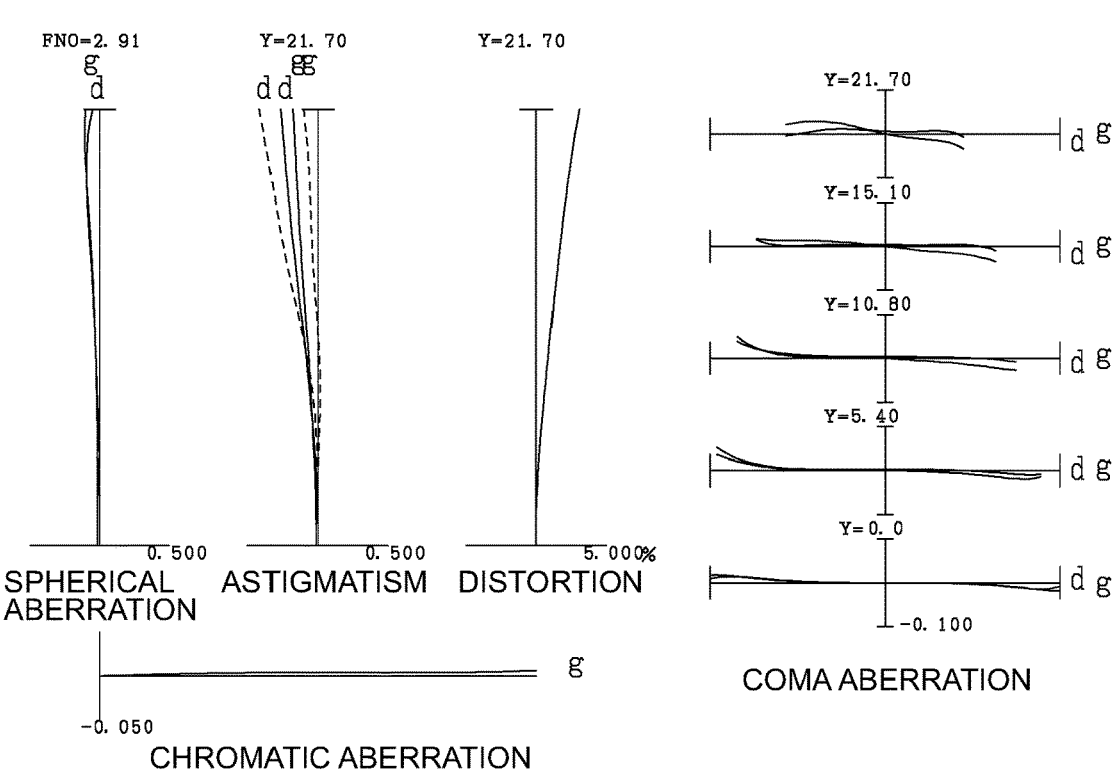
Figure 15A:
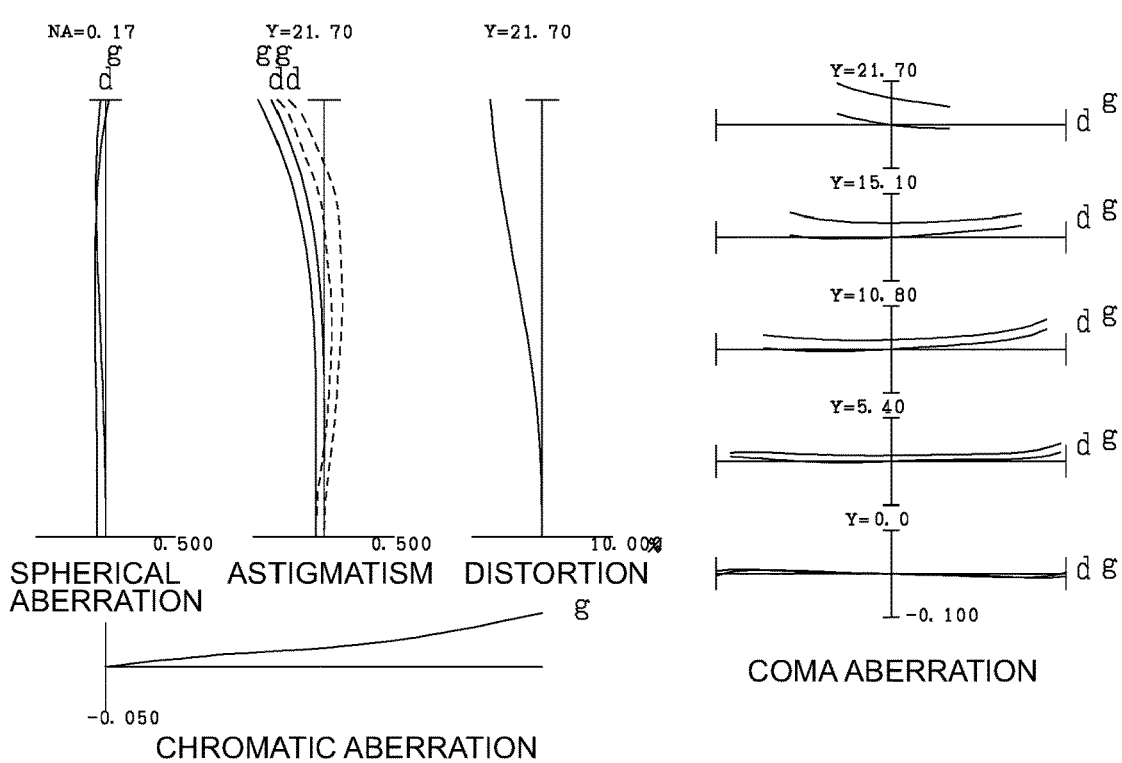
FIGS. 15A and 15B are graphs respectively showing various aberrations of the zoom optical system according to Fifth Example upon focusing on a short distance object in the wide-angle end state and the telephoto end state.
Figure 15B:
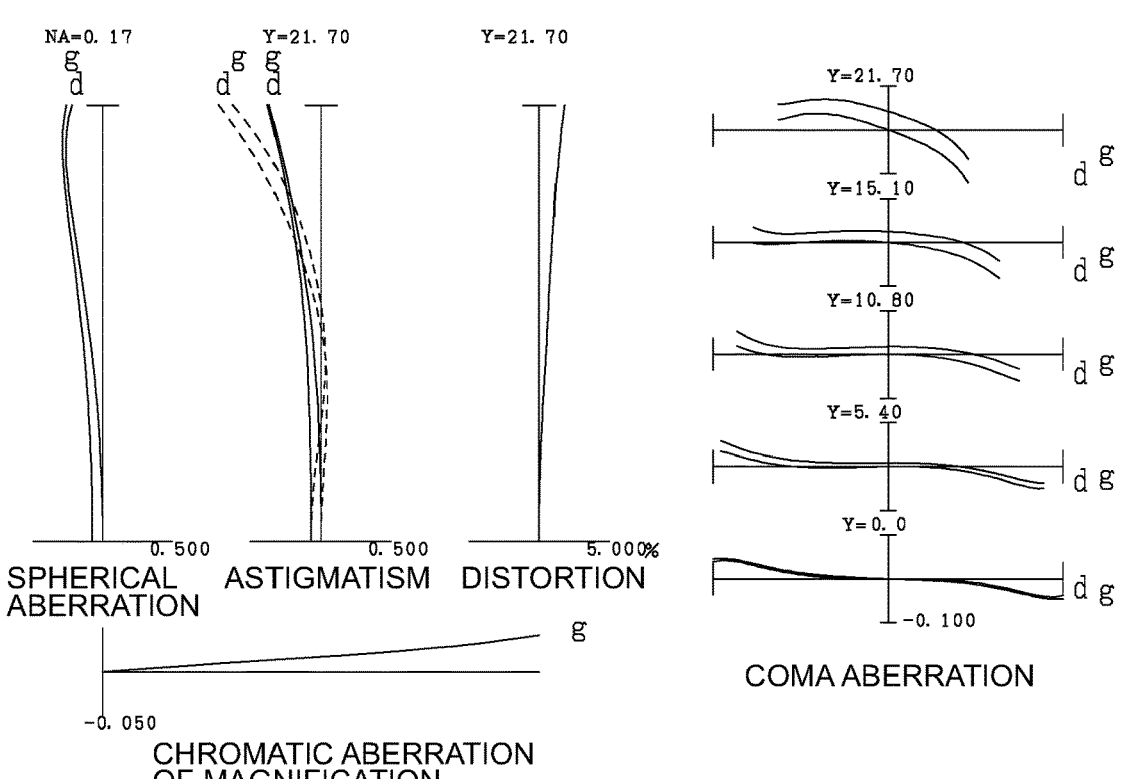

FIG. 14A shows various aberration graphs of the zoom optical system according to Fifth Example upon focusing on infinity in the wide angle end state. FIG. 14B shows various aberration graphs of the zoom optical system according to Fifth Example upon focusing on infinity in the telephoto end state. FIG. 15A shows various aberration graphs of the zoom optical system according to Fifth Example upon focusing on a short distance object in the wide angle end state. FIG. 15B shows various aberration graphs of the zoom optical system according to Fifth Example upon focusing on the short distance object in the telephoto end state. The various aberration graphs show that the zoom optical system according to Fifth Example favorably corrects various aberrations, and exerts an excellent imaging performance, in the entire range from focusing on infinity to focusing on the short distance object. Accordingly, even in the case of focusing on the short distance object, the variation in angle of view upon focusing can be reduced while securing a favorable optical performance.

Sixth Example

Figure 16:
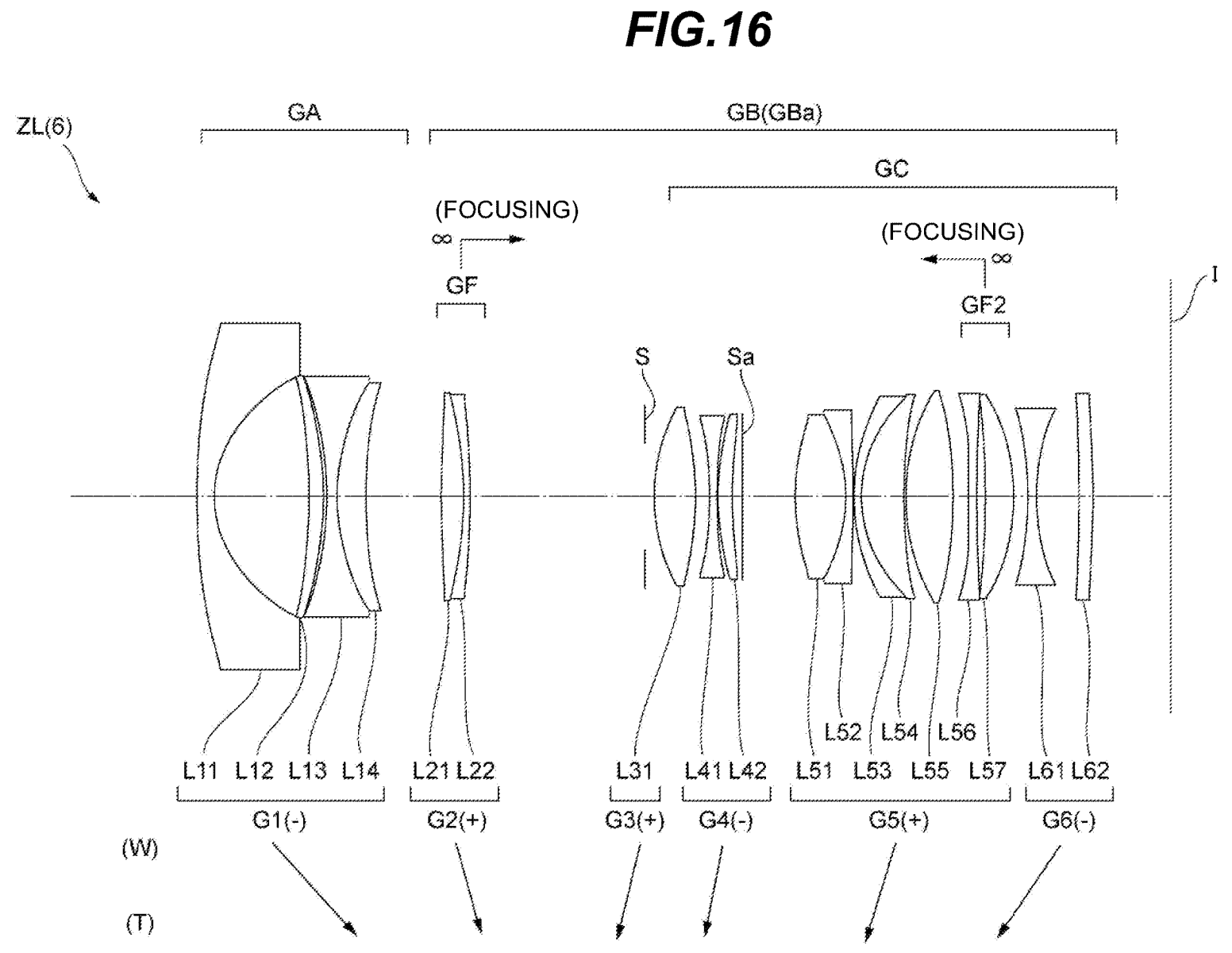

Sixth Example is described with reference to FIGS. 16 to 18A and 18B and Table 6. FIG. 16 is a lens configuration diagram of a zoom optical system according to Sixth Example. The zoom optical system ZL(6) according to Sixth Example consists of, in order from the object on the optical axis: a first lens group G1 having a negative refractive power; a second lens group G2 having a positive refractive power; a third lens group G3 having a positive refractive power; a fourth lens group G4 having a negative refractive power; a fifth lens group G5 having a positive refractive power; and a sixth lens group G6 having a negative refractive power. Upon zooming from the wide-angle end state (W) to the telephoto end state (T), the first lens group G1 and the second lens group G2 move toward the image on the optical axis, the third lens group G3, the fourth lens group G4, the fifth lens group G5 and the sixth lens group G6 move toward the object on the optical axis, and the distances between adjacent lenses change. The aperture stop S is disposed between the second lens group G2 and the third lens group G3.

The first lens group G1 consists of, in order from the object on the optical axis: a negative meniscus lens L11 having a convex surface facing the object; a positive meniscus lens L12 having a concave surface facing the object; and a cemented lens that consists of a biconcave negative lens L13, and a positive meniscus lens L14 having a convex surface facing the object. The negative meniscus lens L11 has the opposite lens surfaces that are aspherical surfaces. The negative lens L13 is fabricated using optical glass having anomalous dispersion characteristics.

The second lens group G2 consists of a cemented lens that consists of a biconvex positive lens L21, and a negative meniscus lens L22 having a concave surface facing the object. The third lens group G3 consists of a biconvex positive lens L31. An aperture stop S is disposed adjacent to the object side of the positive lens L31. Upon zooming, the aperture stop S moves with the third lens group G3 on the optical axis. The positive lens L31 is fabricated using optical glass having anomalous dispersion characteristics.

The fourth lens group G4 consists of, in order from the object on the optical axis: a biconcave negative lens L41; and a positive meniscus lens L42 having a convex surface facing the object. An auxiliary aperture Sa is disposed adjacent to the image side of the positive meniscus lens L42. Upon zooming, the auxiliary aperture Sa moves with the fourth lens group G4 on the optical axis.

The fifth lens group G5 consists of, in order from the object on the optical axis: a cemented lens that consists of a biconvex positive lens L51, and a negative meniscus lens L52 having a concave surface facing the object; a cemented lens that consists of a negative meniscus lens L53 having a convex surface facing the object, and a positive meniscus lens L54 having a convex surface facing the object; a biconvex positive lens L55; a biconcave negative lens L56;

and a positive meniscus lens L57 having a concave surface facing the object. The negative lens L56 has an object-side lens surface that is an aspherical surface. The positive lens L51, the positive meniscus lens L54, and the positive meniscus lens L57 are fabricated using optical glass having anomalous dispersion characteristics.

The sixth lens group G6 consists of, in order from the object on the optical axis: a biconcave negative lens L61; and a positive meniscus lens L62 having a concave surface facing the object. An image surface I is disposed on the image side of the sixth lens group G6. The negative lens L61 has an object-side lens surface that is an aspherical surface. The positive meniscus lens L62 has an object-side lens surface that is an aspherical surface.

In this Example, the first lens group G1 constitutes the preceding lens group GA having a negative refractive power as a whole. The second lens group G2, the third lens group G3, the fourth lens group G4, the fifth lens group G5 and the sixth lens group G6 constitute a succeeding lens group GB having a positive refractive power as a whole. The second lens group G2 constitutes the focusing group GF in the succeeding lens group GB. The third lens group G3, the fourth lens group G4, the fifth lens group G5 and the sixth lens group G6 constitute the image-side group GC in the succeeding lens group GB. In the succeeding lens group GB, lenses disposed closer to the image than the focusing group GF or in the focusing group GF, that is, the lenses of the second lens group G2, the lenses of the third lens group G3, the lenses of the fourth lens group G4, the lenses of the fifth lens group G5 and the lenses of the sixth lens group G6, constitute the image-side lens group GBa described above. Upon focusing from an infinity object to a short distance object, the second lens group G2, which constitutes the focusing group GF, moves toward the image on the optical axis. Upon focusing from an infinity object to a short distance object, the negative lens L56 and the positive meniscus lens L57 of the fifth lens group G5, which constitute a second focusing group GF2, move toward the object on the optical axis. The positive lens L31 of third lens group G3, and the positive lens L51, the positive meniscus lens L54 and the positive meniscus lens L57 of the fifth lens group G5 correspond to a specified lens of the succeeding lens group GB.

The following Table 6 lists values of data on the zoom optical system according to Sixth Example.

TABLE 6

[General Data]

Zooming ratio = 2.06
fBaw = 38.120
fCw = 38.813
fF = 113.314
βBaw = −0.770
βFw = 1.834
STLw = 72.551

| | W | T |
|---|---|---|
| f | 16.5 | 34.0 |
| FNO | 2.91 | 2.91 |
| 2ω | 108.2 | 63.0 |
| Y | 21.6 | 21.6 |
| TL | 157.65 | 139.68 |
| Bf | 12.48 | 32.74 |

TABLE 6-continued

[Lens Data]

| Surface Number | R | D | nd | vd | |
|---|---|---|---|---|---|
| 1* | 101.86 | 2.80 | 1.790630 | 44.9 | |
| 2* | 17.50 | 15.42 | | | |
| 3 | −86.28 | 2.33 | 1.755200 | 27.5 | |
| 4 | −56.75 | 0.49 | | | |
| 5 | −51.79 | 1.70 | 1.497820 | 82.6 | |
| 6 | 35.60 | 4.74 | 1.854505 | | |
| 7 | 79.30 | (D7) | | | |
| 8 | 281.88 | 3.62 | 1.834801 | 42.7 | |
| 9 | −59.25 | 1.10 | 1.922860 | 20.8 | |
| 10 | −124.87 | (D10) | | | |
| 11 | ∞ | 1.50 | | | (Aperture Stop S) |
| 12 | 30.00 | 6.70 | 1.497820 | 82.6 | |
| 13 | −57.17 | (D13) | | | |
| 14 | −56.59 | 1.10 | 1.870705 | 40.7 | |
| 15 | 66.46 | 0.20 | | | |
| 16 | 43.96 | 2.53 | 1.922860 | 20.8 | |
| 17 | 124.88 | 1.50 | | | |
| 18 | ∞ | (D18) | | | (Aperture Stop Sa) |
| 19 | 42.12 | 8.18 | 1.497820 | 82.6 | |
| 20 | −25.33 | 1.20 | 2.001000 | 29.1 | |
| 21 | −469.54 | 0.20 | | | |
| 22 | 33.67 | 1.20 | 1.953747 | 32.3 | |
| 23 | 21.47 | 6.99 | 1.497820 | 82.6 | |
| 24 | 93.49 | 0.20 | | | |
| 25 | 35.65 | 7.53 | 1.850260 | 32.3 | |
| 26 | −62.05 | (D26) | | | |
| 27* | −500.00 | 1.40 | 1.870705 | 40.7 | |
| 28 | 459.53 | 1.20 | | | |
| 29 | −141.51 | 4.75 | 1.497820 | 82.6 | |
| 30 | −30.90 | (D30) | | | |
| 31* | −79.23 | 1.40 | 1.851080 | 40.1 | |
| 32 | 34.18 | 7.09 | | | |
| 33* | −500.00 | 2.22 | 1.922860 | 20.8 | |
| 34 | −201.44 | Bf | | | |

[Aspherical Surface Data]

1st Surface
κ = 1.000, A4 = −4.56E−07, A6 = 1.02E−09, A8 = −1.24E−12, A10 = 7.97E−16, A12 = −2.87E−19
2nd Surface
κ = 0.000, A4 = 9.94E−06, A6 = 1,24E−08, A8 = −8.79E−12, A10 = 5.99E−14, A12 = −4.00E−17
27th Surface
κ = 1.000, A4 = −2.12E−05, A6 = −1.66E−09, A8 = 7.73E−11, A10 = −1.53E−13, A12 = 1.07E−16
31st Surface
κ = 1.000, A4 = −1.01E−05, A6 = −1.21E−08, A8 = − 1.82E−10, A10 = 1.01E−12, A12 = −1.31E−15
33rd Surface
κ = 1.000, A4 = −9.51E−07, A6 = −4.11E−09, A8 = 7.09E−12, A10 = −5.94E−14, A12 = −2.83E−16

[Variable Distance Data]

| | W | M1 | M2 | T |
|---|---|---|---|---|
| | Upon focusing on infinity | | | |
| Focal length | 16.50 | 20.00 | 24.00 | 34.00 |
| Distance | ∞ | ∞ | ∞ | ∞ |
| D7 | 12.04 | 5.91 | 2.94 | 2.30 |
| D10 | 28.31 | 22.58 | 17.45 | 5.39 |
| D13 | 2.32 | 2.86 | 3.79 | 5.78 |
| D18 | 8.63 | 6.49 | 4.10 | 0.00 |
| D26 | 2.47 | 2.47 | 2.47 | 2.47 |
| D30 | 2.10 | 2.43 | 2.31 | 1.70 |
| Bf | 12.48 | 16.82 | 21.70 | 32.74 |
| | Upon focusing on an intermediate distance object | | | |
| Magnification | 0.033 | 0.033 | 0.033 | 0.033 |
| Distance | 472 | 698 | 578 | 998 |
| D7 | 13.28 | 7.00 | 3.88 | 2.94 |

TABLE 6-continued

| D10 | 27.07 | 21.49 | 16.51 | 4.76 |
|---|---|---|---|---|
| D13 | 2.32 | 2.86 | 3.79 | 5.78 |
| D18 | 8.63 | 6.49 | 4.10 | 0.00 |
| D26 | 2.44 | 2.41 | 2.40 | 2.37 |
| D30 | 2.14 | 2.49 | 2.38 | 1.81 |
| Bf | 12.48 | 16.82 | 21.70 | 32.74 |
| Upon focusing on a very short distance object | | | | |
| Magnification | 0.115 | 0.132 | 0.153 | 0.176 |
| Distance | 121 | 130 | 138 | 139 |
| D7 | 16.20 | 10.09 | 7.11 | 6.19 |
| D10 | 24.14 | 18.40 | 13.28 | 1.50 |
| D13 | 2.32 | 2.86 | 3.79 | 5.78 |
| D18 | 8.63 | 6.49 | 4.10 | 0.00 |
| D26 | 2.33 | 2.22 | 2.13 | 1.80 |
| D30 | 2.24 | 2.68 | 2.66 | 2.37 |
| Bf | 12.48 | 16.82 | 21.70 | 32.74 |

[Lens Group Data]

| Group | First surface | Focal length |
|---|---|---|
| G1 | 1 | −21.432 |
| G2 | 8 | 113.314 |
| G3 | 11 | 40.562 |
| G4 | 14 | −67.240 |
| G5 | 19 | 28.11 |
| G6 | 31 | −31.068 |

Figure 17A:
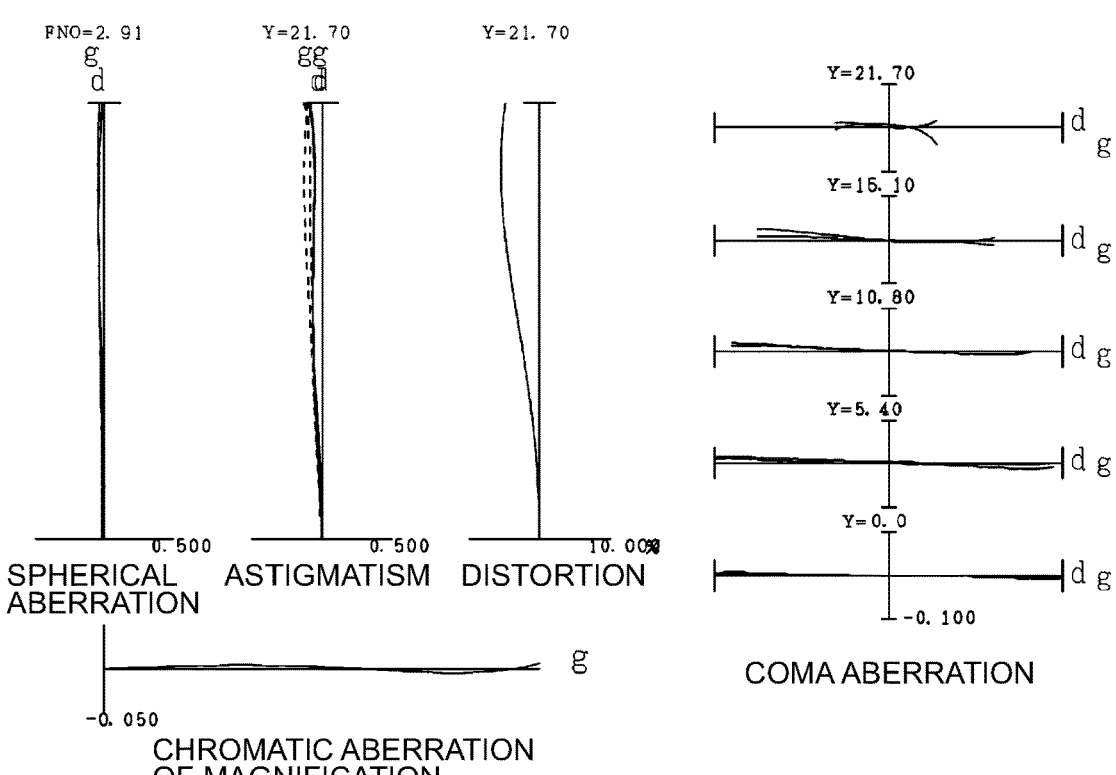
FIGS. 17A and 17B are graphs respectively showing various aberrations of the zoom optical system according to Sixth Example upon focusing on infinity in a wide-angle end state and a telephoto end state.
Figure 17B:
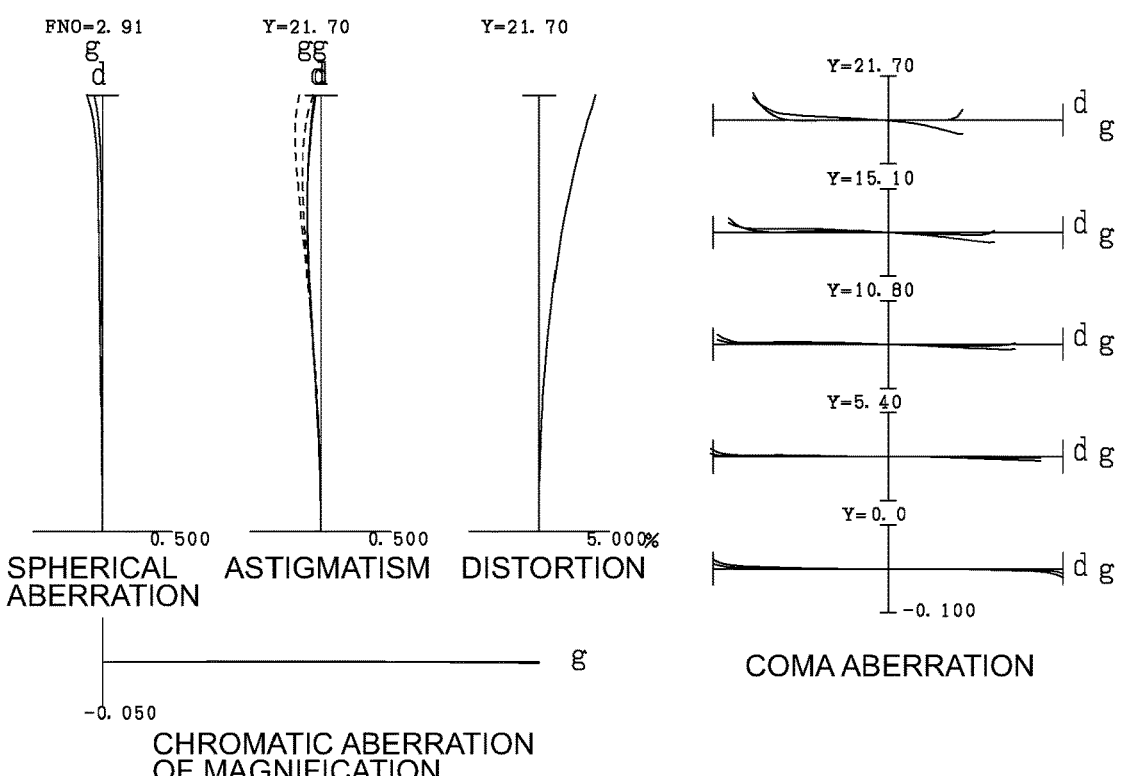
Figure 18A:
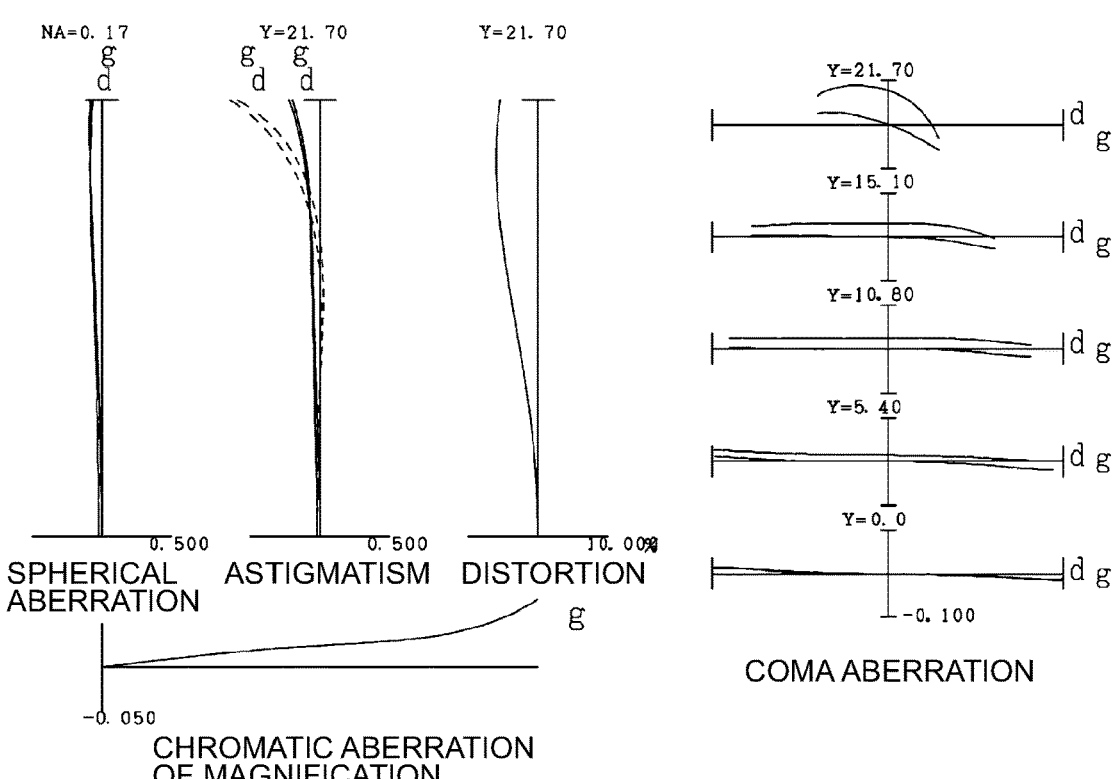
FIGS. 18A and 18B are graphs respectively showing various aberrations of the zoom optical system according to Sixth Example upon focusing on a short distance object in the wide-angle end state and the telephoto end state.
Figure 18B:
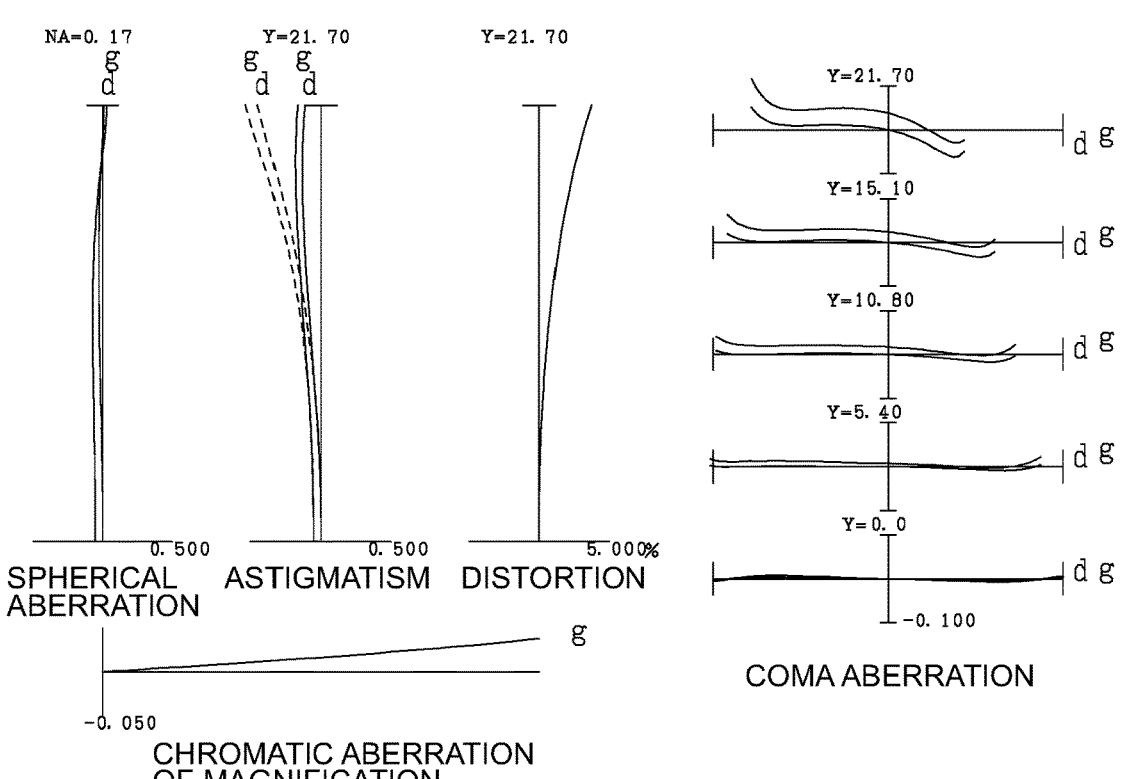

FIG. 17A shows various aberration graphs of the zoom optical system according to Sixth Example upon focusing on infinity in the wide angle end state. FIG. 17B shows various aberration graphs of the zoom optical system according to Sixth Example upon focusing on infinity in the telephoto end state. FIG. 18A shows various aberration graphs of the zoom optical system according to Sixth Example upon focusing on a short distance object in the wide angle end state. FIG. 18B shows various aberration graphs of the zoom optical system according to Sixth Example upon focusing on the short distance object in the telephoto end state. The various aberration graphs show that the zoom optical system according to Sixth Example favorably corrects various aberrations, and exerts an excellent imaging performance, in the entire range from focusing on infinity to focusing on the short distance object. Accordingly, even in the case of focusing on the short distance object, the variation in angle of view upon focusing can be reduced while securing a favorable optical performance.

Seventh Example

Figure 19:
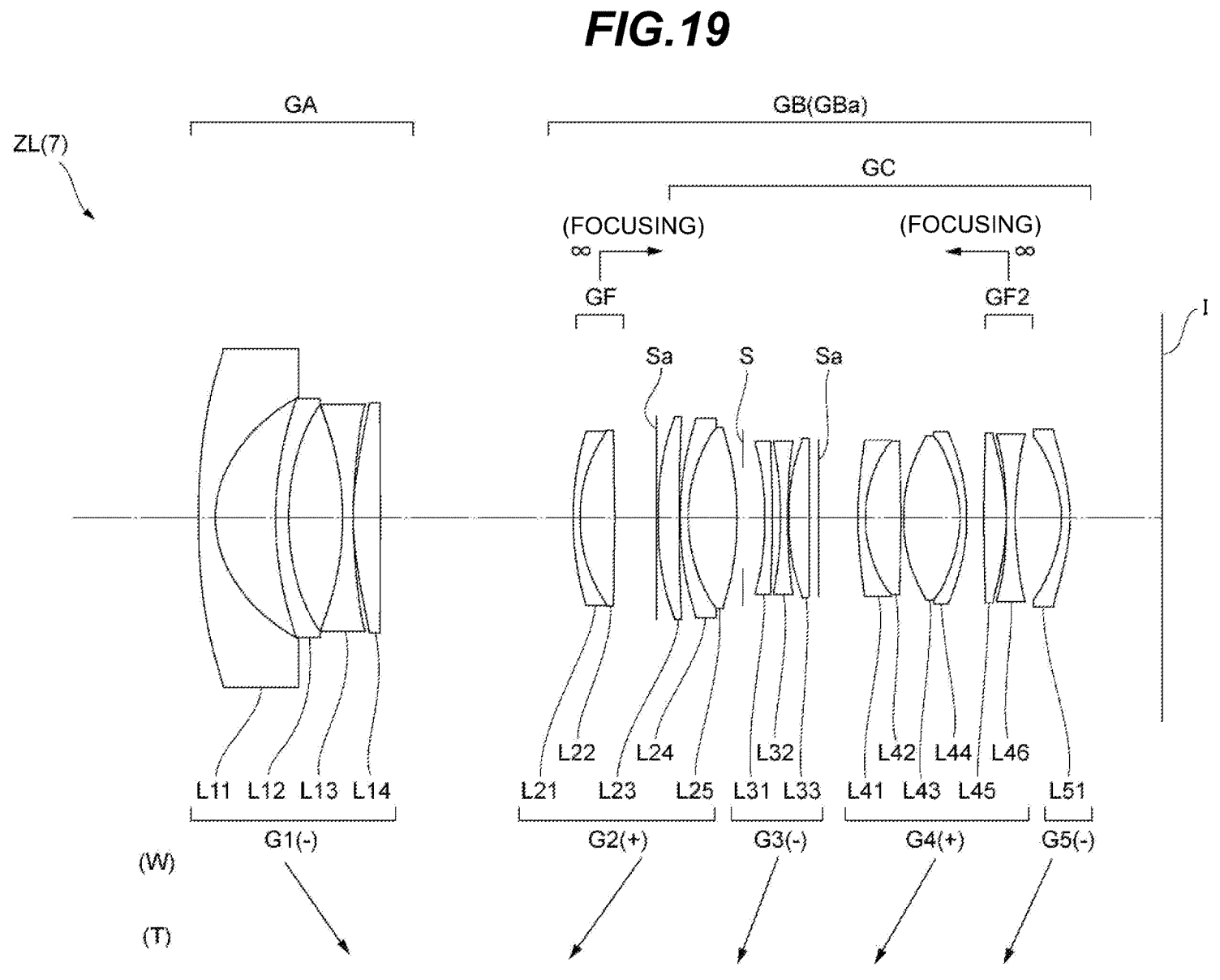

Seventh Example is described with reference to FIGS. 19 to 21A and 21B and Table 7. FIG. 19 is a lens configuration diagram of a zoom optical system according to Seventh Example. The zoom optical system ZL(7) according to Seventh Example consists of, in order from the object on the optical axis: a first lens group G1 having a negative refractive power; a second lens group G2 having a positive refractive power; a third lens group G3 having a negative refractive power; a fourth lens group G4 having a positive refractive power; and a fifth lens group G5 having a negative refractive power. Upon zooming from the wide-angle end state (W) to the telephoto end state (T), the first lens group G1 moves toward the image on the optical axis, the second lens group G2, the third lens group G3, the fourth lens group G4 and the fifth lens group G5 move toward the object on the optical axis, and the distances between adjacent lenses change. The aperture stop S is disposed between the second lens group G2 and the third lens group G3.

The first lens group G1 consists of, in order from the object on the optical axis: a negative meniscus lens L11 having a convex surface facing the object; a negative meniscus lens L12 having a convex surface facing the object; a biconcave negative lens L13; and a biconvex positive lens L14. The negative meniscus lens L11 has the opposite lens surfaces that are aspherical surfaces. The negative meniscus lens L12 has an image-side lens surface that is an aspherical surface. The negative lens L13 is fabricated using optical glass having anomalous dispersion characteristics.

The second lens group G2 consists of, in order from the object on the optical axis: a cemented lens that consists of a negative meniscus lens L21 having a convex surface facing the object, and a biconvex positive lens L22; a positive meniscus lens L23 having a convex surface facing the object; and a cemented lens that consists of a negative meniscus lens L24 having a convex surface facing the object, and a biconvex positive lens L25. An auxiliary aperture Sa is disposed between the positive lens L22 and the positive meniscus lens L23 of the second lens group G2.

The third lens group G3 consists of, in order from the object on the optical axis: a negative meniscus lens L31 having a concave surface facing the object; a biconcave negative lens L32; and a biconvex positive lens L33. An aperture stop S is disposed adjacent to the object side of the negative meniscus lens L31. An auxiliary aperture Sa is disposed adjacent to the image side of the positive lens L33. Upon zooming, the aperture stop S and the auxiliary aperture Sa move with the third lens group G3 on the optical axis.

The fourth lens group G4 consists of, in order from the object on the optical axis: a cemented lens that consists of a negative meniscus lens L41 having a convex surface facing the object, and a biconvex positive lens L42; a cemented lens that consists of a biconvex positive lens L43, and a negative meniscus lens L44 having a concave surface facing the object; a biconvex positive lens L45; and a biconcave negative lens L46. The negative lens L46 has an image-side lens surface that is an aspherical surface. The positive lens L42 and the positive lens L43 are fabricated using optical glass having anomalous dispersion characteristics.

The fifth lens group G5 consists of a negative meniscus lens L51 having a concave surface facing the object. An image surface I is disposed on the image side of the fifth lens group G5. The negative meniscus lens L51 has an image-side lens surface that is an aspherical surface.

In this Example, the first lens group G1 constitutes the preceding lens group GA having a negative refractive power as a whole. The second lens group G2, the third lens group G3, the fourth lens group G4 and the fifth lens group G5 constitute a succeeding lens group GB having a positive refractive power as a whole. The negative meniscus lens L21 and the positive lens L22 of the second lens group G2 constitute the focusing group GF in the succeeding lens group GB. The positive meniscus lens L23, the negative meniscus lens L24 and the positive lens L25 of the second lens group G2, the third lens group G3, the fourth lens group G4 and the fifth lens group G5 constitute the image-side group GC in the succeeding lens group GB. In the succeeding lens group GB, lenses disposed closer to the image than the focusing group GF or in the focusing group GF, that is, the lenses of the second lens group G2, the lenses of the third lens group G3, the lenses of the fourth lens group G4 and the lenses of the fifth lens group G5, constitute the image-side lens group GBa described above. Upon focusing from an infinity object to a short distance object, the negative meniscus lens L21 and the positive lens L22 of the second lens group G2, which constitute the focusing group GF, move toward the image on the optical axis. Upon focusing from the infinity object to the short distance object, the positive lens L45 and the negative lens L46 of the fourth lens group G4, which constitute a second focusing group GF2, move toward the object on the optical axis. The positive lens L42 and the positive lens L43 of the fourth lens group G4 correspond to a specified lens of the succeeding lens group GB.

The following Table 7 lists values of data on the zoom optical system according to Seventh Example.

TABLE 7

[General Data]

Zooming ratio = 2.06
fBaw = 37.589
fCw = 50.452
fF = 113.314
βBaw = −0.707
βFw = 4.383
STLw = 89.22

| | W | T |
|---|---|---|
| f | 16.5 | 34.0 |
| FNO | 2.91 | 2.91 |
| 2ω | 108.2 | 63.0 |
| Y | 21.6 | 21.6 |
| TL | 157.56 | 147.45 |
| Bf | 19.36 | 32.89 |

[Lens Data]

| Surface Number | R | D | nd | vd | |
|---|---|---|---|---|---|
| 1* | 104.57 | 2.80 | 1.820980 | 42.5 | |
| 2* | 17.08 | 9.90 | | | |
| 3 | 60.02 | 2.00 | 1.820980 | 42.5 | |
| 4* | 39.88 | 8.96 | | | |
| 5 | −47.04 | 1.70 | | | |
| 6 | 99.56 | 0.20 | | | |
| 7 | 69.77 | 4.42 | 2.000600 | 25.4 | |
| 8 | −360.61 | (D8) | | | |
| 9 | 51.00 | 1.10 | 1.963000 | 24.1 | |
| 10 | 26.00 | 5.60 | 1.672700 | 32.1 | |
| 11 | −344.00 | (D11) | | | |
| 12 | ∞ | 0.00 | | | (Aperture Stop Sa) |
| 13 | 51.32 | 3.60 | 1.816659 | 29.2 | |
| 14 | 546.18 | 0.20 | | | |
| 15 | 55.66 | 1.20 | 1.846660 | 23.7 | |
| 16 | 25.97 | 8.10 | 1.487490 | 70.3 | |
| 17 | −49.86 | (D17) | | | |
| 18 | ∞ | 3.69 | | | (Aperture Stop S) |
| 19 | −47.28 | 1.10 | 1.953750 | 32.3 | |
| 20 | −294.71 | 1.39 | | | |
| 21 | −67.34 | 1.10 | 1.953750 | 32.3 | |
| 22 | 97.38 | 0.20 | | | |
| 23 | 40.32 | 3.30 | 1.922860 | 20.8 | |
| 24 | −773.06 | 1.50 | | | |
| 25 | ∞ | (D25) | | | (Aperture Stop Sa) |
| 26 | 73.81 | 1.10 | 1.953750 | 32.3 | |
| 27 | 20.74 | 6.00 | 1.497820 | 82.6 | |
| 28 | −161.32 | 0.20 | | | |
| 29 | 26.70 | 9.30 | 1.497820 | 82.6 | |
| 30 | −23.87 | 1.20 | 1.953750 | 32.3 | |
| 31 | −34.06 | (D31) | | | |
| 32 | 636.03 | 3.55 | 1.808090 | 22.7 | |
| 33 | −42.69 | 0.20 | | | |

TABLE 7-continued

| 34 | −54.47 | 1.40 | 1.851080 | 40.1 |
|---|---|---|---|---|
| 35* | 98.18 | (D35) | | |
| 36 | −22.05 | 1.40 | 1.820980 | 42.5 |
| 37* | −32.00 | Bf | | |

[Aspherical Surface Data]

1st Surface
κ = 1.000, A4 = −1.01E−06, A6 = 5.63E−09, A8 = −7.40E−12, A10 = 3.87E−15, A12 = −5.67E−19
2nd Surface
κ = 0.000, A4 = 3.61E−06, A6 = 9.15E−09, A8 = 1.27E−11, A10 = 1.52E−13, A12 = −3.00E−16
4th Surface
κ = 1.000, A4 = 4.88E−06, A6 = 4.08E−09, A8 = −1.88E−11, A10 = −1.60E−14, A12 = 1.46E−16
35th Surface
κ = 1.000, A4 = 1.17E−05, A6 = 1.03E−08, A8 = −1.15E−10, A10 = 1.05E−12, A12 = −3.70E−15
37th Surface
κ = 1.000, A4 = 6.03E−06, A6 = 7.34E−09, A8 = 2.29E−10, A10 = −9.55E−13, A12 = 3.17E−15

[Variable Distance Data]

| | W | M1 | M2 | T |
|---|---|---|---|---|
| | Upon focusing on infinity | | | |
| Focal length | 16.50 | 20.00 | 24.00 | 34.00 |
| Distance | ∞ | ∞ | ∞ | ∞ |
| D8 | 31.43 | 20.54 | 12.49 | 1.50 |
| D11 | 7.01 | 7.01 | 7.01 | 7.01 |
| D17 | 1.00 | 1.56 | 2.36 | 4.70 |
| D25 | 6.55 | 4.76 | 3.13 | 0.00 |
| D31 | 2.85 | 4.09 | 4.91 | 5.70 |
| D35 | 7.41 | 7.41 | 7.41 | 7.41 |
| Bf | 19.36 | 24.65 | 27.69 | 32.89 |
| | Upon focusing on an intermediate distance object | | | |
| Magnification | 0.033 | 0.034 | 0.029 | 0.034 |
| Distance | 465 | 566 | 801 | 980 |
| D8 | 32.61 | 21.57 | 13.40 | 2.30 |
| D11 | 5.83 | 5.99 | 6.11 | 6.26 |
| D17 | 1.00 | 1.56 | 2.36 | 4.70 |
| D25 | 6.55 | 4.76 | 3.13 | 0.00 |
| D31 | 2.61 | 3.89 | 4.65 | 5.47 |
| D35 | 7.64 | 7.59 | 7.67 | 7.63 |
| Bf | 19.36 | 24.65 | 27.69 | 32.89 |
| | Upon focusing on a very short distance object | | | |
| Magnification | 0.113 | 0.132 | 0.156 | 0.222 |
| Distance | 116 | 122 | 125 | 125 |
| D8 | 35.53 | 24.70 | 16.98 | 6.55 |
| D11 | 2.90 | 2.85 | 2.52 | 2.00 |
| D17 | 1.00 | 1.56 | 2.36 | 4.70 |
| D25 | 6.55 | 4.76 | 3.13 | 0.00 |
| D31 | 2.00 | 3.33 | 3.86 | 4.38 |
| D35 | 8.28 | 8.16 | 8.47 | 8.72 |
| Bf | 19.36 | 24.65 | 27.69 | 32.89 |

[Lens Group Data]

| Group | First surface | Focal length |
|---|---|---|
| G1 | 1 | −23.35 |
| G2 | 9 | 32.35 |
| G3 | 18 | −61.43 |
| G4 | 26 | 52.78 |
| G5 | 36 | −92.26 |

Figure 20A:
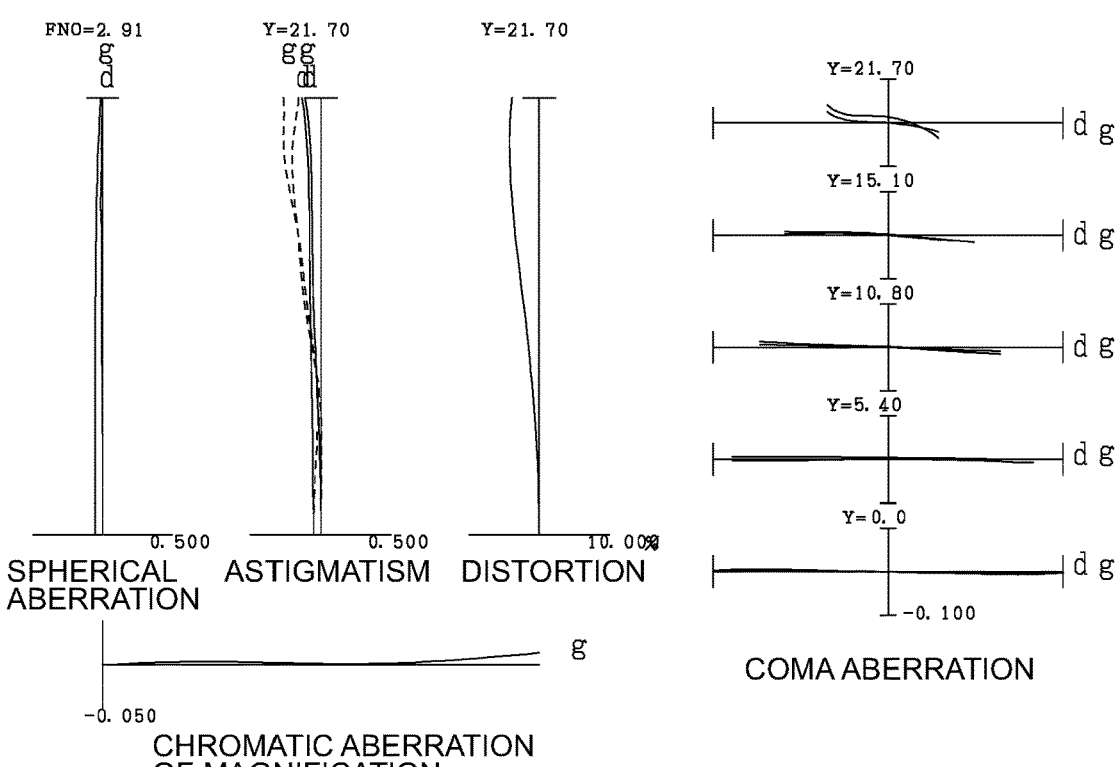
FIGS. 20A and 20B are graphs respectively showing various aberrations of the zoom optical system according to Seventh Example upon focusing on infinity in a wide-angle end state and a telephoto end state.
Figure 20B:
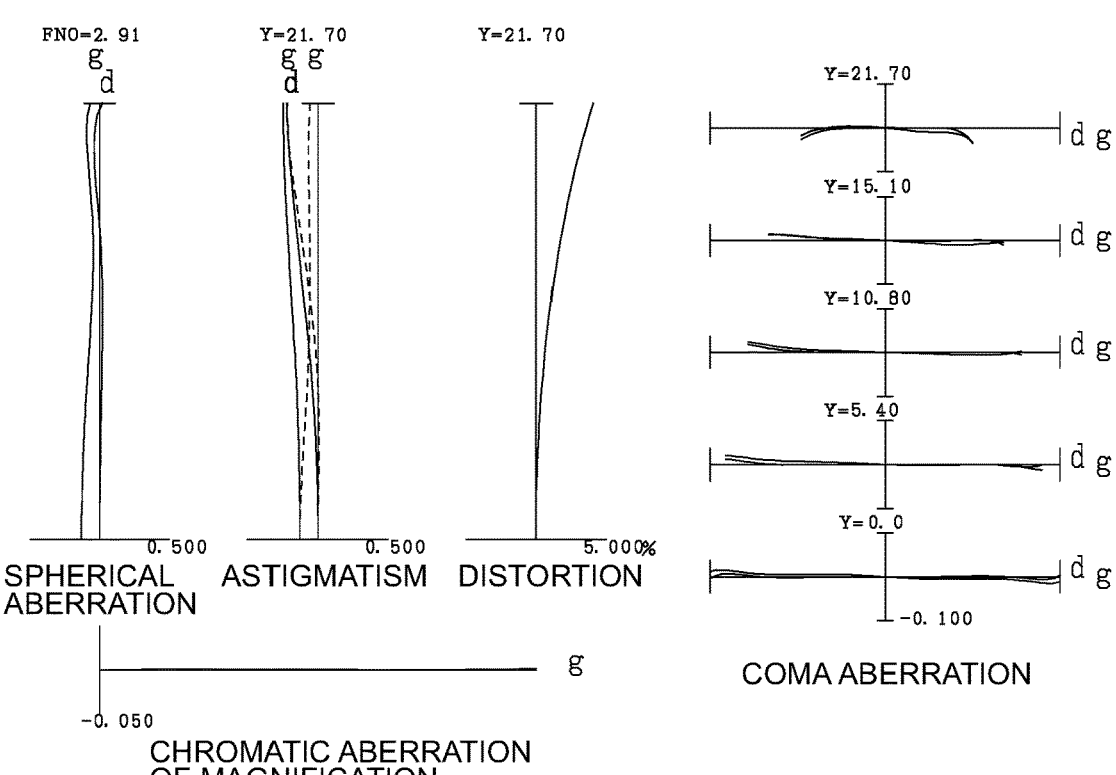
Figure 21A:
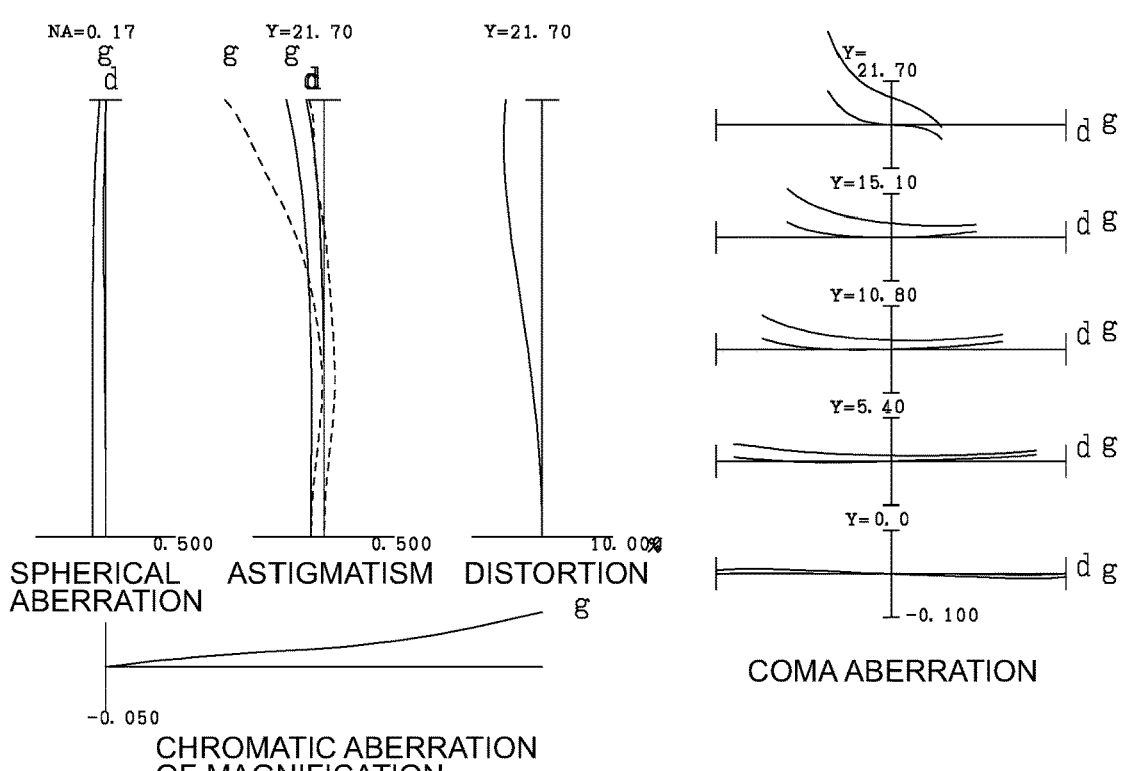
FIGS. 21A and 21B are graphs respectively showing various aberrations of the zoom optical system according to Seventh Example upon focusing on a short distance object in the wide-angle end state and the telephoto end state.
Figure 21B:
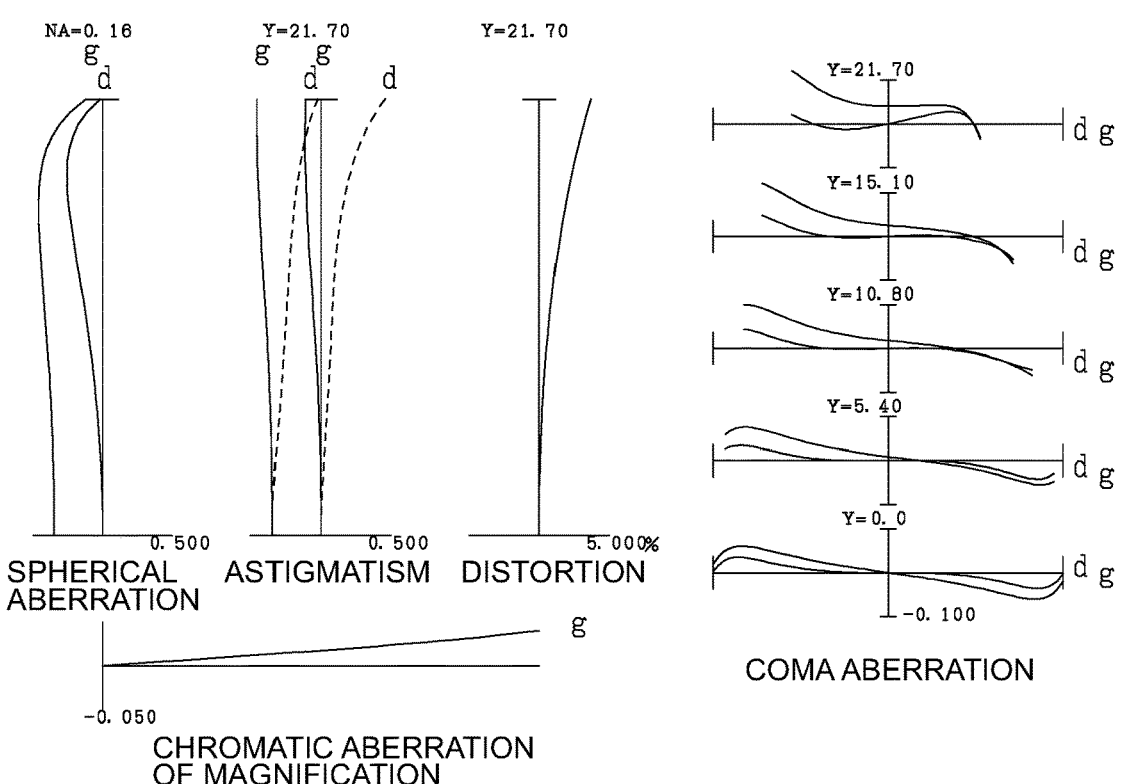

FIG. 20A shows various aberration graphs of the zoom optical system according to Seventh Example upon focusing on infinity in the wide angle end state. FIG. 20B shows various aberration graphs of the zoom optical system according to Seventh Example upon focusing on infinity in the telephoto end state. FIG. 21A shows various aberration graphs of the zoom optical system according to Seventh Example upon focusing on a short distance object in the wide angle end state. FIG. 21B shows various aberration graphs of the zoom optical system according to Seventh Example upon focusing on the short distance object in the telephoto end state. The various aberration graphs show that the zoom optical system according to Seventh Example favorably corrects various aberrations, and exerts excellent imaging performance, in the entire range from focusing on infinity to focusing on the short distance object. Accordingly, even in the case of focusing on the short distance object, the variation in angle of view upon focusing can be reduced while securing a favorable optical performance.

Next, the table of [Conditional Expression Corresponding Value] is shown below. This table collectively indicates values corresponding to the conditional expression (1-1), the conditional expression (1-2) and the conditional expressions (2) to (14), with respect to all Examples (First to Seventh Examples).

| | |
|---|---|
| $1.80 < fF/fBaw$ | Conditional Expression (1-1) |
| $2.00 < \beta Fw/(-\beta Baw) < 15.00$ | Conditional Expression (1-2) |
| $FNow < 3.40$ | Conditional Expression (2) |
| $1.50 < \beta Fw < 15.00$ | Conditional Expression (3) |
| $0.00 < fBaw/fCw < 1.00$ | Conditional Expression (4) |
| $0.60 < Bfw/fw < 4.00$ | Conditional Expression (5) |
| $0.05 < Bfw/TLw < 0.22$ | Conditional Expression (6) |
| $0.40 < STLw/TLw < 0.70$ | Conditional Expression (7) |
| $0.00 < TLt/TLw < 1.00$ | Conditional Expression (8) |
| $1.00 < (-f1)/fw < 1.80$ | Conditional Expression (9) |
| $0.42 < (-f1)/ft < 1.20$ | Conditional Expression (10) |
| $-3.00 < (rL1R2 + rL1R1)/(rL1R2 - rL1R1) < -0.80$ | Conditional Expression (11) |
| $-5.50 < (rL2R2 + rL2R1)/(rL2R2 - rL2R1) < -1.50$ | Conditional Expression (12) |
| $-0.50 < (rL3R2 + rL3R1)/(rL3R2 - rL3R1) < 0.50$ | Conditional Expression (13) |
| $1.50 < 1(rLeR2 + rLeR1)/(rLeR2 - rLeR1)|$ | Conditional Expression (14) |
| $75.0 < vd$ | Conditional Expression (15) |

[Conditional Expression Corresponding Value]
(First to Fourth Examples)

| Conditional Expression | 1st Example | 2nd Example | 3rd Example | 4th Example |
|---|---|---|---|---|
| (1-1) | 3.603 | 2.703 | 1.830 | 3.217 |
| (1-2) | 3.837 | 7.630 | 13.253 | 3.989 |
| (2) | 2.91 | 2.91 | 2.91 | 2.91 |
| (3) | 2.430 | 5.116 | 13.381 | 2.687 |
| (4) | 0.850 | 0.747 | 0.616 | 0.834 |
| (5) | 1.467 | 1.515 | 1.399 | 1.563 |
| (6) | 0.146 | 0.159 | 0.139 | 0.163 |
| (7) | 0.588 | 0.571 | 0.603 | 0.583 |
| (8) | 0.932 | 0.942 | 0.921 | 0.957 |
| (9) | 1.139 | 1.491 | 1.436 | 1.484 |

-continued

| | | | | |
|---|---|---|---|---|
| (10) | 0.704 | 0.922 | 0.888 | 0.919 |
| (11) | -1.059 | -1.163 | -1.579 | -1.237 |
| (12) | -3.333 | -3.239 | -2.678 | -1.895 |
| (13) | 0.147 | 0.108 | -0.310 | -0.127 |
| (14) | 414.337 | 13.194 | 12.013 | 8.579 |
| (15) | 82.6 | 82.6 | 82.6 | 82.6 |

[Conditional Expression Corresponding Value]
(Fifth to Seventh Examples)

| Conditional Expression | 5th Example | 6th Example | 7th Example |
|---|---|---|---|
| (1-1) | 2.403 | 2.973 | 2.737 |
| (1-2) | 6.075 | 2.382 | 6.202 |
| (2) | 2.91 | 2.91 | 2.91 |
| (3) | 4.267 | 1.834 | 4.383 |
| (4) | 0.827 | 0.982 | 0.745 |
| (5) | 1.394 | 0.756 | 1.173 |
| (6) | 0.140 | 0.079 | 0.123 |
| (7) | 0.608 | 0.460 | 0.566 |
| (8) | 0.928 | 0.886 | 0.936 |
| (9) | 1.424 | 1.299 | 1.415 |
| (10) | 0.880 | 0.630 | 0.687 |
| (11) | -1.505 | -1.415 | -1.390 |
| (12) | -2.830 | -4.843 | -4.962 |
| (13) | -0.124 | -0.185 | 0.358 |
| (14) | 32.243 | 2.349 | 5.433 |
| (15) | 82.6 | 82.6 | 82.6 |

According to each Example described above, a zoom optical system having a small variation in angle of view upon focusing can be achieved.

Examples described above show specific examples of the invention of the present application. The invention of the present application is not limited to these Examples.

The following content can be adopted in a range without impairing the optical performance of the zoom optical system of this embodiment.

As Examples of the zoom optical systems of this embodiment, those having the three-group structure, the four-group structure, the five-group structure, and the six-group structure are described. However, the present application is not limited thereto. A zoom optical system having another group configuration (e.g., a seven-group structure etc.) may be configured. Specifically, a configuration may be adopted where a lens or a lens group is added to a place closest to the object and a place closest to the image in the zoom optical system according to this embodiment. Note that the lens group indicates a portion that includes at least one lens separated by air distances that change during zooming.

A focusing lens group may be adopted that moves a single or multiple lens groups, or a partial lens group in the optical axis direction and achieves focusing from the infinity object to the short distance object. The focusing lens group is also applicable to autofocusing, and is suitable also for motor drive for autofocusing (using an ultrasonic motor or the like).

A vibration-proof lens group may be adopted where a lens group or a partial lens group is moved so as to have a component in a direction perpendicular to the optical axis, or rotationally moved (swung) in a plane containing the optical axis, and the image blur caused by a camera shake is thus corrected.

The lens surface may be made of a spherical surface or a planar surface, or an aspherical surface. A case where the lens surface is a spherical surface or a planar surface is preferable because lens processing, and assembling and adjustment are facilitated, and the optical performance degradation due to errors caused by processing and assembling and adjustment can be prevented. It is also preferable because the degradation in representation performance even with the image surface being misaligned is small.

In the cases where the lens surface is an aspherical surface, the aspherical surface may be any of an aspherical surface made by a grinding process, a glass mold aspherical surface made by forming glass into an aspherical shape with a mold, and a composite type aspherical surface made by forming a resin on a surface of glass into an aspherical shape. The lens surface may be a diffractive surface. The lens may be a gradient-index lens (GRIN lens), or a plastic lens.

Preferably, the aperture stop is disposed in or adjacent to the third lens group, or in or adjacent to the fourth lens group. However, the member as the aperture stop is not necessarily provided, a frame of a lens may replace the role.

An antireflection film having a high transmissivity in a wide wavelength region may be applied onto each lens surface in order to reduce flares and ghosts and achieve optical performances having a high contrast.

EXPLANATION OF NUMERALS AND CHARACTERS

G1 First lens group
G2 Second lens group
G3 Third lens group
G4 Fourth lens group
G5 Fifth lens group
G6 Sixth lens group
I Image surface
S Aperture stop
The invention claimed is:

1. A zoom optical system, consisting of, in order from an object on an optical axis: a preceding lens group having a negative refractive power; and a succeeding lens group having a positive refractive power, wherein the succeeding lens group essentially consists of two sub lens groups, one of the sub lens groups disposed close to the object is a focusing group, and the other one of the sub lens groups disposed close to an image is an image-side group, an aperture stop is disposed in the succeeding lens group, the preceding lens group essentially consists of a first lens group disposed closest to the object, upon zooming, a distance between the preceding lens group and the succeeding lens group changes, upon focusing from an infinity object to a short distance object, the focusing group moves toward the image on the optical axis, and the following conditional expressions are satisfied:

$$1.80 < fF/fBaw$$

$$FNow < 3.40$$

$$1.00 < (-f1)/fw < 1.50$$

$$0.583 \leq STLw/TLw < 0.70$$

where
fF: a focal length of the focusing group,
fBaw: a focal length of the succeeding lens group in a wide angle end state, FNow: an f-number of the zoom optical system in the wide angle end state,
TLw: an entire length of the zoom optical system in the wide angle end state,
f1: a focal length of the first lens group,
fw: a focal length of the zoom optical system in the wide angle end state, and
STLw: a distance on the optical axis from a lens surface closest to the object in the zoom optical system to the aperture stop in the wide angle end state.

2. The zoom optical system according to claim 1, wherein the following conditional expressions are satisfied:

$$1.50 < \beta Fw < 15.00$$

$$0.00 < fBaw/fCw < 1.00$$

where
βFw: a magnification of the focusing group in the wide angle end state,
fCw: a focal length of the image-side group in the wide angle end state, and
fBaw: the focal length of the succeeding lens group in the wide angle end state.

3. The zoom optical system according to claim 1, wherein the following conditional expression is satisfied:

$$0.60 < Bfw/fw < 4.00$$

where
fw: the focal length of the zoom optical system in the wide angle end state, and
Bfw: a back focus of the zoom optical system in the wide angle end state.

4. The zoom optical system according to claim 1, wherein the following conditional expression is satisfied:

$$0.05 < Bfw/TLw < 0.22$$

where
Bfw: a back focus of the zoom optical system in the wide angle end state, and
TLw: the entire length of the zoom optical system in the wide angle end state.

5. The zoom optical system according to claim 1, wherein the following conditional expression is satisfied:

$$0.00 < TLt/TLw < 1.00$$

where
TLw: the entire length of the zoom optical system in the wide angle end state, and
TLt: the entire length of the zoom optical system in a telephoto end state.

6. The zoom optical system according to claim 1, wherein the following conditional expression is satisfied:

$$0.42 < (-f1)/ft < 1.20$$

where
f1: the focal length of the first lens group, and
ft: a focal length of the zoom optical system in a telephoto end state.

7. An optical apparatus comprising:
a lens barrel; and
the zoom optical system according to claim 1, which is disposed in the lens barrel.

* * * * *